(12) United States Patent
Terakado

(10) Patent No.: US 8,045,051 B2
(45) Date of Patent: Oct. 25, 2011

(54) IMAGING APPARATUS

(75) Inventor: Daisuke Terakado, Tokyo (JP)

(73) Assignee: Sony Corporation, Tokyo (JP)

( * ) Notice: Subject to any disclaimer, the term of this patent is extended or adjusted under 35 U.S.C. 154(b) by 533 days.

(21) Appl. No.: 12/204,096

(22) Filed: Sep. 4, 2008

(65) Prior Publication Data

US 2009/0059064 A1 Mar. 5, 2009

(30) Foreign Application Priority Data

Sep. 5, 2007 (JP) .............................. P2007-230831

(51) Int. Cl.
*H04N 5/225* (2006.01)
*H04N 5/76* (2006.01)
*H04N 9/64* (2006.01)

(52) U.S. Cl. .................. 348/375; 348/231.7; 348/231.8; 386/247

(58) Field of Classification Search .......... 348/374–376, 348/231.7, 231.8; 386/46, 224, 247
See application file for complete search history.

(56) References Cited

U.S. PATENT DOCUMENTS

| | | | | |
|---|---|---|---|---|
| 5,255,120 A | * | 10/1993 | Anzai et al. | 348/E5.025 |
| 6,515,697 B1 | * | 2/2003 | Yamada et al. | 348/231.6 |
| 7,616,392 B2 | * | 11/2009 | Igarashi et al. | 396/448 |
| 2005/0254811 A1 | * | 11/2005 | Taneoka | 396/287 |
| 2006/0007551 A1 | * | 1/2006 | Sakurai et al. | 359/611 |
| 2006/0233515 A1 | * | 10/2006 | Hino et al. | 386/46 |
| 2007/0148535 A1 | * | 6/2007 | Nagai et al. | 429/96 |
| 2008/0252752 A1 | * | 10/2008 | Kosaka | 348/231.99 |

FOREIGN PATENT DOCUMENTS

| | | | |
|---|---|---|---|
| JP | 2001-210070 | * | 8/2001 |
| JP | 3528845 | | 3/2004 |
| JP | 2007 6282 | | 1/2007 |

* cited by examiner

*Primary Examiner* — Nhan T Tran
(74) *Attorney, Agent, or Firm* — Frommer Lawrence & Haug LLP; William S. Frommer; Thomas F. Presson

(57) ABSTRACT

An imaging apparatus that includes a main body that includes a recording and reproducing unit that houses a main recording medium and records an information signal. The information signal from the main recording medium is reproduced. An auxiliary recording medium unit is detachably mounted on a mounting section of the apparatus main body and houses an auxiliary recording medium separate from the main recording medium. During imaging, the apparatus main body is placed on one shoulder of a camera operator and a grip section is disposed on a front surface side of the apparatus main body. The mounting section is formed between the grip section and the recording and reproducing unit. The auxiliary recording medium unit is detachably attachable during imaging.

6 Claims, 48 Drawing Sheets

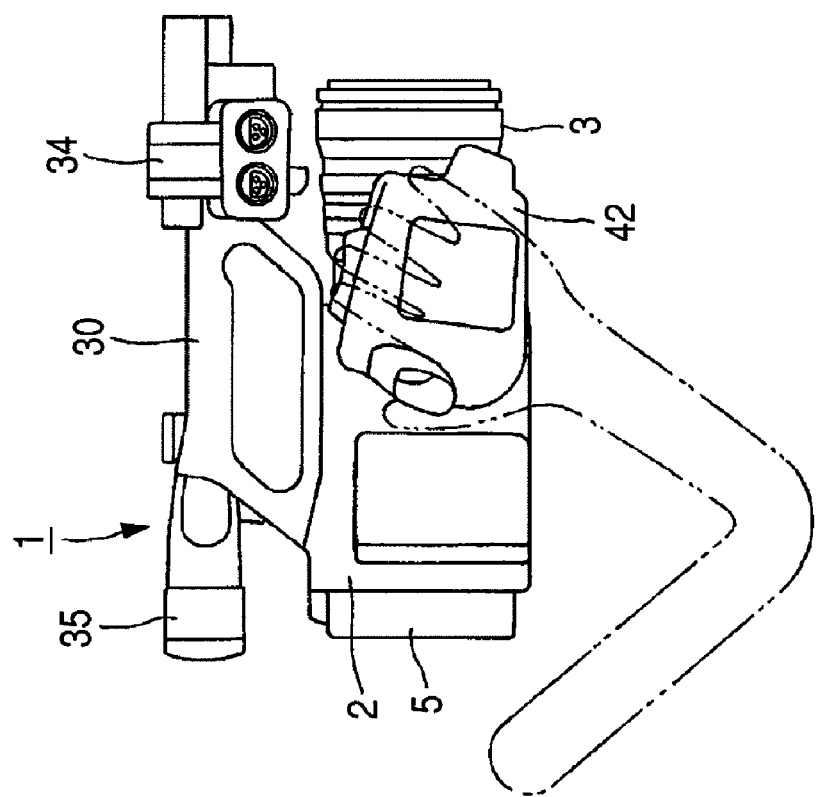
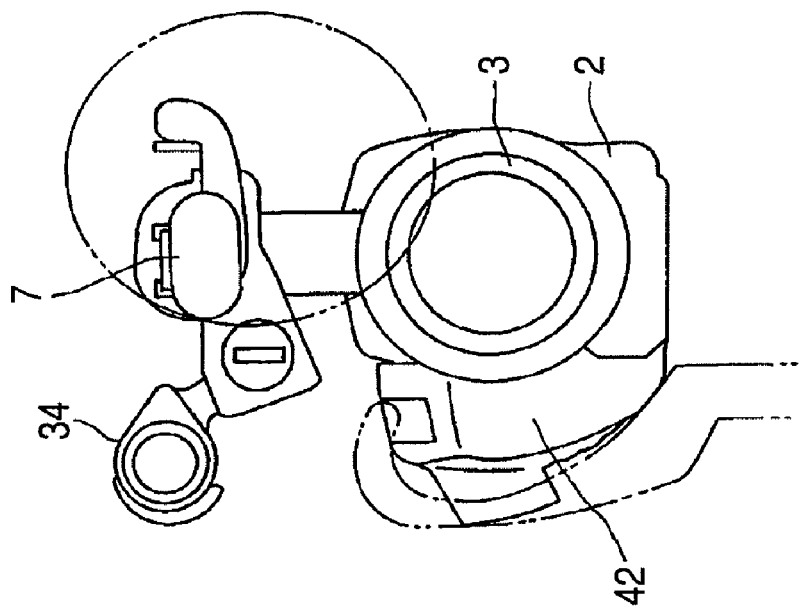

IMAGING APPARATUS

CROSS-REFERENCES TO RELATED APPLICATIONS

The present invention contains subject matter related to Japanese Patent Application JP 2007-230831 filed in the Japanese Patent Office on Sep. 5, 2007, the entire contents of which being incorporated herein by reference.

BACKGROUND OF THE INVENTION

1. Field of the Invention

The present invention relates to an imaging apparatus in which a main recording medium and an auxiliary recording medium are used, and, more particularly to an imaging apparatus in which an auxiliary recording medium unit that houses the auxiliary recording medium is detachably attached to an imaging apparatus main body.

2. Description of the Related Art

In an imaging apparatus such as a digital camera or a video camera, an accessory shoe for mounting an accessory such as a flash light for emitting auxiliary light or a microphone for recording sound is often provided. Such an accessory shoe of the imaging apparatus in the past includes a holding section for connecting the accessory to a flat mounting surface and a terminal section provided on the mounting surface for supplying power to and exchanging signals with the accessory. A connector that is inserted in the accessory shoe is provided in the accessory attached to the imaging apparatus. The connector includes an attaching section that is attached to the holding section of the accessory shoe and a connecting section provided in the attaching section for supplying power to and exchanging signals with the accessory.

The connector is inserted in the accessory shoe by linearly sliding the connector along the mounting surface with the attaching section of the connector pressed against the mounting surface of the accessory shoe and engaging the attaching section with the holding section of the accessory shoe. The connecting section of the accessory is electrically connected to the terminal section of the accessory shoe with the attaching section held by the holding section (see, for example, Japanese Patent No. 3528845 and JP-A-2007-6282).

In a video camera for business use and a video camera of a high-end model for higher-level amateur users, a DV tape or an optical disk such as a DVD or a BD stored in a video camera main body is used as a main recording medium. Besides, there is also proposed a video camera in which an auxiliary recording medium unit that houses an auxiliary recording medium is detachably mounted on an apparatus main body to prepare for situations such as a recording mistake in the main recording medium and recording exceeding a recording capacity. In this auxiliary recording medium unit, for example, a memory card is used as a recording medium. When the auxiliary recording medium unit is mounted on the video camera, the auxiliary recording medium unit is supplied with electric power of a video camera main body and driven. With such an auxiliary recording medium unit, it is possible to edit recorded data independently from the video camera by removing the auxiliary recording medium unit from the apparatus main body and, then, connecting the auxiliary recording medium to an editing device. Therefore, it is also possible to perform imaging and editing in parallel by using only the auxiliary recording medium unit to edit the recorded data.

In such a video camera, when a connecting section provided in the auxiliary recording medium unit is connected to a terminal section on the apparatus main body side on which the auxiliary recording medium unit is mounted, driving power is supplied to and an information signal is transmitted to the auxiliary recording medium unit. During imaging, after such an auxiliary recording medium unit is removed, it could be necessary to attach another auxiliary recording medium unit anew or replace a memory card inserted in the auxiliary recording medium unit. However, depending on an imaging condition such as data collection or relay broadcast, imaging may not be able to be suspended. Therefore, it is demanded that work for replacing the auxiliary recording medium unit and the memory card should be performed without suspending imaging.

For transmission of an information signal and stable supply of driving power, it is necessary that the terminal section on the apparatus main body side and the connecting section of the auxiliary recording medium unit are surely connected. Therefore, both the terminal sections need to have resistance against a load exerted thereon when the terminal sections are inserted in and detached from the connecting section. The video camera is used not only in a stationary state. The video camera may move together with the camera operator or may be sometimes used by the camera operator while running. In such a case, the terminal sections need to be strong enough not to break even if vibration and impact are transmitted to the terminal sections via the connecting section of the auxiliary recording medium unit.

A communication terminal based on, for example, the IEEE 1394 standard may be provided to be branched from a transmission path for transmitting an information signal other than the main-body-side terminal section connected to the auxiliary recording medium unit. When such a communication terminal and the main-body-side terminal section for the auxiliary recording medium unit are simultaneously used, plural external apparatuses are connected to the identical transmission path. As a result, transmitted signals are mixed and reliability of operations is spoiled.

SUMMARY OF THE INVENTION

Therefore, it is desirable to provide an imaging apparatus in which a main recording medium is housed and an auxiliary recording medium unit is mounted, the auxiliary recording medium unit can be easily mounted on and detached from a mounting section, and connection reliability of the mounted auxiliary recording medium unit can be secured.

According to an embodiment of the present invention, there is provided an imaging apparatus including an apparatus main body including a recording and reproducing unit that houses a main recording medium and records an information signal in and reproduces the information signal from the main recording medium and an auxiliary recording medium unit that is detachably mounted on a mounting section of the apparatus main body and houses an auxiliary recording medium separate from the main recording medium. During imaging, the apparatus main body is placed on one shoulder of a camera operator and a grip section provided on a front surface side of the apparatus main body is gripped. The mounting section is formed between the grip section and the recording and reproducing unit on a side surface on the opposite side of a side surface on the camera operator side of the apparatus main body during imaging. The auxiliary recording medium unit is detachably attachable during imaging.

With the imaging apparatus according to the embodiment of the present invention, the mounting section on which the auxiliary recording medium unit is mounted is provided on the opposite side of the side surface on the camera operator side. Therefore, even during imaging, the auxiliary recording medium unit can be mounted on and detached from the mounting section by a camera assistant or the like. Consequently, in the imaging apparatus, when a capacity of the auxiliary recording medium runs short or when data recorded in the auxiliary recording medium is edited, it is possible to replace the auxiliary recording medium unit without suspending imaging.

BRIEF DESCRIPTION OF THE DRAWINGS

FIGS. 8A and 8B are a front view and a side view schematically showing a state in which the handy-type imaging apparatus is grasped;
FIGS. 10A to 10D are perspective view showing the shoe adapter and an accessory attached to the shoe adapter, wherein
FIG. 10A is a perspective view of the accessory,
FIG. 10B is a perspective view of the shoe adapter,
FIG. 10C is a perspective view of the shoe adapter attached with the accessory,
and FIG. 10D is a perspective view showing the apparatus main body attached with the accessory;
FIGS. 36A to 36C are diagrams showing the auxiliary recording medium unit attached to an adapter, wherein
FIG. 36A shows a unit main body and the adapter,
FIG. 36B shows a battery and the adapter,
and FIG. 36C shows the adapter attached with the unit main body and the battery;
FIGS. 40A and 40B are diagrams showing a finder block, wherein
FIG. 40A is a perspective view showing a state in which a finder member and an eyepiece member are separated and FIG. 40B is a perspective view showing a state in which the eyepiece member is connected to the finder member.

DESCRIPTION OF THE PREFERRED EMBODIMENTS

An imaging apparatus according to an embodiment of the present invention will be hereinafter explained in detail with reference to the accompanying drawings.

An imaging apparatus 1 according to an embodiment of the present invention includes an apparatus main body 2 and a lens barrel 3 that is detachably attachable to the imaging apparatus main body 2 and is mounted with an imaging lens. The imaging apparatus 1 is a so-called handy-type imaging apparatus that a camera operator holds with one hand by gripping a grip section provided in the lens barrel 3. The imaging apparatus 1 is substantially reduced in size and weight compared with a shoulder-mounted-type imaging apparatus mounted and held on the shoulder of the camera operator adopted in an imaging apparatus of a lens barrel replacement type in the past.

The lens barrel 3 is detachably attachable to the imaging apparatus 1. Plural kinds of the lens barrels 3 having different magnifications and the like are prepared as replacement lenses. An appropriate lens barrel 3 can be attached and used according to necessity. As described later, the grip section is formed in the lens barrel 3. The lens barrel 3 including the grip section is detached from the apparatus main body.

Figure 1:
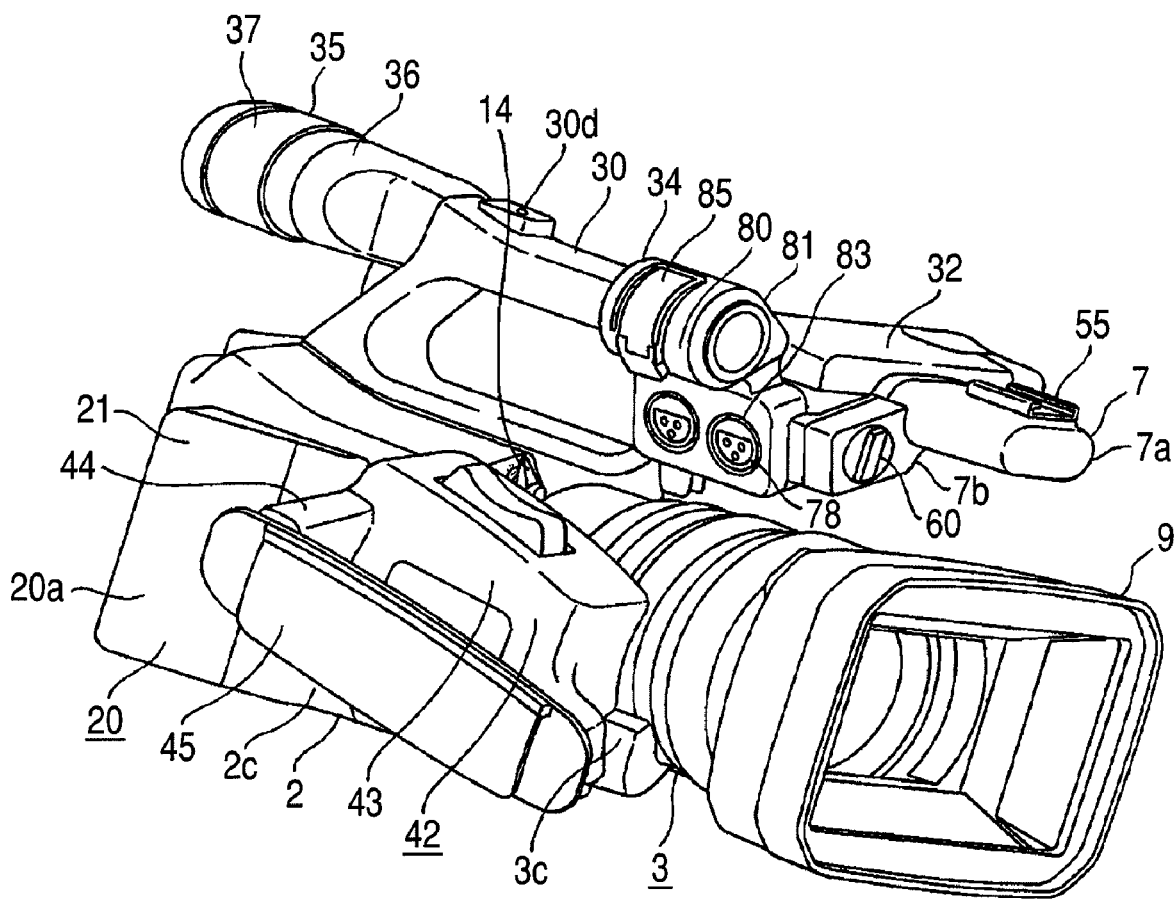
FIG. 1 is a perspective view showing a handy-type imaging apparatus from a left side surface thereof.
Figure 37B:
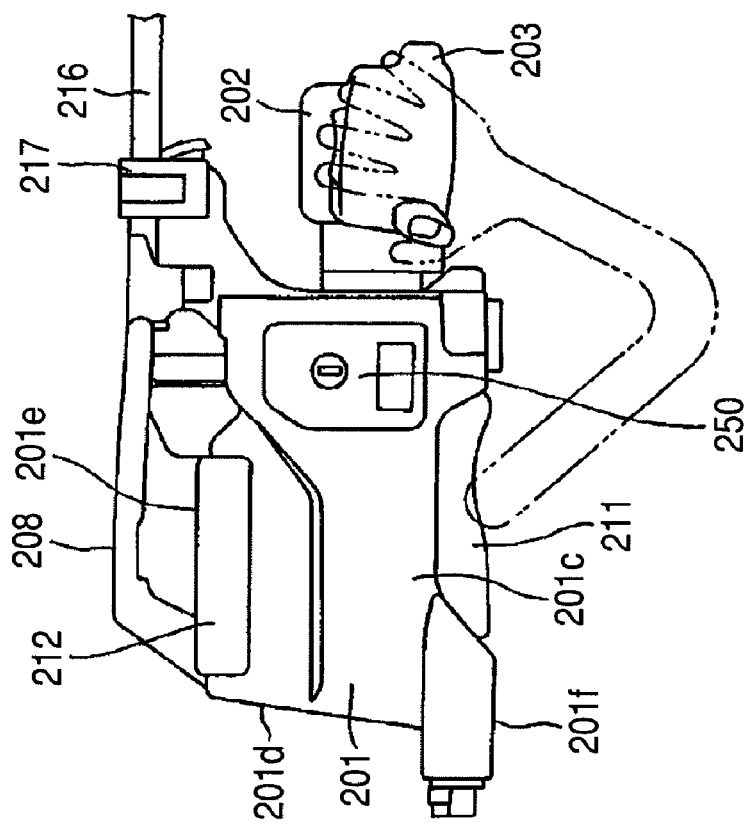
FIGS. 37A and 37B are a front view and a side view showing an imaging state of a shoulder-mounted-type imaging apparatus.
Figure 37A:
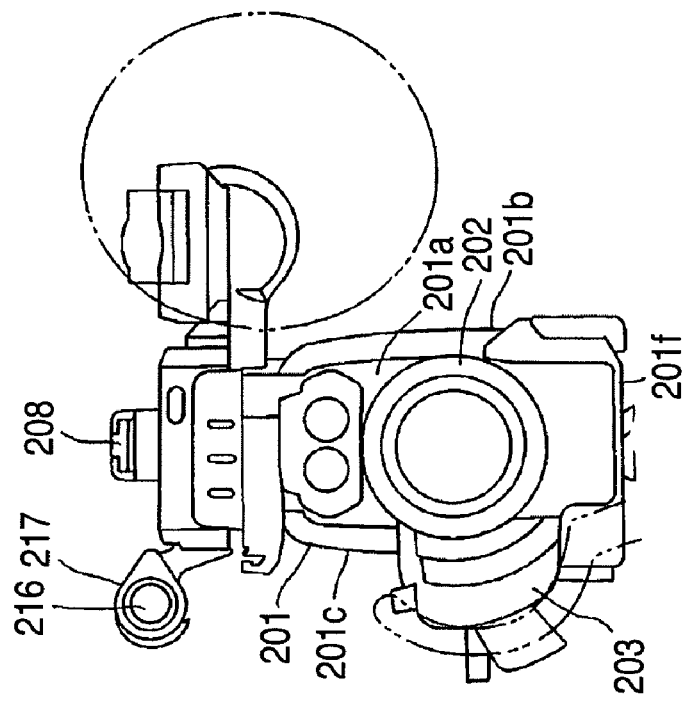
Figure 38:
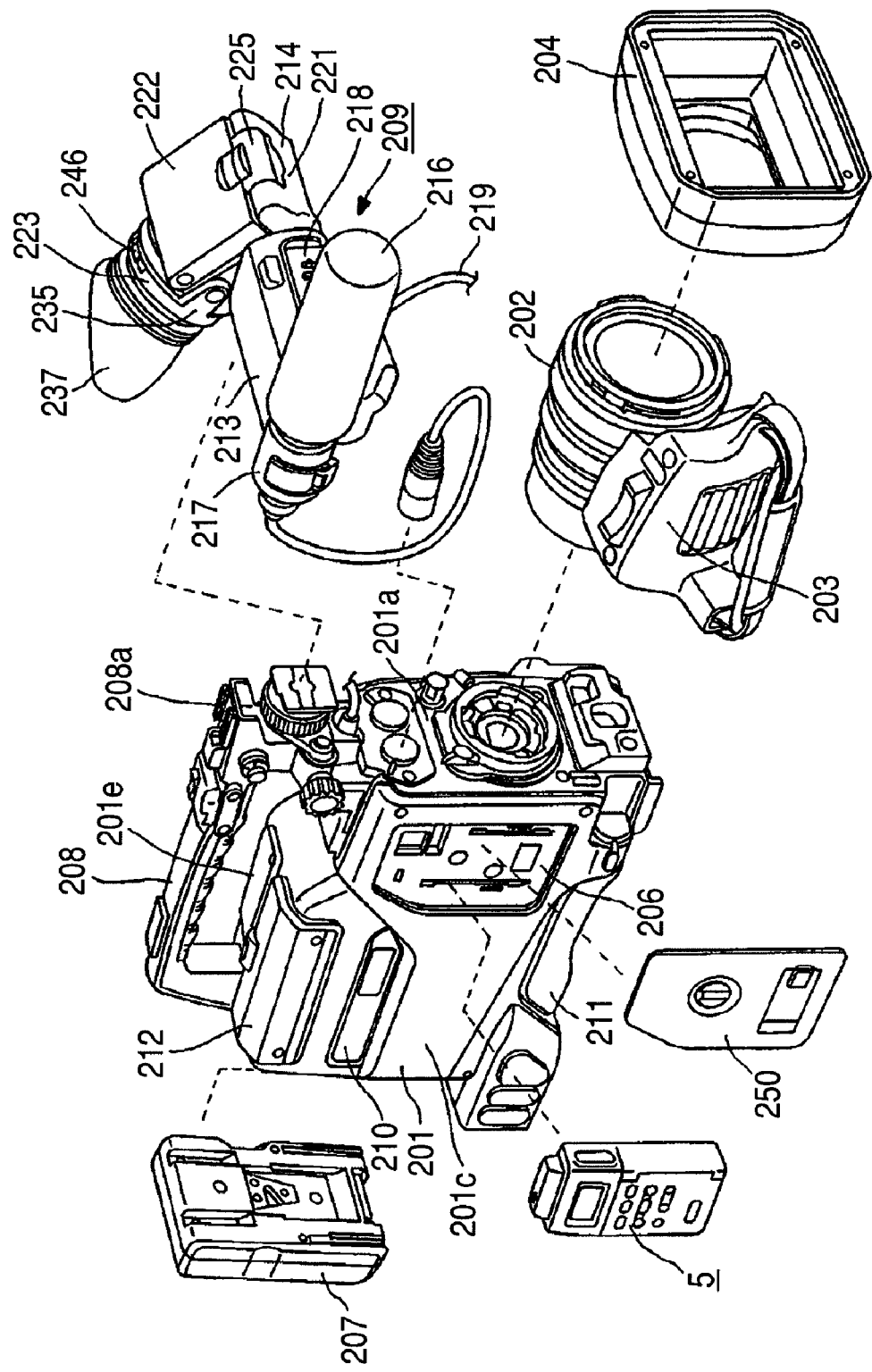
FIG. 38 is a disassembled perspective view showing the shoulder-mounted-type imaging apparatus from a front side thereof.
Figure 39:
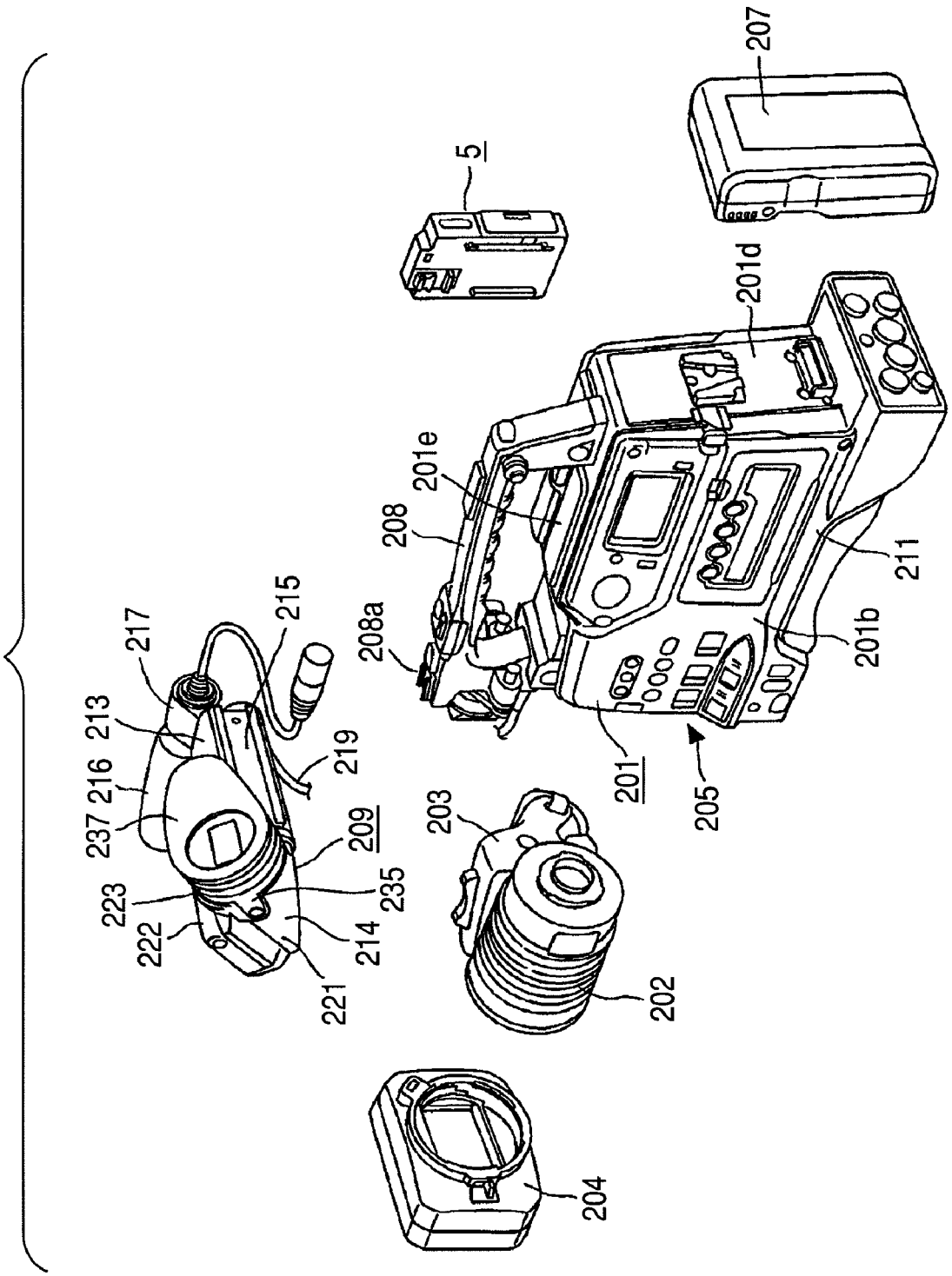
FIG. 39 is a disassembled perspective view showing the shoulder-mounted-type imaging apparatus from a rear side thereof.

Both the handy-type imaging apparatus 1 shown in FIG. 1 and a shoulder-mounted-type imaging apparatus 200 shown in FIGS. 37A and 37B are provided as high-end models for business use or for high-level amateur users. High-vision imaging is possible with the imaging apparatuses. In such imaging apparatuses 1 and 200, a digital video tape including a tape-like recording medium such as a DV cassette capable of performing HDV recording is used as a main recording medium inserted in and detached from the apparatus main body. Images such as moving images and still images captured by an imaging lens are converted into electric signal by a solid-state imaging device such as a CMOS or a CCD and sound is converted into electric signals. The electric signals are recorded in a tape cartridge. The images converted into the electric signals are displayed on a display device such as a liquid crystal display.

As a main recording medium for the imaging apparatuses 1 and 200, magnetic tapes other than a DV cassette, disk-like recording media including optical disks such as a CD, a DVD, and a BD, magneto-optical disks, and magnetic disks such as a hard disk, or recording media such as a semiconductor memory can also be used. Moreover, as described later, in the imaging apparatuses 1 and 200, an auxiliary recording medium unit that houses a memory card is detachably mounted as an auxiliary recording medium separately from the main recording medium.

Details of the handy-type imaging apparatus 1 are explained below. Then, details of the shoulder-mounted-type imaging apparatus 200 are explained.

Figure 2:
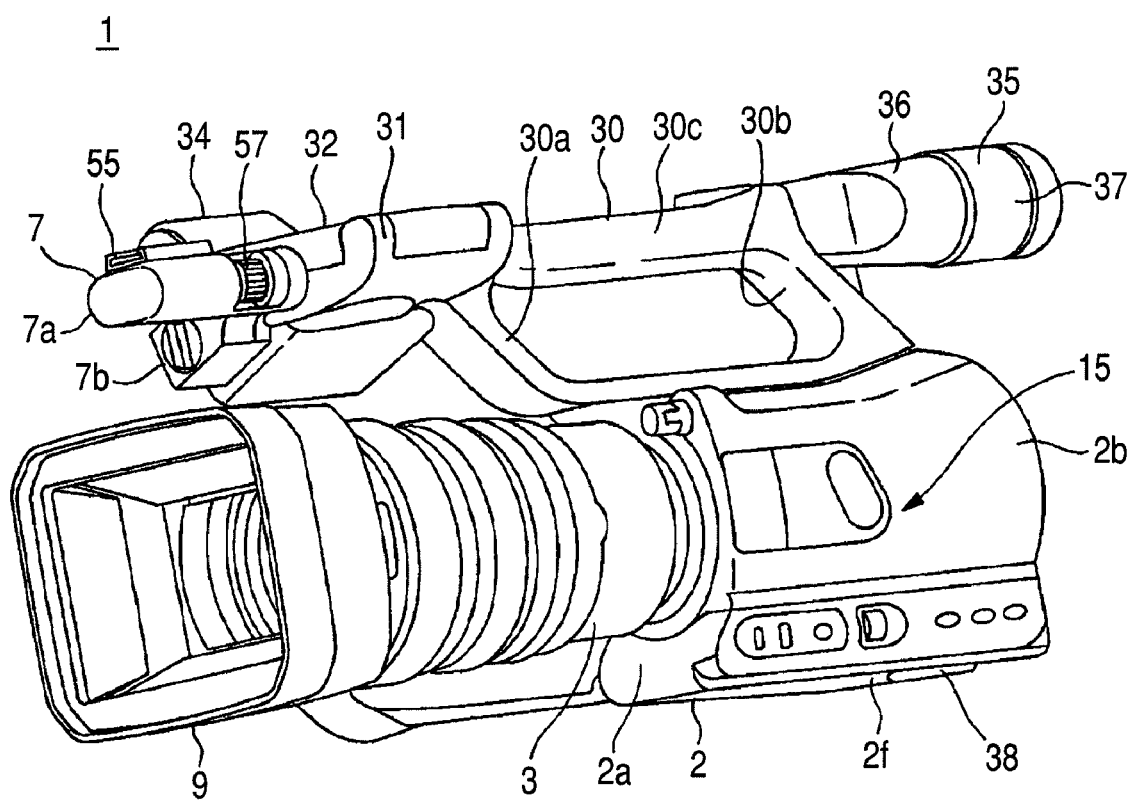
FIG. 2 is a perspective view showing the handy-type imaging apparatus from a right side surface side thereof.
Figure 3:
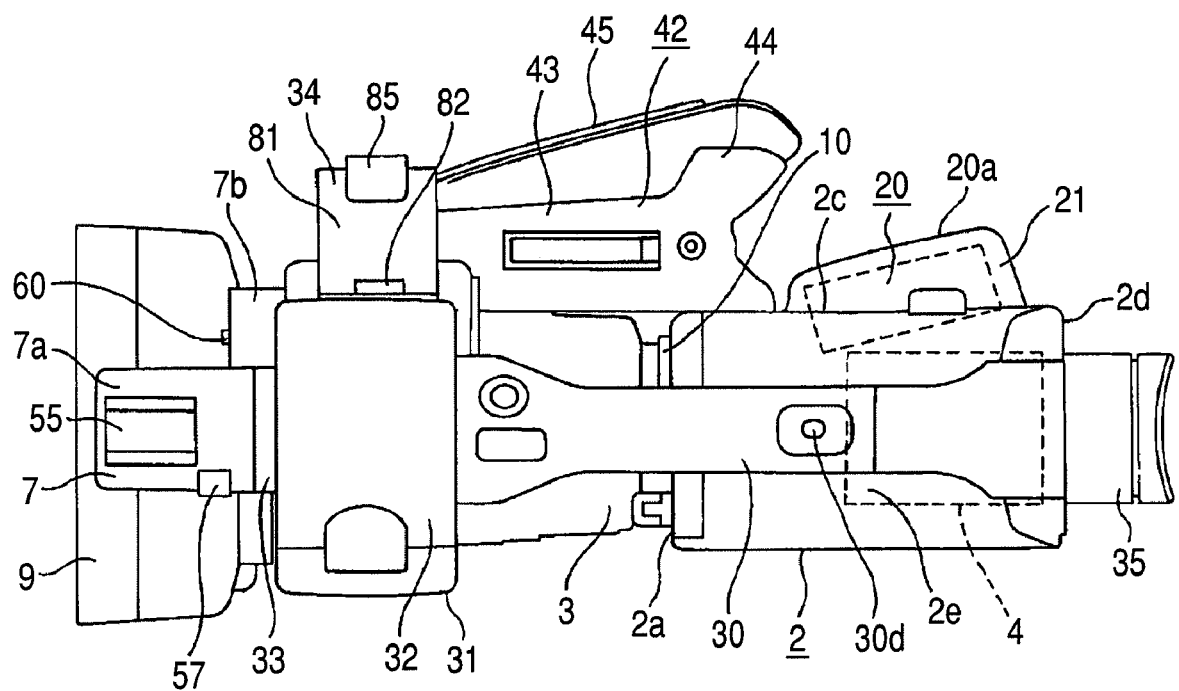
FIG. 3 is a top view showing the handy-type imaging apparatus.
Figure 4:
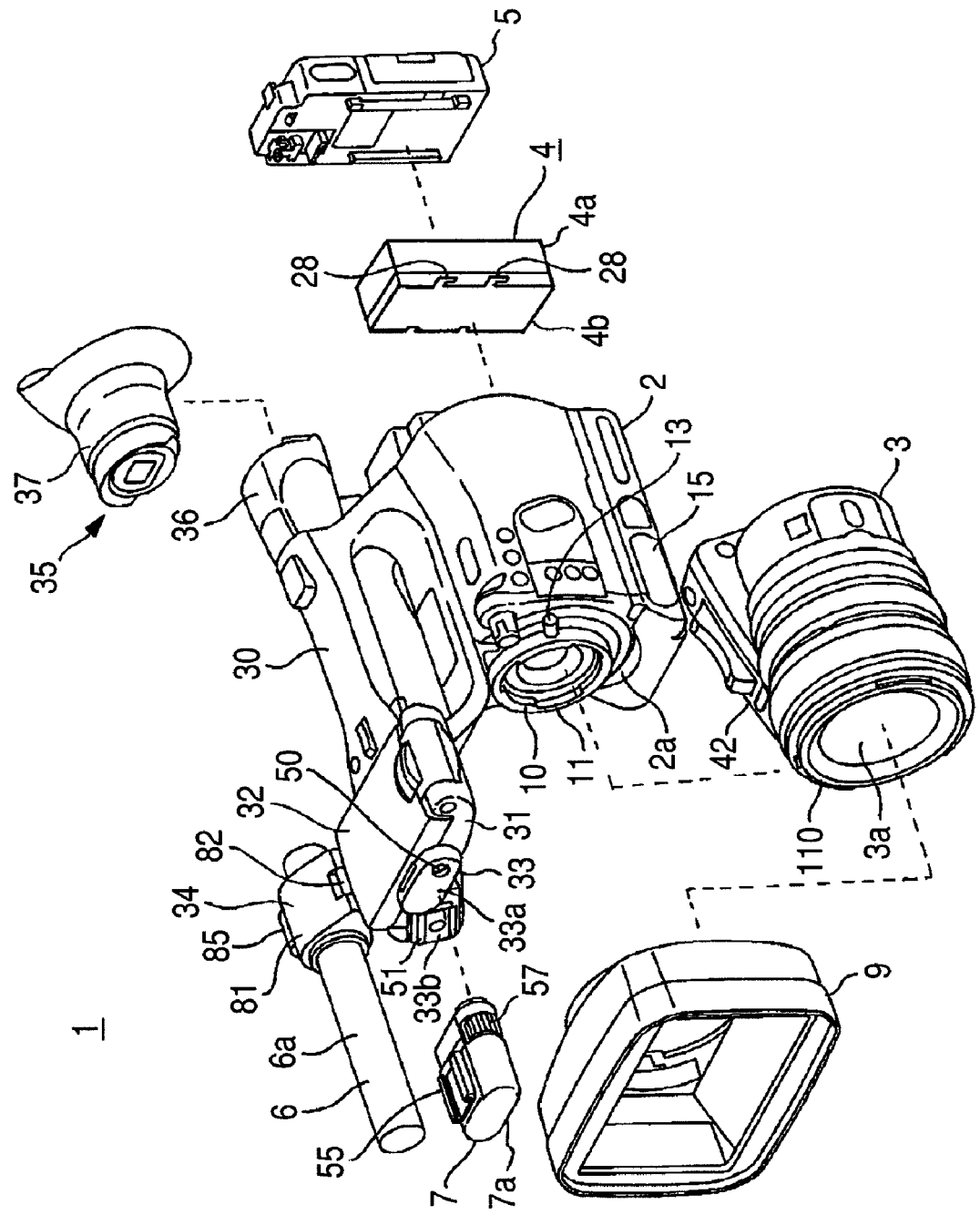
FIG. 4 is a disassembled perspective view showing the handy-type imaging apparatus from a front side thereof.
Figure 5:
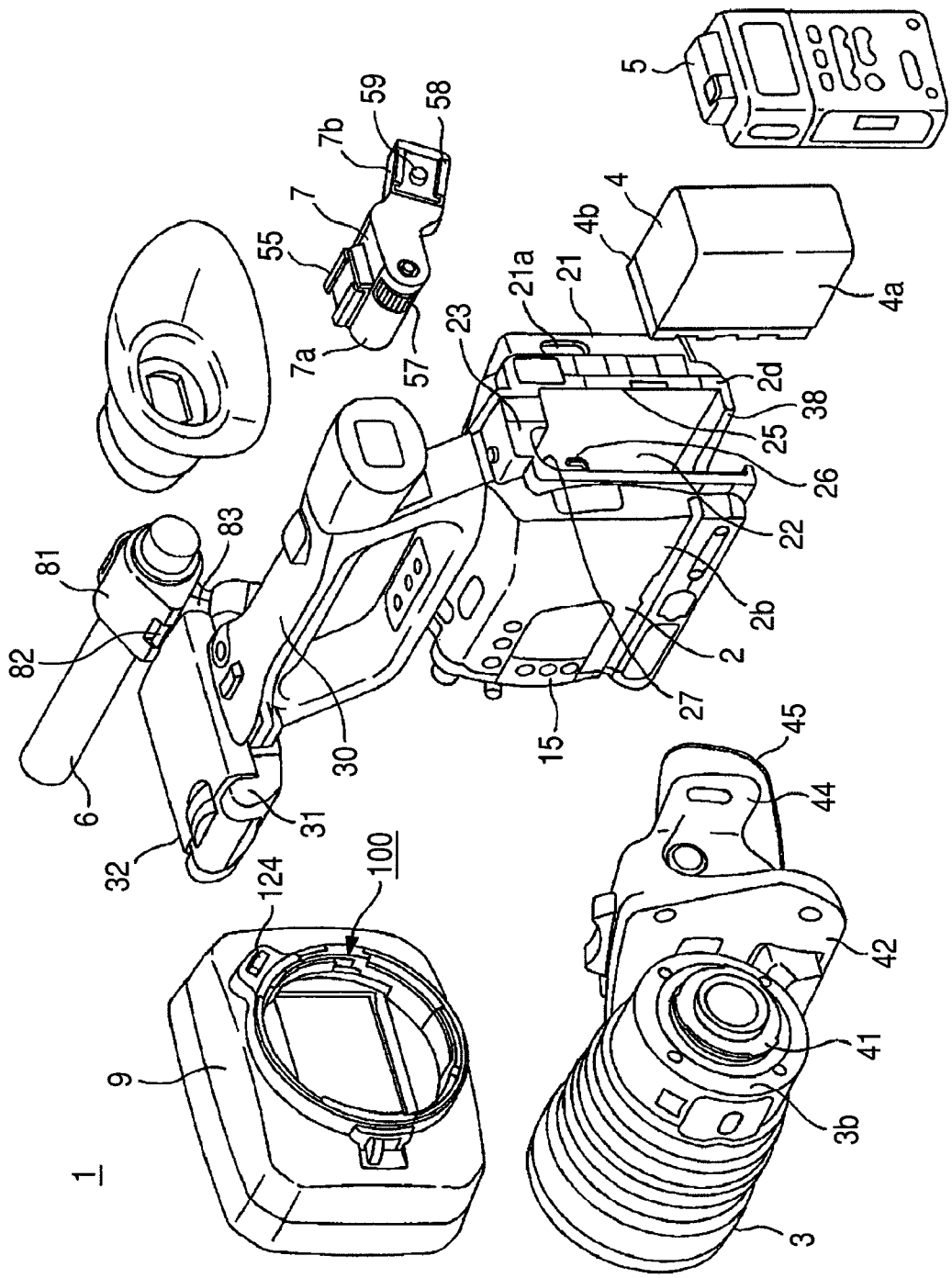
FIG. 5 is a disassembled perspective view of the handy-type imaging apparatus from a rear side thereof.

As shown in FIGS. 1 to 3, the imaging apparatus 1 includes the apparatus main body 2 of a substantially rectangular shape and the lens barrel 3 mounted with the imaging lens and detachably attachable to the apparatus main body 2. As shown in FIGS. 4 and 5, the imaging apparatus 1 is mounted with a battery pack 4 such as a lithium ion secondary battery serving as a driving power supply and an auxiliary recording medium unit 5 that is mounted on the apparatus main body 2 and houses an auxiliary recording medium other than a main recording medium. As external accessories, an external microphone 6 more excellent in directivity than a built-in microphone and a shoe adapter 7 provided with an accessory shoe to which other accessories are attached are mountable on the apparatus main body 2. A lens hood 9 is attachable to the lens barrel 3.

Figure 6:
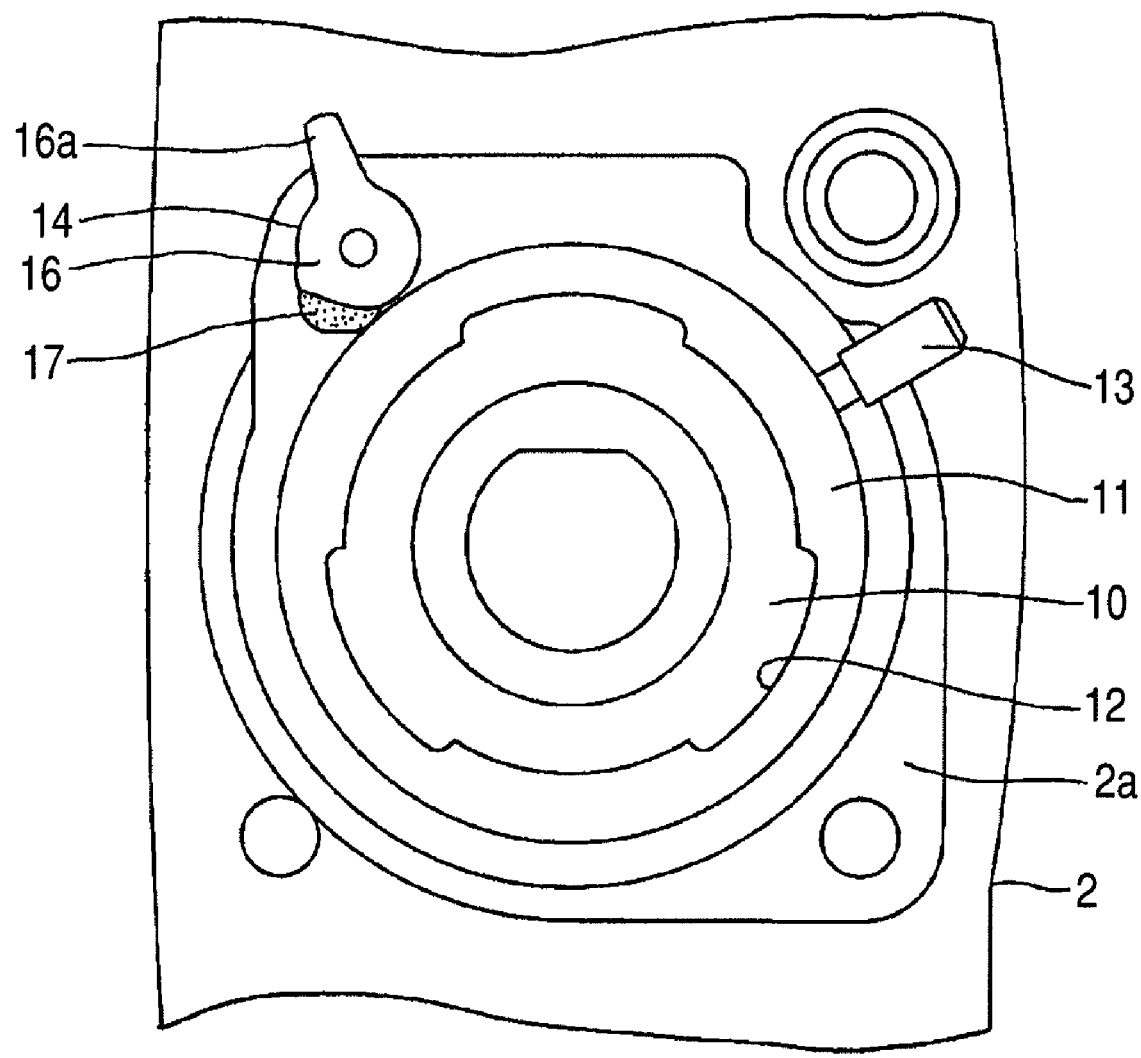
FIG. 6 is a front view showing a lens mount.

A lens mount 10 on which the lens barrel 3 is mounted is formed on a front surface 2a of the apparatus main body 2. The lens mount 10 has a mount ring 11 that is engaged with a body mount 41 formed in a rear surface 3b of the lens barrel 3. As shown in FIG. 6, in the mount ring 11, an engaging section 12 that is engaged with an outer periphery of the body mount 41 is formed in an inner peripheral surface. When an operation lever 13 is operated to rotate, operation for engaging the mount ring 11 with and disengaging the mount ring 11 from the body mount 41 is performed.

Figure 7:
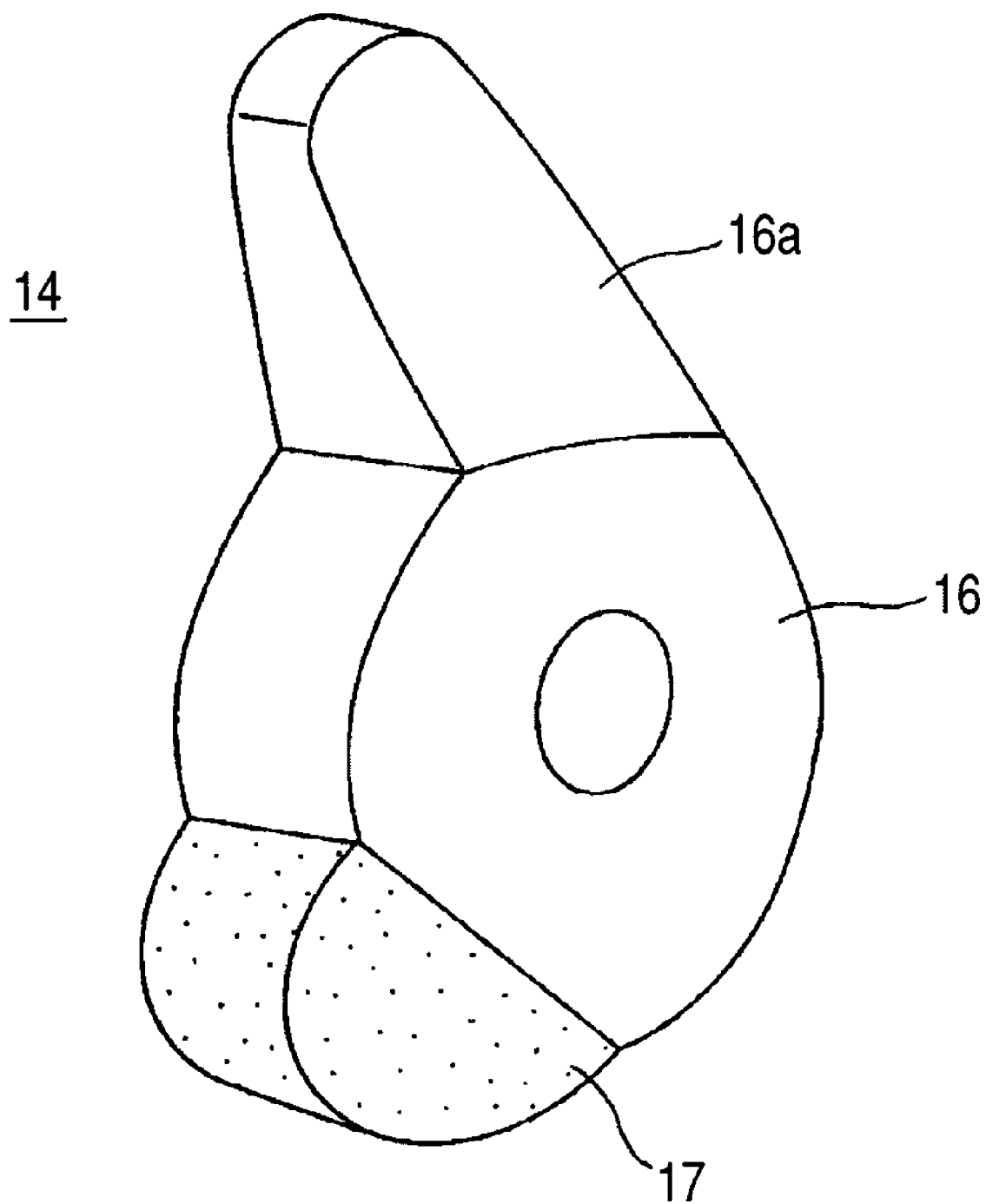
FIG. 7 is a perspective view showing a preload member.

A preload member 14 for preventing the engagement of the lens mount 10 and the lens barrel 3 from loosening is formed near the lens mount 10. As shown in FIGS. 6 and 7, the preload member 14 includes an operation piece 16a extended from a part of a main body section 16 of a substantially disc shape and an elastic member 17 that is attached to a flat section provided in an outer periphery of the main body section 16 and is brought into contact with an outer peripheral surface of the lens barrel 3. The main body section 16 is pivotally attached to the front surface 2a of the apparatus main body 2. When the operation piece 16a is operated by the camera operator, the main body section 16 is pivoted. The elastic member 17 attached to the main body section 16 is formed in a substantially arcuate shape. The outer peripheral surface of the lens barrel 3 mounted on the lens mount 10 is located on a pivoting locus of the elastic member 17.

Before the lens barrel 3 is mounted on the lens mount 10, the elastic member 17 of such a preload member 14 is pivoted to a position further retracted than a mounting position of the lens barrel 3. When the lens barrel 3 is mounted, the operation piece 16a of the preload member 14 is pivoted by the camera operator and the elastic member 17 thereof is pressed against the outer peripheral surface of the lens barrel 3. Consequently, the preload member 14 can prevent the engagement of the lens barrel 3 and the lens mount 10 from loosening.

As shown in FIG. 2, an operation unit 15 for performing various kinds of operation of the imaging apparatus 1 is provided on a right side surface 2b of the apparatus main body 2.

As shown in FIGS. 1 and 3, a recording and reproducing unit 20 that records and reproduces videos captured from the lens barrel 3 is formed on a left side surface 2c of the apparatus main body 2. When the lens barrel 3 is mounted on the apparatus main body 2, a grip section 42 provided in the lens barrel 3 is extended to the left side surface 2c of the apparatus main body 2.

The recording and reproducing unit 20 includes a deck unit in which a tape cartridge such as a mini DV cassette serving as a main recording medium of the imaging apparatus 1 is inserted and driven and a head unit that records an information signal in and reproduces the information signal from the tape cartridge. In the recording and reproducing unit 20, an inclined surface 20a that is formed to swell on the left side surface 2c of the apparatus main body 2 and inclines to the left side surface 2c side over a rear surface 2d side to the front surface 2a side of the apparatus main body 2 is formed. When the lens barrel 3 is mounted on the apparatus main body 2, the recording and reproducing unit 20 is brought close to the grip section 42 that extends to the left side surface 2c of the apparatus main body 2. In this case, since the inclined surface 20a inclining to the left side surface 2c is provided on the front surface 2a side of the apparatus main body 2, the recording and reproducing unit 20 does not interfere with fingers of a camera operator who grasps the grip section 42. The camera operator can perform smooth grip operation and imaging operation.

In such a recording and reproducing unit 20, when a lid member 21 forming an outer housing of the apparatus main body 2 is pivoted sideways according to slide operation of an opening button 21a, the deck unit is exposed to the outside. The tape cartridge is inserted and detached from the rear surface 2d side of the apparatus main body 2. As shown in FIG. 3, the tape cartridge inserted in the deck unit is held to be inclined to the left side surface 2c side toward the front surface 2a side of the apparatus main body 2 in the same manner as the inclined surface 20a.

In the rear surface 2d of the apparatus main body 2, a battery housing section 22 in which the battery pack 4 serving as the driving source of the imaging apparatus 1 is housed and a mounting section 23 on which the auxiliary recording medium unit 5 described later is mounted are formed. The battery housing section 22 and the mounting section 23 are continuously formed from the rear surface 2d of the apparatus main body 2 to the front surface 2a side. After the battery pack 4 is housed, the auxiliary recording medium unit 5 is mounted to cover the battery pack 4 from the rear surface 2d side.

In such a battery housing section 22, a hosing space is formed from an opening 25 provided in the rear surface 2d of the apparatus main body 2 to the front surface 2a side. As shown in FIG. 5, an engaging protrusion 26 with which an engaging recess 28 formed in an outer peripheral surface of the battery pack 4 is engaged is formed on an inner side of the battery housing section 22. When the battery pack 4 is inserted, the battery pack 4 is inserted from the opening 25 to the front surface 2a side and slid to a lower surface side, whereby the engaging recess 28 engages with the engaging protrusion 26. A not-shown main-body-side terminal section is formed on a lower surface section of the battery housing section 22. When the battery pack 4 is inserted, the main-body-side terminal section is connected to a battery-side terminal section.

In the opening 25, an inserting section 27 in which a finger of the camera operator can be inserted is formed on an upper surface side to extend to the inside of the battery housing section 22. Consequently, the camera operator can pick up the battery pack 4 and insert and slide the battery pack 4 to the depth of the battery housing section 22. As shown in FIG. 3, since the battery pack 4 is attached in the depth of the apparatus main body 2, the battery pack 4 is attached further on the front surface 2a side of the apparatus main body 2 and adjacent to the recording and reproducing unit 20.

The batter pack 4 housed in the battery housing section 22 is formed by combining an upper case 4a in which plural cells of a lithium ion secondary battery are housed and a lower case 4b in which a battery terminal section including an electrode terminal that is connected to a protection circuit and to which positive and negative electrodes of the cells are connected and an information terminal that communicates various kinds of information such as remaining power and a capacity is exposed to the outside. The engaging recess 28 that engages with the engaging protrusion 26 formed in the battery housing section 22 is formed in the lower case 4b.

As the battery pack 4, a large-capacity L-size battery in which a large number of cells are housed and a small and light S-size battery in which a small number of cells are housed are prepared. Both the batteries can be housed in the battery housing section 22 and properly used according to uses.

The mounting section 23 formed on the rear surface 2d of the apparatus main body 2 is described in detail later together with the auxiliary recording medium unit 5.

A handle section 30 is formed on an upper surface 2e of the apparatus main body 2. The handle section 30 is formed over a front to rear direction substantially in the center of a width direction of the upper surface 2e of the apparatus main body 2. The camera operator can hold the apparatus main body 2 with sufficient balance by gripping the handle section 30 during imaging and transportation. As shown in FIG. 2, the handle section 30 includes a front leg section 30a inclined forward on the front surface 2a side of the apparatus main body 2, a rear leg section 30b provided on a rear surface side of the apparatus main body 2, and a gripping section 30c that couples the front leg section 30a and the rear leg section 30b. In the gripping section 30c, a recording button and a zoom lever that can be operated even when the gripping section 30c is gripped are provided. An attachment hole 30d to which a tripod and various accessories can be attached is also provided.

A pedestal section 31 including an operation board is formed in front of the gripping section 30c. A liquid crystal display panel 32 that displays a video captured from the lens barrel 3 is pivotally provided on the pedestal section 31. The liquid crystal display panel 32 is supported by a hinge mechanism provided at an end of the pedestal section 31 and is pivotable between a closed position where a display surface thereof is opposed to the operation board of the pedestal section 31 and a display position where the display surface is directed outward to expose the operation board. In the display position, the liquid crystal display panel 32 can be directed from above the apparatus main body 2 to arbitrary directions, i.e., front, below, and rear. It is possible to cope with any imaging posture and cause a person being imaged to visually recognize a video.

As shown in FIG. 4, a shoe attaching section 33 to which the shoe adapter 7 is attached is formed on a front surface of the pedestal section 31. A microphone holder 34 to which the external microphone 6 is attached is formed to project on the left side surface 2c side of the apparatus main body 2 of the pedestal section 31. The shoe attaching section 33 and the microphone holder 34 are described in detail later together with the shoe adapter 7 and the external microphone 6.

A finder unit 35 for visually recognizing a video captured from the lens barrel 3 is provided behind the gripping section 30c. The finder unit 35 includes a display unit 36 that is provided to project to the rear surface 2d side substantially in parallel to an optical axis direction of the apparatus main body 2 and incorporates a display panel such as an LCD that displays the captured video and an eyepiece member 37 provided to be detachably attachable to the display unit 36. In the display unit 36, the LCD is exposed to the outside and a coupling piece for coupling to the eyepiece member 37 and an operation button for operating the coupling piece are formed. In the eyepiece member 37, a coupling section that is coupled to the display unit 36, a lens group that changes a magnification of the LCD, a moving member that moves the lens group in an optical axis direction, and an eye cup on which the camera operator places an eye are formed.

Since the display unit 36 is pivotable to an upper part of a rear end of the gripping section 30c, the finder unit 35 can cope with any imaging posture. In the finder unit 35, since the eyepiece member 37 can be detachably attachable to the display unit 36, various eyepiece units with different eye cups and lens groups can be used according to uses.

A screw hole (not shown) for attaching the tripod is provided closer to the front surface 2a in a lower surface 2f of the apparatus main body 2. A lower surface opening 38 that continues to the opening 25 provided in the rear surface 2d is formed on the rear surface 2d side of the lower surfaced 2f.

The lower surface opening 38 forms, together with the inserting section 27 described above, a space in which a finger of the camera operator is inserted when the battery pack 4 is inserted and detached.

The lens barrel 3 that is attached to the front surface 2a of such an apparatus main body 2 is explained. The lens barrel 3 is formed in a cylindrical shape. A hood mount 110 to which the lens hood 9 is attached is formed on the front surface 3a. A body mount 41 that is mounted on the lens mount 10 formed on the front surface 2a of the apparatus main body 2 is provided on the rear surface 3b of the lens barrel 3. The body mount 41 is inserted through the mount ring 11 of the lens mount 10 and can engage with the engaging section 12 formed in an inner peripheral surface of the mount ring 11.

The grip section 42 serving as a grip section of the imaging apparatus 1 when the lens barrel 3 is mounted on the apparatus main body 2 is formed on the left side surface 3c of the lens barrel 3. The camera operator grips the grip section 42 with the right hand and performs imaging operation. In the grip section 42, a grip main body 43 formed in a substantially rectangular shape and gripped by the palm and the fingers excluding the thumb of the camera operator and a supporting section 44 formed to swell sideways from a rear surface side of the grip main body 43 and supported between the thumb and the index finger of the camera operator are formed.

In the grip main body 43, an imaging start button, a zoom lever for changing a magnification, and the like are disposed on an upper surface and a rear surface on which the fingers of the camera operator are located. The camera operator can hold the apparatus main body 2 with the right hand and perform various kinds of operation in that state. In the grip main body 43, a grip belt 45 that supports the gripping of the imaging apparatus 1 by the camera operator is provided on a side thereof. The grip belt 45 is laid over between a front surface section of the grip main body 43 and the supporting section 44 to thereby support the back of the right hand of the camera operator who grips the grip main body 43. Consequently, the camera operator can easily perform gripping and imaging operation of the imaging apparatus 1 with the right hand.

In such a grip section 42, as shown in FIG. 3, a protrusion is formed further in a rear surface direction than the rear surface 3b of the lens barrel 3. When the lens barrel 3 is mounted on the apparatus main body 2, the protrusion is extended to the left side surface 2c of the apparatus main body 2. Consequently, when the lens barrel 3 is mounted on the apparatus main body 2, the grip section 42 is located near the center of gravity of the imaging apparatus 1. Therefore, as shown in FIGS. 8A and 8B, when the camera operator grips the grip section 42, since the center of gravity of the imaging apparatus 1 is supported, it is possible to support the imaging apparatus 1 with sufficient balance and reduce a burden on the camera operator.

As described above, since the imaging apparatus 1 is a handy type for holding the entire imaging apparatus 1 simply by gripping the grip section 42 with one hand, it is desirable that the camera operator can hold the imaging apparatus 1 with sufficient balance. In the imaging apparatus 1, the lens barrel 3 is detachably attachable to the apparatus main body 2. Various lens barrels 3 having different magnifications can be mounted on the imaging apparatus 1. Whereas there is only one apparatus main body 2, the lens barrels 3 have different sizes and weights depending on types thereof. Therefore, a weight balance of imaging apparatus 1 depends on the lens barrel 3 mounted on the apparatus main body 2. However, no matter which lens barrel 3 is mounted, it is desired that the imaging apparatus 1 can be held with sufficient balance.

In this regard, since the grip section 42 projects further in the rear surface direction from the rear surface 3b and is extended to the left side surface 2c of the apparatus main body 2, the grip section 42 is provided over the apparatus main body 2 of the imaging apparatus 1 and the lens barrel 3. No matter which lens barrel 3 is mounted, the grip section 42 is located near the center of gravity of the imaging apparatus 1. Therefore, the camera operator supports near the center of gravity of the imaging apparatus 1 by gripping the grip section 42. The camera operator can hold the imaging apparatus 1 while keeping a balance and reduce a burden on the arm.

As shown in FIG. 8A, in the imaging apparatus 1, since the recording and reproducing unit 20 is formed on the left side surface 2c side of the apparatus main body 2 to which the grip section 42 is extended, the center of gravity is present on the left side surface 2c side of the apparatus main body 2. Therefore, since the center of gravity is biased to the grip section 42 side, the camera operator supports the center of gravity of the imaging apparatus 1 by gripping the grip section 42. The camera operator can grip the imaging apparatus 1 while keeping a balance and reduce a burden on the arm.

In the imaging apparatus 1, the battery housing section 22 is provided further in the depth than the opening 25 formed in the rear surface 2d of the apparatus main body 2. As shown in FIG. 3, the battery pack 4 having relatively large weight is attached further on the front surface 2a side. Therefore, in the imaging apparatus 1, the center of gravity is present further on the front surface 2a side. The camera operator supports the center of gravity by gripping the grip section 42.

In the imaging apparatus 1, the microphone holder 34 is formed to project from the pedestal section 31 to the left side surface 2c side of the apparatus main body 2. As describe later, the external microphone 6 is attached to the left side surface 2c side. Consequently, in the imaging apparatus 1, since the center of gravity is further biased to the left side surface 2c side of the apparatus main body 2, the camera operator supports the center of gravity by gripping the grip section 42 extended to the left side surface 2c side.

In this way, in the imaging apparatus 1, a layout in which the center of gravity is biased to the front surface 2a side on the left side surface 2c side of the apparatus main body 2 to which the grip section 42 extends is adopted. Therefore, the camera operator supports the center of gravity by gripping the grip section 42. The camera operator can reduce a burden on the arm of the camera operator while keeping a balance.

An inner side surface of the grip section 42 opposed to the left side surface 2c of the apparatus main body 2 is designed to be generally flush with the left side surface 2c of the apparatus main body 2 when the lens barrel 3 is mounted on the apparatus main body 2. Therefore, in the imaging apparatus 1, even when the lens barrel 3 is replaced, the grip section 42 projecting to the left side surface 2c side of the apparatus main body 2 does not interfere with the apparatus main body 2 and the lens barrel 3 can be mounted on the apparatus main body 2.

In the apparatus main body 2, since the screw hole for attaching the tripod is provide on the front surface 2a side of the lower surface 2f, the tripod is attached near the center of gravity. Therefore, the imaging apparatus 1 can be attached to the tripod with sufficient balance and can perform stable imaging while preventing swinging.

The shoe attaching section 33 formed in the pedestal section 31 of the apparatus main body 2 and the shoe adapter 7 that is attached to the shoe attaching section 33 are explained.

Figure 9:
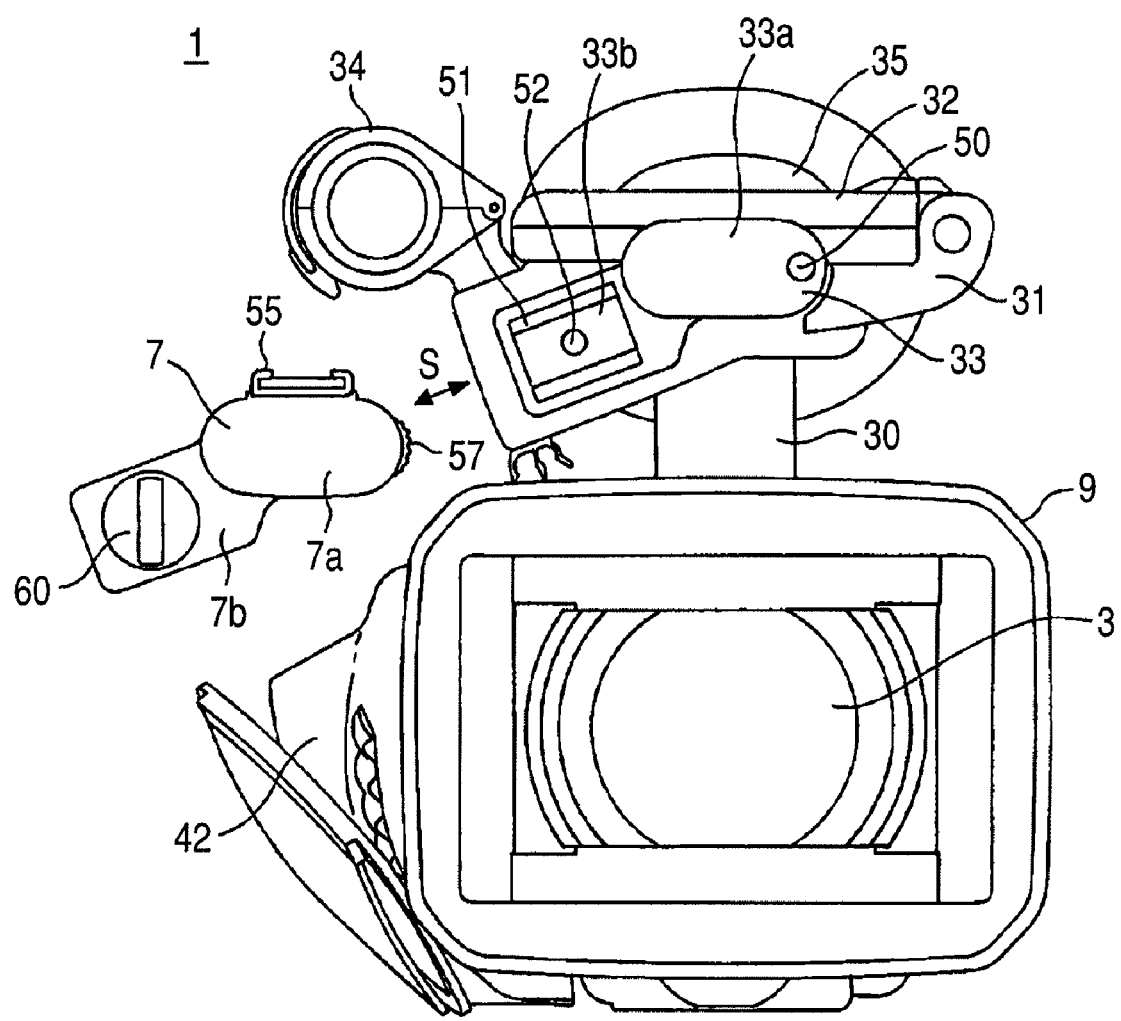
FIG. 9 is a front view showing a direction of mounting a shoe adapter on an apparatus main body.

The shoe attaching section 33 is provided on a front surface of the pedestal section 31. As shown in FIG. 9, the shoe attaching section 33 is attached and detached by sliding the shoe adapter 7 in an arrow S direction in FIG. 9 from the left side surface 2c side of the apparatus main body 2.

The shoe attaching section 33 includes a supporting surface section 33a that is formed in an elliptical shape and supports an adapter main body 7a of the shoe adapter 7 and an engaging surface section 33b that engages with a guide section 7b of the shoe adapter 7. In the supporting surface section 33a, a first screw hole 50 through which a first attaching screw 56 formed in the adapter main body 7a is inserted is formed. The engaging surface section 33b is inclined downward to the left side surface 2c side of the apparatus main body 2 from the supporting surface section 33a. In the engaging surface section 33b, a guide protrusion 51 on which a guide rail 58 formed in the guide section 7b slides is formed. The guide protrusion 51 is a rectangular protrusion. Recessed grooves with which the guide rail 58 engages are formed in an upper side and a lower side of the guide protrusion 51. The shoe adapter 7 is attached to and detached from the shoe attaching section 33 when the guide rail 58 engages with the guide protrusion 51 and slides. In the guide protrusion 51, a second screw hole 52 through which a second attaching screw 59 formed in the guide section 7b of the shoe adapter 7 is inserted is formed in substantially the center of the guide protrusion 51.

The shoe adapter 7 attached to and detached from such a shoe attaching section 33 includes, as shown in FIGS. 10A to 10D and FIG. 11, the adapter main body 7a to which various accessories are attached and the guide section 7b that is guided by the shoe attaching section 33. The adapter main body 7a is formed in an elliptical shape in section, which is substantially identical with the supporting surface section 33a of the shoe attaching section 33. An accessory shoe 55 to which accessories are attached is formed on an upper surface of the adapter main body 7a. In the accessory shoe 55, a pair of engaging walls opposed to each other are formed over a front to rear direction of the apparatus main body 2. Various accessories are inserted and detached from a front surface side formed as an open end.

A first attaching operation unit 57 for operating a first attaching screw 56, which screws in the supporting surface section 33a of the shoe attaching section 33, is formed on a right side surface of the adapter main body 7a. The first attaching screw 56 is exposed to the outside from an attaching surface with the supporting surface section 33a of the shoe attaching section 33 and screwed with the first screw hole 50, which is provided in supporting surface section 33a, by the first attaching operation unit 57. The first attaching operation unit 57 for operating the first attaching screw 56 is pivotally formed on the right side surface of the adapter main body 7a. When the first attaching operation unit 57 is pivoted by the camera operator, the first attaching operation unit 57 rotates the first attaching screw 56 and screws the first attaching screw 56 in the first screw hole 50 formed in the supporting surface section 33a or unscrews the first attaching screw 56.

The guide section 7b that engages with the engaging surface section 33b of the shoe attaching section 33 is extended to a left side surface of the adapter main body 7a. In the guide section 7b, the guide rail 58 that slides on the guide protrusion 51 formed in the engaging surface section 33b is formed on a rear surface opposed to the engaging surface section 33b. In the guide rail 58, a pair of rail sections that engage with recessed grooves formed on an upper side and a lower side of the guide protrusion 51 are formed from lower left to upper right. The rail sections are engaged with the respective recessed grooves of the guide protrusion 51 and slid, whereby the shoe adapter 7 is attached to the shoe attaching section 33.

In the guide section 7b, the second attaching screw 59 that is screwed in the second screw hole 52 formed in the engaging surface section 33b is formed between the pair of rail sections and a second attaching operation unit 60 for rotating the second attaching screw 59 is formed in a front surface. In the second attaching operation unit 60, an operation dial is rotatably formed in the front surface of the guide section 7b. When the second attaching operation unit 60 is rotated by the camera operator, the second attaching screw 59 is screwed in the second screw hole 52 or unscrewed.

As shown in FIG. 9, such a shoe adapter 7 engages the guide rails 58 with the guide protrusion 51 from the left side surface 2c side of the apparatus main body 2 and slides the guide rails 58 to thereby bring the adapter main body 7a into contact with the supporting surface section 33a of the shoe attaching section 33 and bring the guide section 7b into contact with the engaging surface section 33b of the shoe attaching section 33. At this point, in the shoe adapter 7, the first attaching screw 56 of the adapter main body 7a is opposed to the first screw hole 50 provided in the supporting surface section 33a and the second attaching screw 59 of the guide section 7b is opposed to the second screw hole 52 provided in the engaging surface section 33b. An inner side surface of the guide section 7b is brought into contact with an end face of the guide protrusion 51, whereby a slide area of the shoe adapter 7 is regulated.

Thereafter, the first and second attaching operation units 57 and 60 are rotated by the camera operator, whereby the first attaching screw 56 is screwed in the first screw hole 50, the second attaching screw 59 is screwed in the second screw hole 52, and the shoe adapter 7 is attached to the shoe attaching section 33. When the shoe adapter 7 is removed, the first and second attaching operation units 57 and 60 are rotated to unscrew the first and second attaching screws 56 and 59 and the first and second screw holes 50 and 52 and, then, the guide rails 58 are slid from the guide protrusion 51 to the left side surface 2c side of the apparatus main body 2.

Figure 10A:
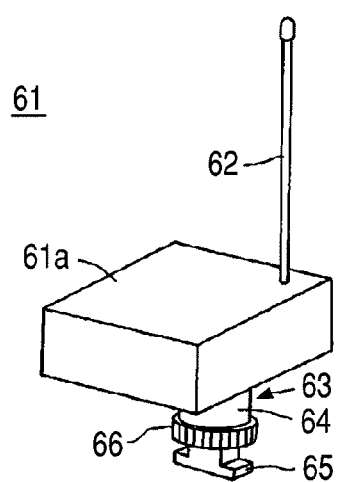
Figure 10B:
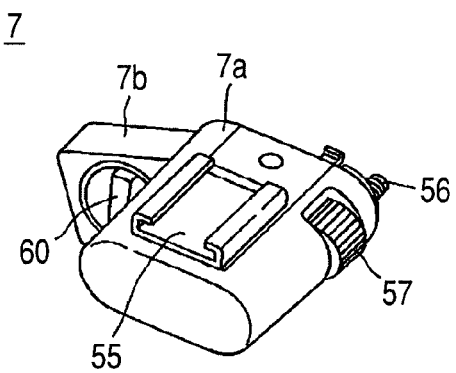
Figure 10C:
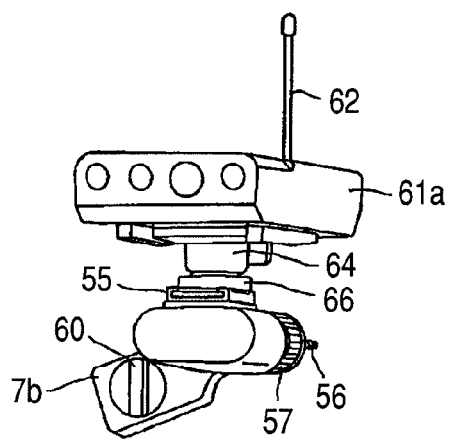
Figure 10D:
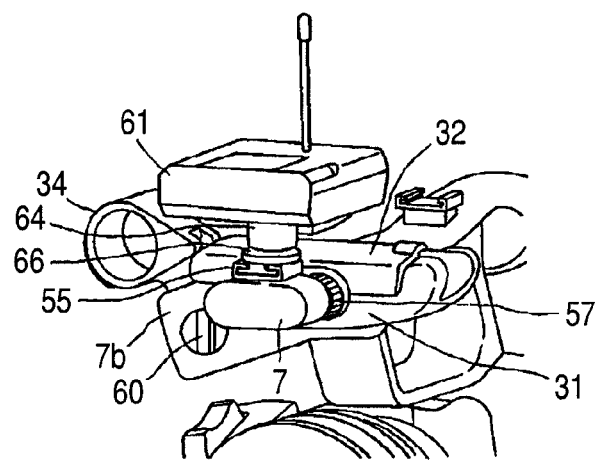
Figure 11:
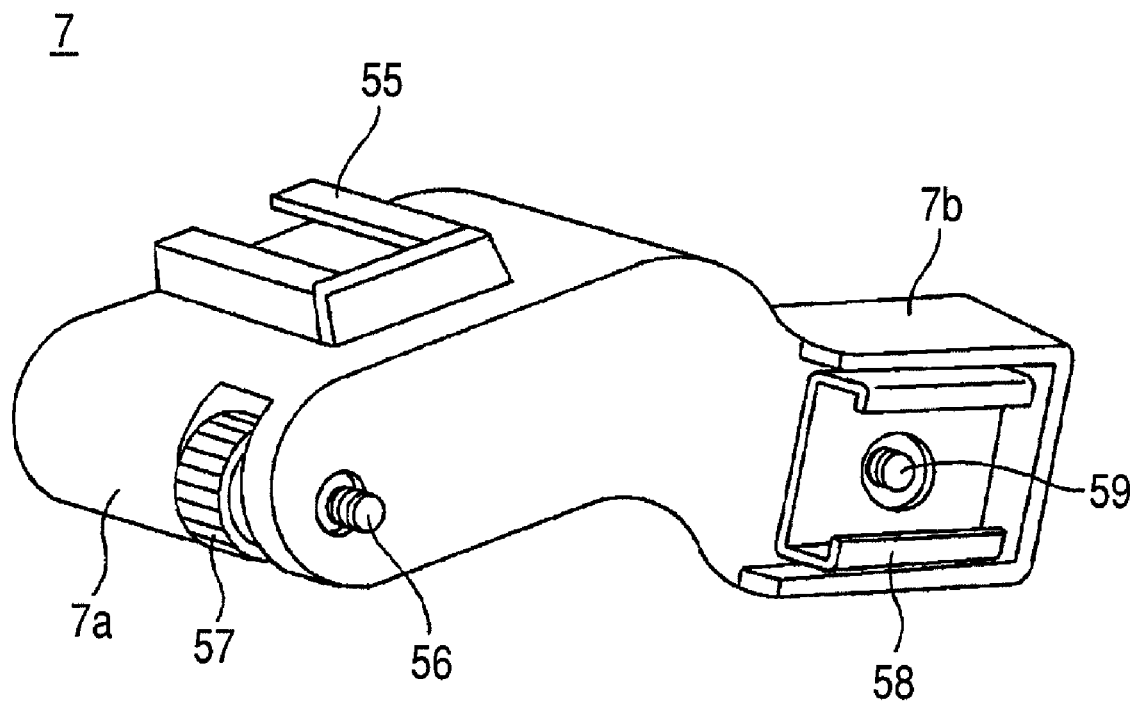
FIG. 11 is a perspective view showing the shoe adapter from a rear side thereof.

As shown in FIGS. 10A and 10C, in the shoe adapter 7, various accessories are attached to the accessory shoe 55. FIG. 10A is an example of an accessory attached to the shoe adapter 7 and shows a receiver 61 of a wireless microphone. In the receiver 61, a reception antenna 62 is vertically provided on an upper surface of a main body 61a and an attaching section 63 with the accessory shoe 55 is formed on a lower surface of the main body 61a.

In the attaching section 63, an engaging section 65 that is engaged with the accessory shoe 55 and a locking ring 66 that holds the engagement of the engaging section 65 and the accessory shoe 55 are formed in a leg section 64. In the engaging section 65, a pair of engaging pieces that are engaged with a pair of engaging walls of the accessory shoe 55 are formed. The engaging pieces engage with the pair of engaging walls and slide, whereby engagement with and disengagement from the accessory shoe 55 are performed. The locking ring 66 is a ring-like member, in an inner peripheral surface of which a screw groove is cut. The engaging ring 66 is screwed in an outer peripheral surface of the leg section 64, in which a screw groove is also cut, and rotated to be lifted and lowered. When the engaging section 65 is engaged with the accessory shoe 55, the engaging ring 66 is lowered and presses the engaging section 65 against the accessory shoe 55 or covers the engaging section 65 to lock the engaging section 65 to the accessory shoe 55.

In a state shown in FIG. 10C in which an accessory such as the receiver 61 is attached to the accessory shoe 55, the shoe adapter 7 can be attached to and detached from the shoe attaching section 33. In other words, as shown in FIG. 9, the shoe adapter 7 is slid in an arrow S direction in FIG. 9, which is a width direction of the apparatus main body 2, from the left side surface 2c side of the apparatus main body 2 to be attached to and detached from the shoe attaching section 33. The shoe adapter 7 is attached to and detached from the shoe attaching section 33 according to the operation of the first and second attaching operation units 57 and 60. Both the first and second attaching operation units 57 and 60 are made operable in a state in which an accessory is attached to the accessory shoe 55 and is made operable in a state in which the shoe adapter 7 is attached to the shoe attaching section 33. Therefore, in the imaging apparatus 1, an accessory can be attached and detached together with the shoe adapter 7 by removing the shoe adapter 7 from the shoe attaching section 33 in a state in which the accessory is attached to the accessory shoe 55.

Figure 12:
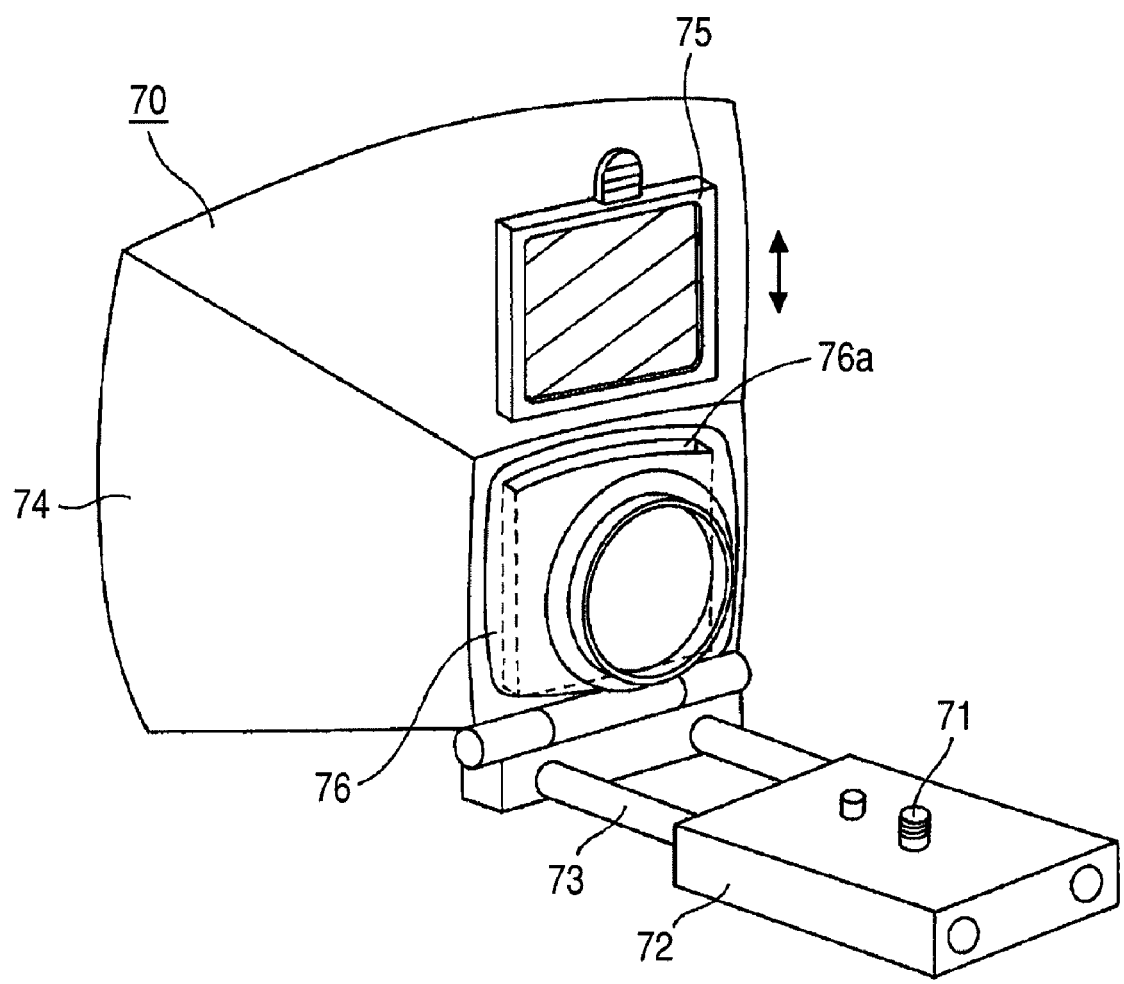
FIG. 12 is a perspective view showing an example of a mat box attached to the apparatus main body.
Figure 13:
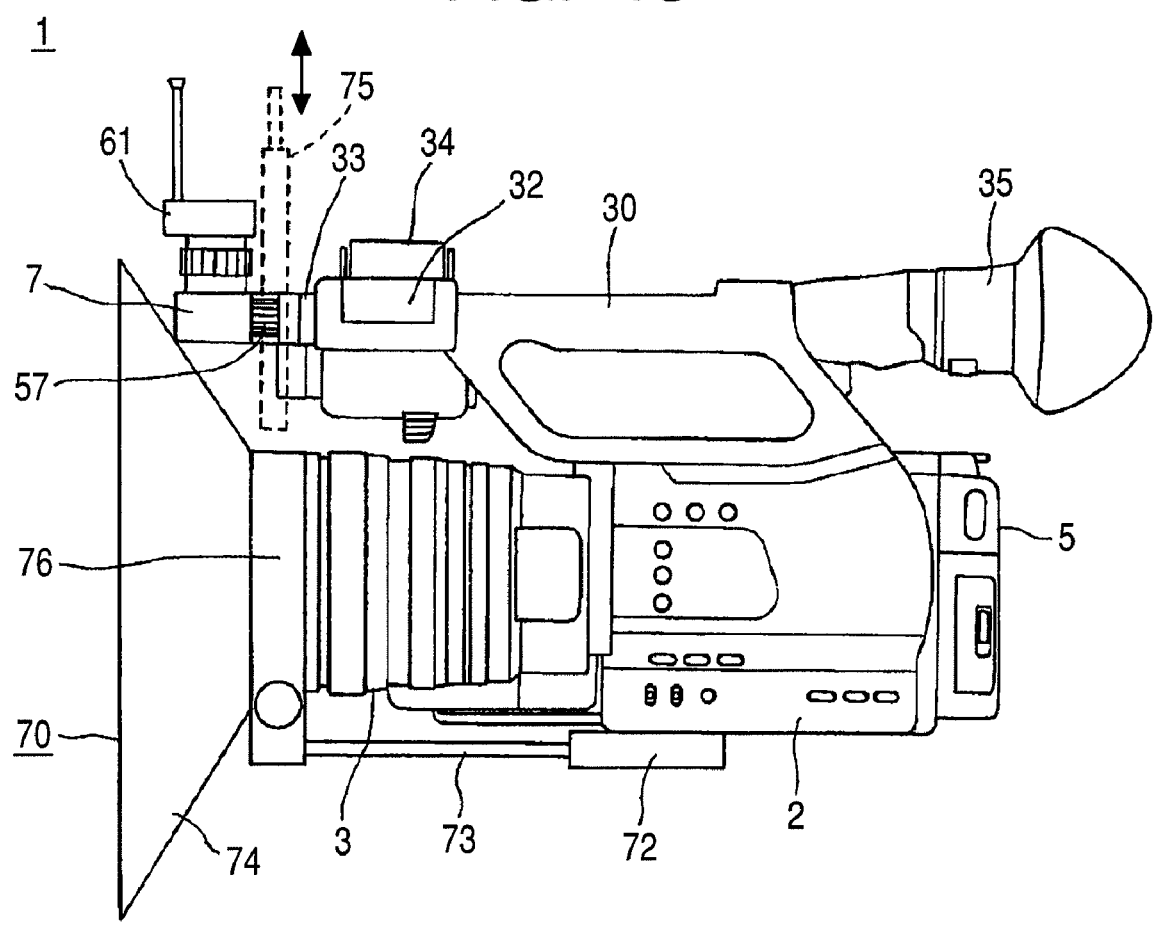
FIG. 13 is a side view showing the imaging apparatus attached with the mat box in which the accessory is attached to the shoe adapter.

As shown in FIGS. 12 and 13, an external component such as a mat box 70 may be attached to a front surface side of the lens barrel 3. The mat box 70 includes a base 72 in which an attaching screw 71 that is screwed in the screw hole for attaching the tripod formed in the lower surface 2f of the apparatus main body 2 is formed, an arm 73 for adjusting length, a hood 74 provided on the front surface side of the lens barrel 3, and a holder 76 to and from which a polarization filer 75 is inserted and detached on the front surface of the lens barrel 3. An insertion opening 76a is formed on an upper surfaced side of the holder 76. The polarization filter 75 is inserted and detached in an up to down direction of the holder 76.

In such a mat box 70, the hood 74 is arranged in front of the shoe adapter 7. Therefore, unless there is enough room in a space between the shoe adapter 7 and the mat box 70, when an accessory attached to the accessory shoe 55 is slid forward, the accessory collides with the mat box 70 and may be unable to be removed. If the mat box 70 is removed every time the accessory is attached and detached, attaching and detaching work is complicated.

In this regard, in the imaging apparatus 1, the shoe adapter 7 is slid in the width direction of the apparatus main body 2 to be attached to and detached from the shoe attaching section 33. In the imaging apparatus 1, the first attaching operation unit 57 for attaching and detaching the shoe adapter 7 to and from the shoe attaching section 33 is provided on the right side surface of the adapter main body 7a and the second attaching operation unit 60 is provided on the front surface of the guide section 7b. Since both the operation units can be operated even in a state in which the accessory is attached to the accessory shoe 55 and the mat box 70 is attached to the lens barrel 3, the accessory can be removed from the apparatus main body 2 together with the shoe adapter 7. Therefore, in the imaging apparatus 1, the accessory can be attached and detached without interfering with the mat box 70 and workability can be improved.

When the polarization filter 75 is inserted and detached, since the accessory can be removed from the apparatus main body 2 together with the shoe adapter 7, it is possible to simplify work compared with the removal of the shoe adapter 7 after the removal of the accessory from the accessory shoe 55. In a state in which the shoe adapter 7 is not attached, since the shoe attaching section 33 is formed in a position retracted to a rear surface side from an insertion and detachment area of the polarization filter 75, the polarization filter 75 can be inserted and detached without colliding with the shoe attaching section 33.

Figure 14:
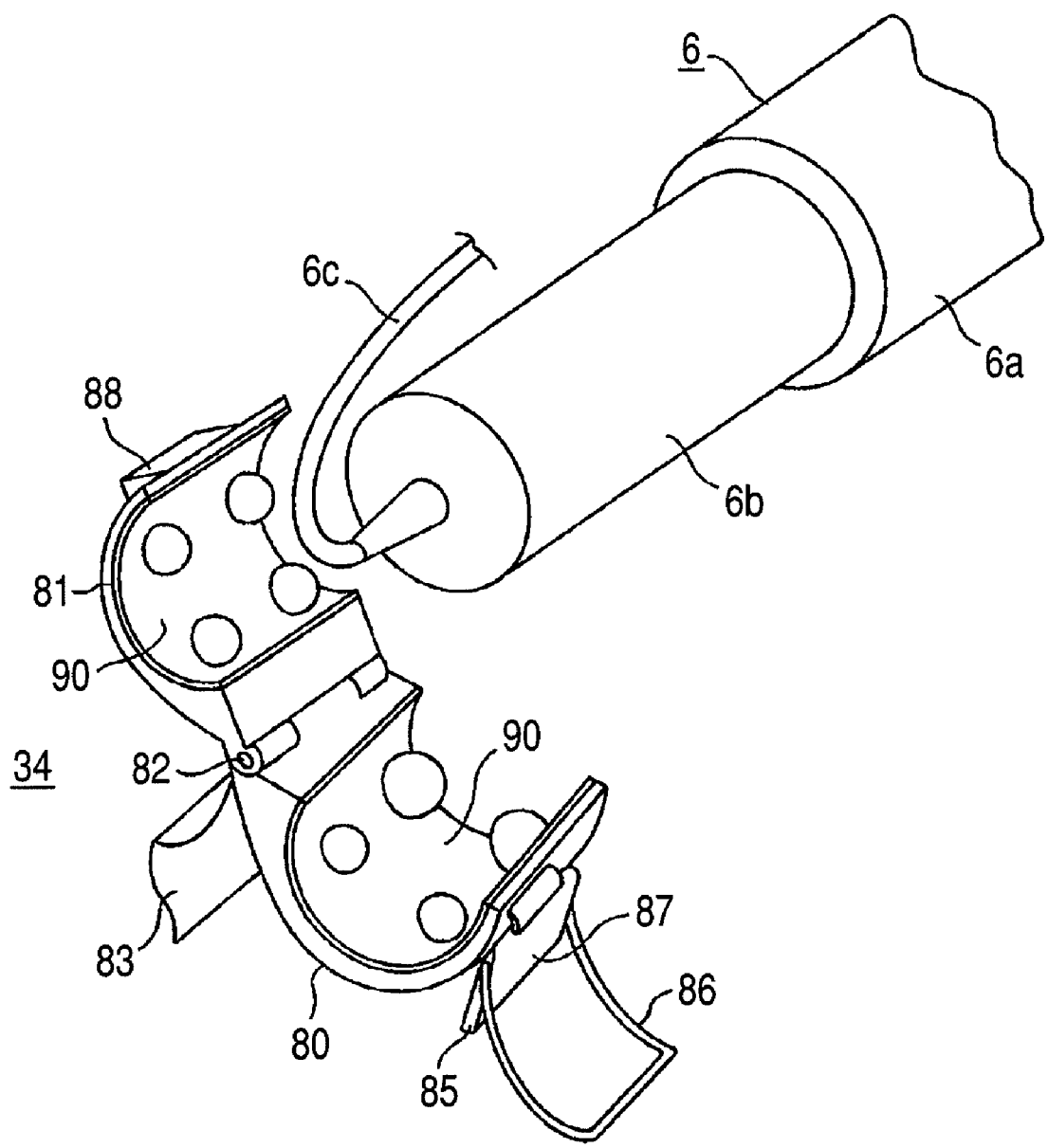
FIG. 14 is a perspective view showing a microphone holder.

The microphone holder 34 formed on the left side surface 2c side of the pedestal section 31 is explained. An external microphone 6 that is used instead of the built-in microphone of the apparatus main body 2 is attached to the microphone holder 34. The external microphone 6 has unidirectionality for making it possible to catch remote sound when a subject in a remote location is imaged. As shown in FIG. 14, the external microphone 6 includes a sound collecting section 6a formed in a cylindrical shape, a gripping section 6b formed in a cylindrical shape that is provided continuously from the sound collecting section 6a and is thin compared with the sound collecting section 6a, and a cable section 6c that is connected to an end of the gripping section 6b on the opposite side of the sound collecting section 6a. An end of the cable section 6c on the opposite side of the gripping section 6b is detachably connected to a microphone terminal 78 exposed on a left side surface of the pedestal section 31.

Figure 15A:
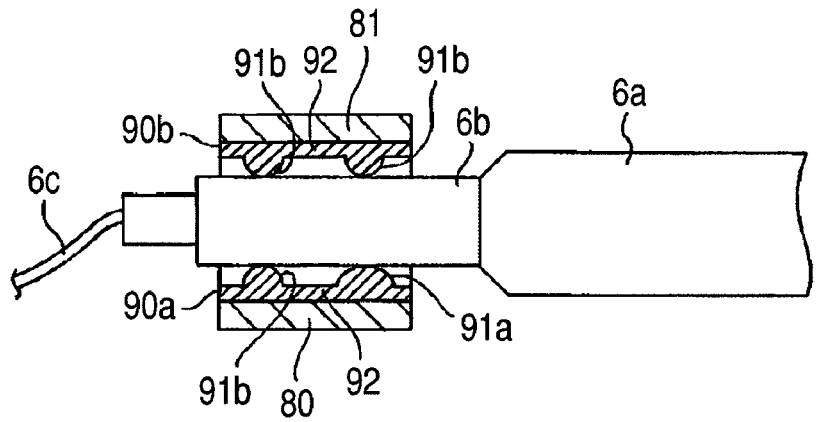
FIGS. 15A to 15C are sectional views showing the microphone holder attached with an external microphone.
Figure 15B:
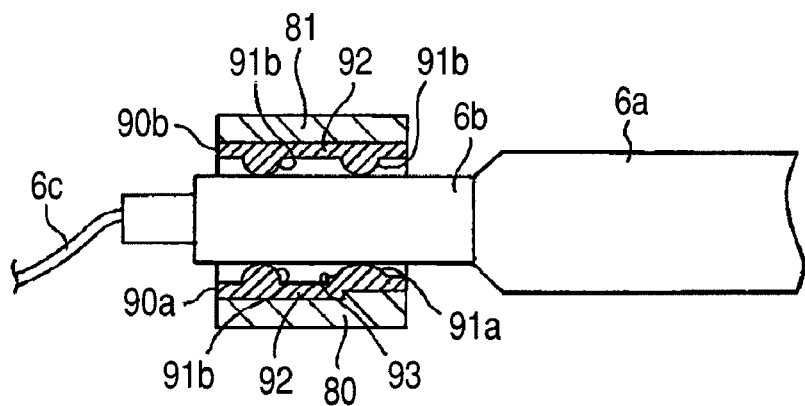
Figure 15C:
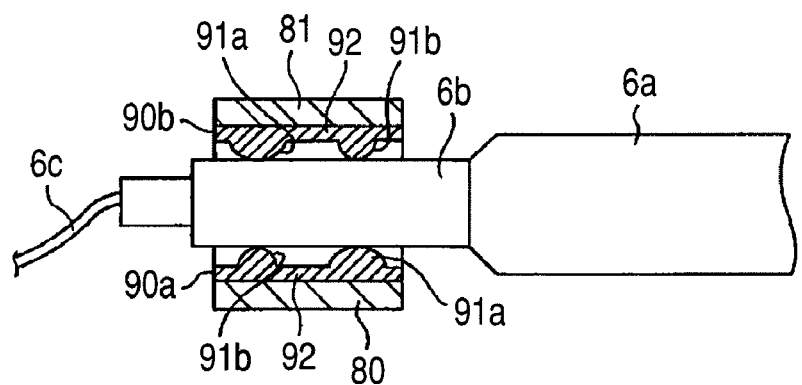
Figure 16:
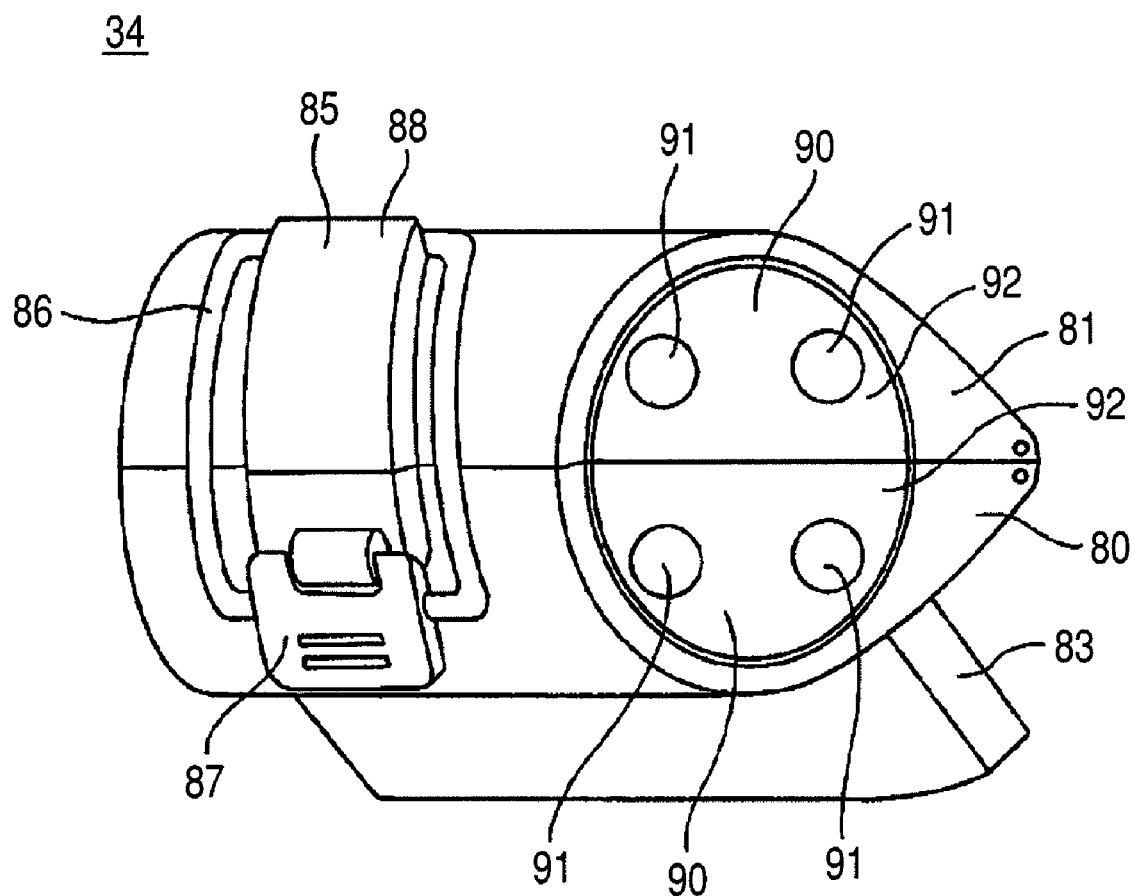
FIG. 16 is a perspective view showing the microphone holder in which clamping pieces are locked to each other.

The microphone holder 34 that holds such an external microphone 6 includes, as shown in FIGS. 14 to 16, a first clamping piece 80 and a second clamping piece 81 having a shape obtained by dividing a cylindrical body into to in an axial direction thereof. Both the clamping pieces 80 and 81 are pivotally coupled by hinge means 82 in one contact portion at the time when the clamping pieces are joined into a cylindrical shape.

A coupling member 83 for coupling to the pedestal section 31 is connected to an outer periphery of the first clamping piece 80. The first clamping piece 80 is connected to the pedestal section 31 via the coupling member 83. Therefore, in the microphone holder 34, the second clamping piece 81 is pivoted by the hinge means 82 with the contact portion in contact with the first clamping piece 80 as a fulcrum. Consequently, in the microphone holder 34, the first clamping piece 80 and the second clamping piece 81 clamp the gripping section 6b of the external microphone 6 from a lower side and an upper side, respectively.

In the first clamping piece 80 and the second clamping piece 81, a lock mechanism 85 for clamping the external microphone 6 is formed. The lock mechanism 85 includes a locking arm 86 and an operation piece 87 for operating the locking arm formed in an outer periphery of the first clamping piece and a locking protrusion 88, to which the locking arm 86 is locked, formed in an outer periphery of the second clamping piece 81.

The locking arm 86 is formed in a substantially rectangular shape. One end in a longitudinal direction thereof is pivotally supported by the operation piece 87. The other end in the longitudinal direction can be locked to the locking protrusion formed in the second clamping piece 81. One end of the operation piece 87 is pivotally supported by the outer periphery of the first clamping piece 80. The other end as a free end of the operation piece 87 is pivoted to engage and disengage the locking arm 86 and the locking protrusion 88. The locking protrusion 88 is protrudingly provided in the outer periphery of the second clamping piece 81. A locking groove in which the locking arm 86 is locked is formed in an end face on the opposite side of the first clamping piece 80.

After the second clamping piece 81 is pivoted upward to place the gripping section 6b of the external microphone 6 on an inner surface of the first clamping piece 80, the second clamping piece 81 is pivoted downward to be locked to the first clamping piece 80, whereby the lock mechanism 85 holds the gripping section 6b of the external microphone 6. Specifically, the locking arm 86 is locked in the locking groove of the locking protrusion 88 and the operation piece 87 is pivoted to an outer peripheral surface side of the first clamping piece 80, whereby the lock mechanism 85 regulates pivoting of the locking arm 86. When the external microphone 6 is removed, the operation piece 87 is pivoted upward from the outer peripheral surface of the first clamping piece 80 and the locking arm 86 is unlocked from the locking groove of the locking protrusion 88, whereby the lock mechanism 85 allows the second clamping piece 81 to pivot.

Figure 17:
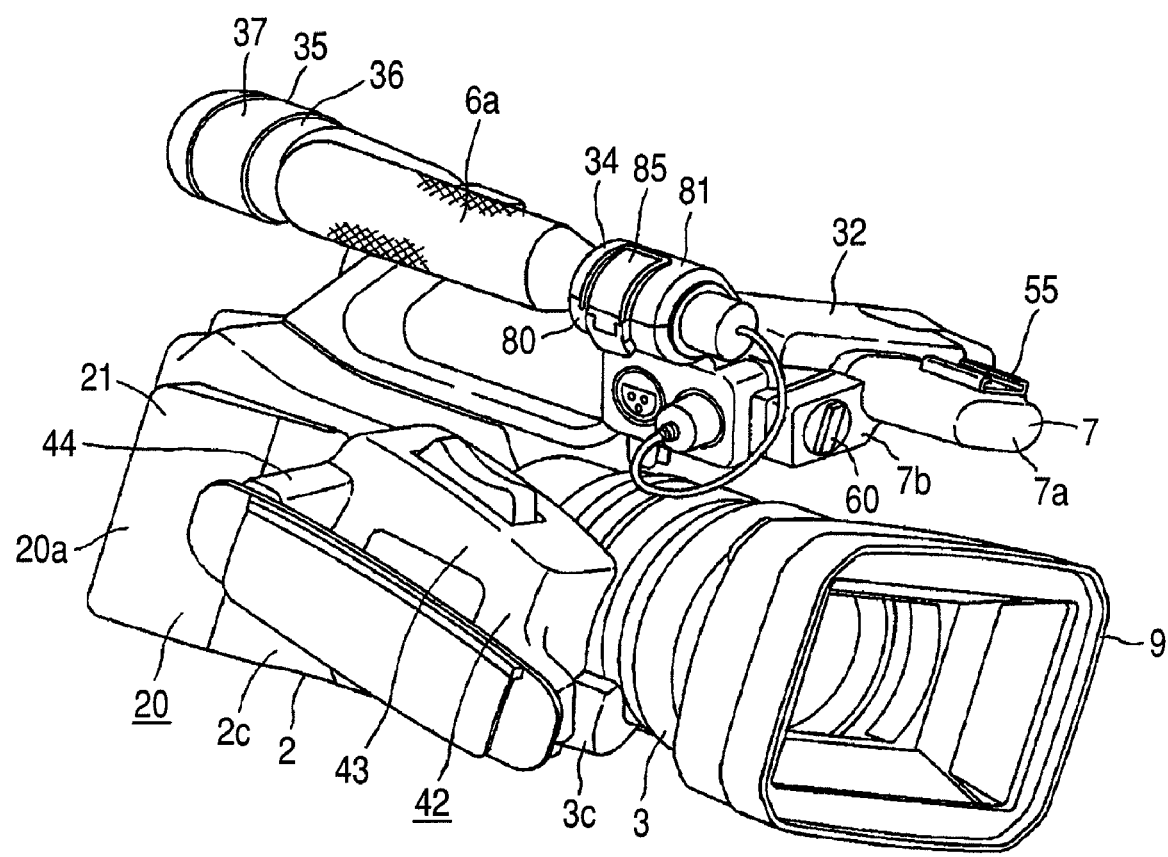
FIG. 17 is a perspective view showing the imaging apparatus mounted with the external microphone facing a rear side of the imaging apparatus.

In this way, in the microphone holder 34, the first clamping piece 80 and the second clamping piece 81 are locked by the lock mechanism 85 to attach and detach the external microphone 6. Therefore, attaching and detaching work for the external microphone 6 can be simply performed by simply performing pivoting operation for the operation piece 87. Therefore, for example, as shown in FIG. 17, when the external microphone 6 is attached to the microphone holder 34 again with the sound collecting section 6a directed to the rear surface side to put the imaging apparatus 1 back to a storage case or when the imaging apparatus 1 is taken out from the storage case and the external microphone 6 is attached again with the sound collecting section 6a directed to the front surface side, it is possible to easily and quickly perform attaching and detaching work for the external microphone 6.

An elastic sheet 90 that supports the gripping section 6b of the external microphone 6 is formed on inner surfaces of the first and second clamping pieces 80 and 81 of such a microphone holder 34. The elastic sheet 90 is provided with elastic protrusions 91 and supports the gripping section 6b with the elastic protrusions 91 to thereby prevent noise due to vibration and the like from being transmitted to the external microphone 6 via the microphone holder 34 and support the external microphone 6 horizontally.

Such an elastic sheet 90 is formed by molding elastic resin such as rubber and includes sheet sections 92 that are stuck to respective inner peripheral surfaces of the first and second clamping pieces 80 and 81 and plural elastic protrusions 91 that are molded on the sheet section 92 and come into contact with the gripping section 6b of the external microphone 6. When the first clamping piece 80 and the second clamping piece 81 of the microphone holder 34 are locked by the lock mechanism 85, the elastic sheet 90 supports the gripping section 6b of the external microphone 6 from upper and lower directions with the elastic protrusions 91.

For example, four elastic protrusions 91 are arranged in each of the sheet sections 92 at equal intervals. When the first and second clamping pieces 80 and 81 are butted against each other, the elastic protrusions 91 are opposed to each other and support the gripping section 6b from the upper and lower directions. In a first elastic sheet 90a stuck to the first clamping piece 80, two elastic protrusions 91a provided on the front surface 2a side of the apparatus main body 2 are formed higher than two elastic protrusions 91b provided on the rear surface 2d side of the apparatus main body 2 and respective elastic protrusions 91b of a second elastic sheet 90b stuck to the second clamping piece 81.

Therefore, as shown in FIG. 15A, when the first and second clamping pieces 80 and 81 are butted against each other, the microphone holder 34 supports a front side of the gripping section 6b of the external microphone 6 with the elastic protrusions 91a formed on a front side of the first elastic sheet 90a that supports the gripping section 6b of the external microphone 6 from a lower side. Therefore, in the external microphone 6, the sound collecting section 6a is prevented from hanging down with own weight thereof and is kept horizontal.

As shown in FIG. 15B, in the microphone holder 34, steps 93 higher on a front surface side may be provided on the inner surface of the first clamping piece 80, which supports the gripping section 6b of the external microphone 6 from a lower side, and the first elastic sheet 90a, whereby the height of the elastic protrusion 91a on the front surface 2a side may be set relatively high. In this case, the two elastic protrusions 91a formed on the front surface side of the first elastic sheet 90a only have to have height same as that of the two elastic protrusions 91b provided on the rear surface side and the respective elastic protrusions 91b of the second elastic sheet 90b. With such a configuration, in the external microphone 6, the front side of the gripping section 6b is supported high and the sound collecting section 6a is prevented from hanging down with own weight thereof and kept horizontal. In this case, as in the above case, the elastic protrusions 91a that support the front side of the gripping section 6b from downward may be formed higher than the other elastic protrusions 91b.

In the first clamping piece 80, other than providing the step on the inner surface, an inclined surface rising to the front surface side maybe provided. A step or inclination higher on the front surface side may be formed in the first clamping piece 80 and a step or inclination lower on the rear surface side may be formed in the second clamping piece 81.

Moreover, as shown in FIG. 15C, in the microphone holder 34, the respective elastic protrusions 91a formed on the front surface side of the first elastic sheet 90a stuck to the first clamping piece 80 and the rear surface side of the second elastic sheet 90b stuck to the second clamping piece 81 may be set high and the respective elastic protrusions 91b formed on the rear surface side of the first elastic sheet 90a and the front surface side of the second elastic sheet 90b may be set low. With such a configuration, in the external microphone 6, the front surface side of the gripping section 6b is supported high and the rear surface side thereof is supported low. The sound collecting section 6a is prevented from handing down with own weight thereof and kept horizontal.

All the elastic protrusions 91 are formed in a semispherical shape and support the gripping section 6b of the external microphone 6 from the tops thereof. Therefore, a contact area of the gripping section 6b of the external microphone 6 with the elastic protrusions 91 is minimized. Therefore, the microphone holder 34 can make noise due to vibration and the like to be less easily transmitted via the first and second clamping pieces 80 and 81.

Figure 18:
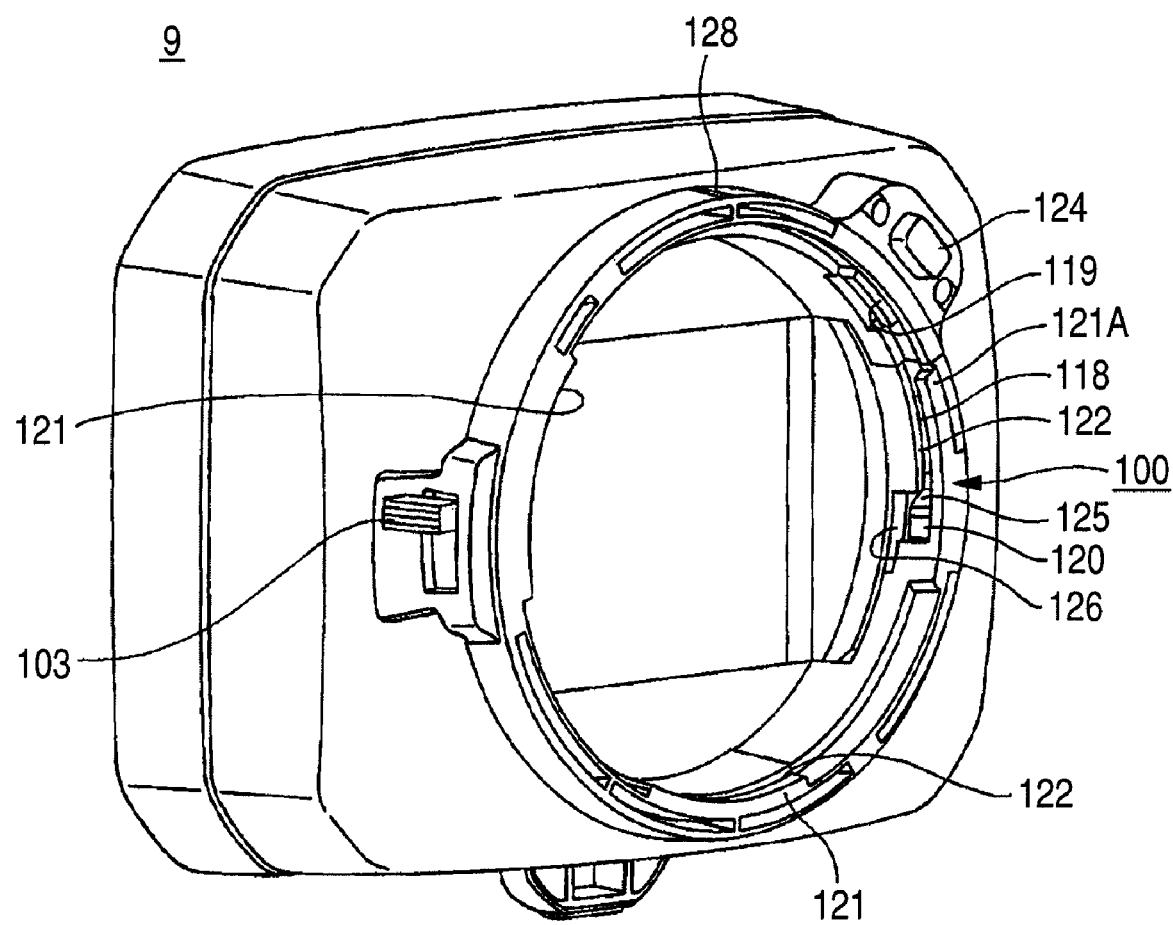
FIG. 18 is a perspective view showing a lens hood.
Figure 19:
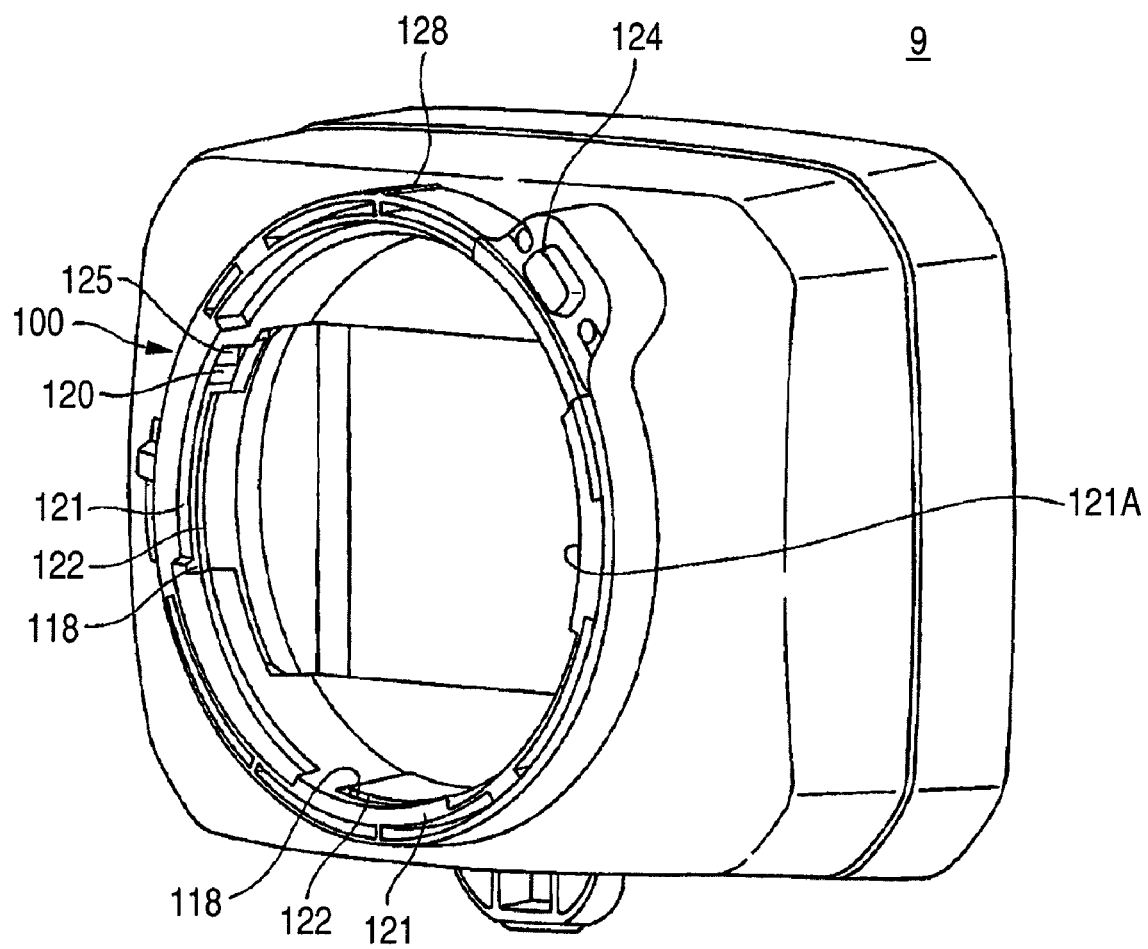
FIG. 19 is a perspective view showing the lens hood.

The lens hood 9 attached to the front surface of the lens barrel 3 is explained. The lens hood 9 is attached according to necessity in order to prevent unnecessary light from being made incident in the lens barrel 3. As shown in FIGS. 18 and 19, the lens hood 9 is formed as a cylindrical body of a substantially rectangular shape as a whole. The lens hood 9 includes an engaging section 100 that is formed at one end side in an axial direction and engaged with a front end of the lens barrel 3, a pair of upper and lower covers pivotally formed on an inner surface side, and an opening and closing lever 103 for opening and closing the pair of upper and lower covers.

Figure 20:
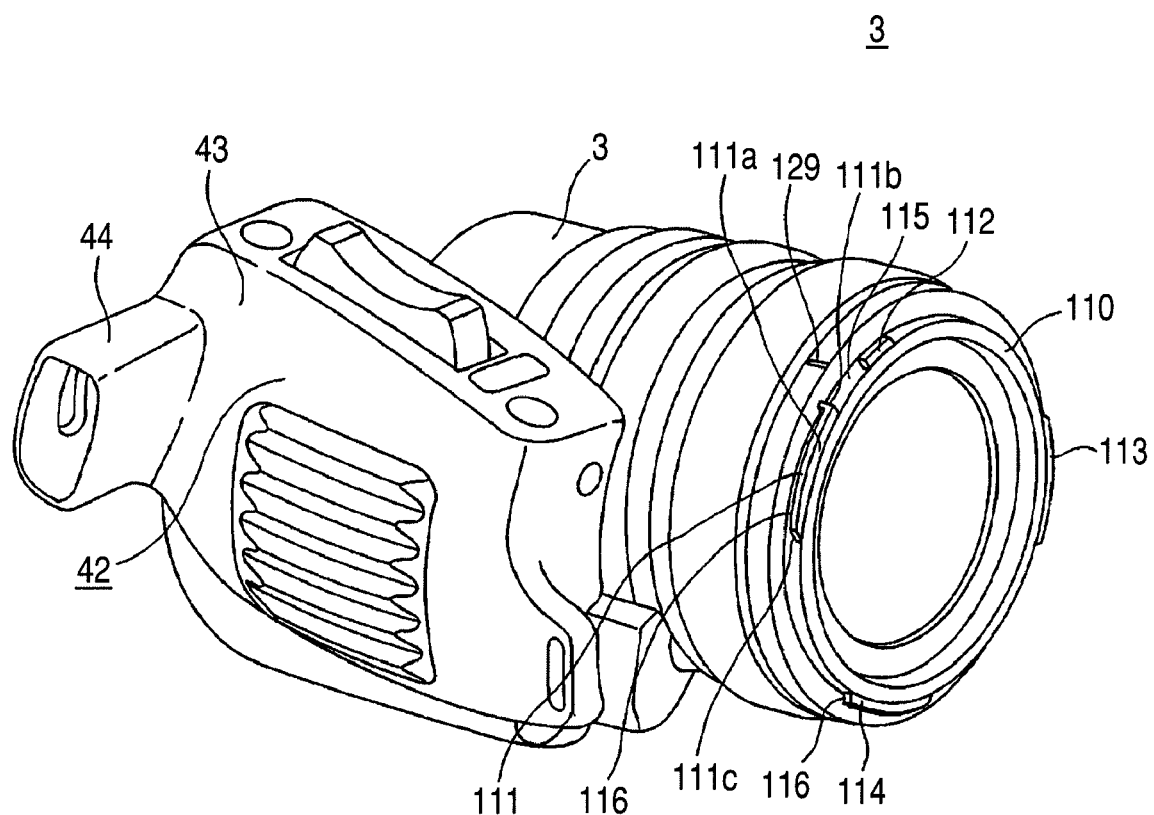
FIG. 20 is a perspective view showing a lens barrel.

The engaging section 100 is engaged with a hood mount 110 formed in a front surface periphery of the lens barrel 3. As shown in FIG. 20, in the hood mount 110, plural guide walls 111 to 114 vertically provided along an outer peripheral direction and an engaging recess 115 that is provided between the guide walls 111 and 112 and in and from which an engaging protrusion 119 of the lens hood 9 is engaged and disengaged are formed.

The first guide wall 111 includes a guide section 111a vertically provided along the outer peripheral direction and a regulating section 111b that is vertically provided in an optical axis direction continuously from one end of the guide section 111a to thereby come into contact with side walls of guide recesses 118 of the lens hood 9 and regulate a pivoting area of the lens hood 9. In the first guide wall 111, guide groove 116, one end of which is closed by the regulating section 111b and the other end of which is opened, is formed between the guide section 111a and the front end face of the lens barrel 3. An engaging wall 121 formed in the engaging section 100 of the lens hood 9 is engaged in the guide groove 116 from the open end and pivoting of the lens hood 9 is guided.

The second guide wall 112 is provided adjacent to the regulating section 111b of the first guide wall 111, whereby an engaging recess 115 in and from which the engaging protrusion 119 of the lens hood 9 engages and disengages is formed between the second guide wall 112 and the first guide wall 111. The second guide wall 112 regulates pivoting of the engaging protrusion 119 between the second guide wall 112 and the first guide wall 111 to thereby regulate pivoting of the lens hood 9 and hold the lens hood 9 in a predetermined engaging position.

The third and fourth guide walls 113 and 114 are formed on the front surface of the lens barrel 3 together with the first guide wall 111 to be arranged at substantially equal intervals. As in the guide section 111a of the first guide wall 111, the guide grooves 116 are formed between the third and fourth guide walls 113 and 114 and the front end face of the lens barrel 3. Engaging walls 121 formed to be arranged at equal intervals in the engaging section 100 of the lens hood 9 are engaged in the guide grooves 116 and pivoting of the lens hood 9 is guided.

The engaging section 100 of the lens hood 9 mounted on such a hood mount 110 includes, as shown in FIGS. 18 and 19, the guide recesses 118 in which the respective guide walls 111, 113, and 114 of the hood mount 110 slide, an engaging protrusion 119 that is detachably engaged in the engaging recess 115, and urging members 120 that are disposed in the guide recesses 118 and urge end faces of the first guide wall 111 and the third guide wall 113.

The guide recesses 118 are formed between an engaging wall 121 vertically provided from an inner peripheral surface of the lens hood 9 and an end face 122 exposed on a rear surface side on the inner peripheral surface of the lens hood 9. Three guide recesses 118 are arranged at equal intervals on the inner peripheral surface of the lens hood 9 in association with the guide grooves 116 arranged at equal intervals in the hood mount 110. When the lens hood 9 is mounted on the hood mount 110, the first guide wall 111, the third guide wall 113, and the fourth guide wall 114 of the hood mount 110 slide in the respective guide recesses 118.

When the lens hood 9 is mounted on the hood mount 110, the respective engaging walls 121 guide pivoting of the lens hood 9 inserted through from the open end sides of the respective guide grooves 116. Among the engaging walls 121, an engaging wall 112A that engages in the guide groove 116 provided between the first guide wall 111 and the front end face of the lens barrel 3 slides in the guide groove 116 while being guided by the guide section 111a and comes into contact with the regulating section 111b to thereby being regulated to further slide.

The engaging protrusion 119 is supported in a part of the inner peripheral surface of the lens hood 9 to be capable of rising and falling in an axial direction. The engaging protrusion 119 is engaged in the engaging recess 115 of the hood mount 110 to thereby regulate pivoting of the lens hood 9. The engaging protrusion 119 has width slightly smaller than the width of the engaging recess 115 and can be smoothly engaged and disengaged. The engaging protrusion 119 is typically pressed in a rear surface direction for engagement in the engaging recess 115 by a not-shown pressing member. In the engaging protrusion 119, a disengaging button 124 exposed on the rear surface of the lens hood 9 is formed. When the disengaging button 124 is depressed, the engaging protrusion 119 is moved in a front surface direction for disengagement from the engaging recess 115 against a pressing force of the pressing member.

Figure 21:
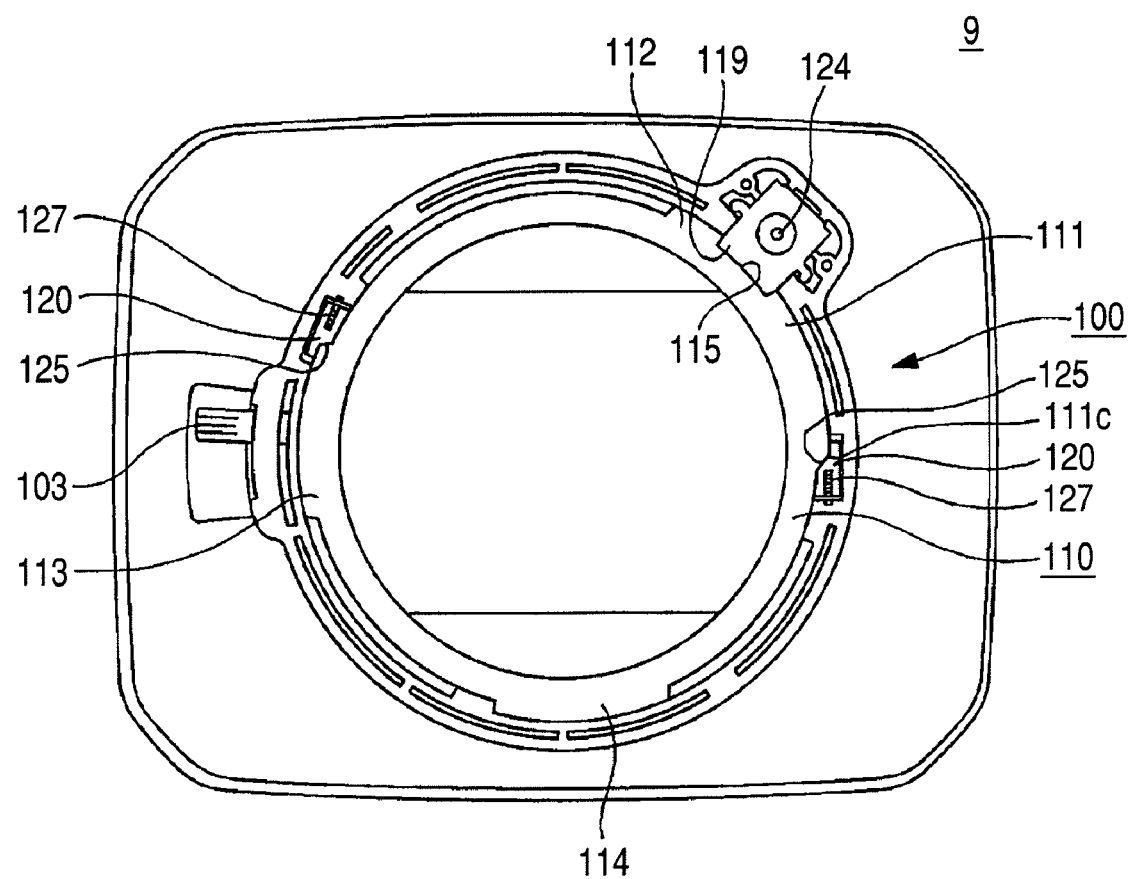
FIG. 21 is a sectional view showing the lens barrel attached with the lens hood.
Figure 22:
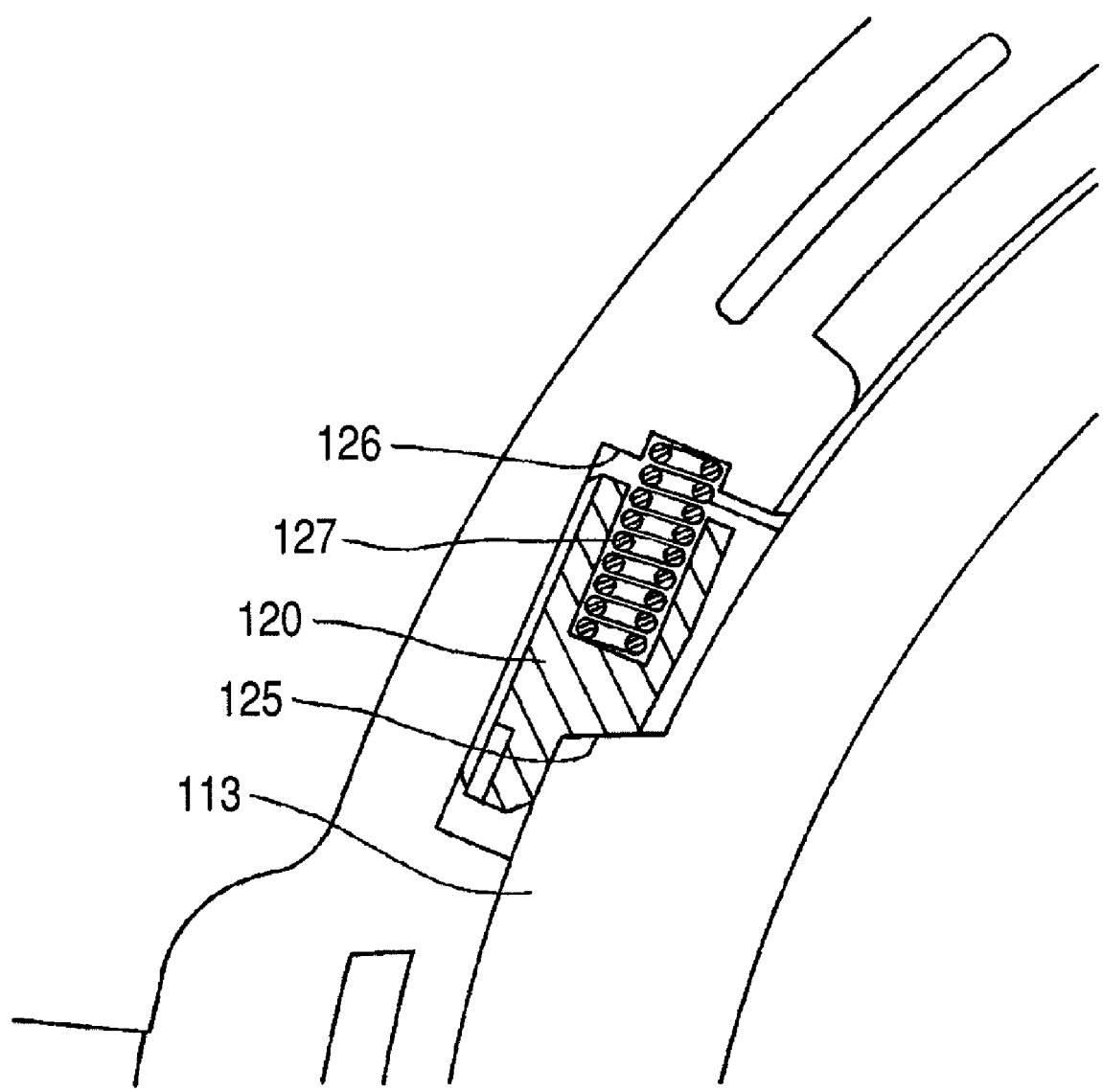
FIG. 22 is a sectional view showing a part of the lens barrel urged in a pivoting direction by an urging member.
Figure 23:
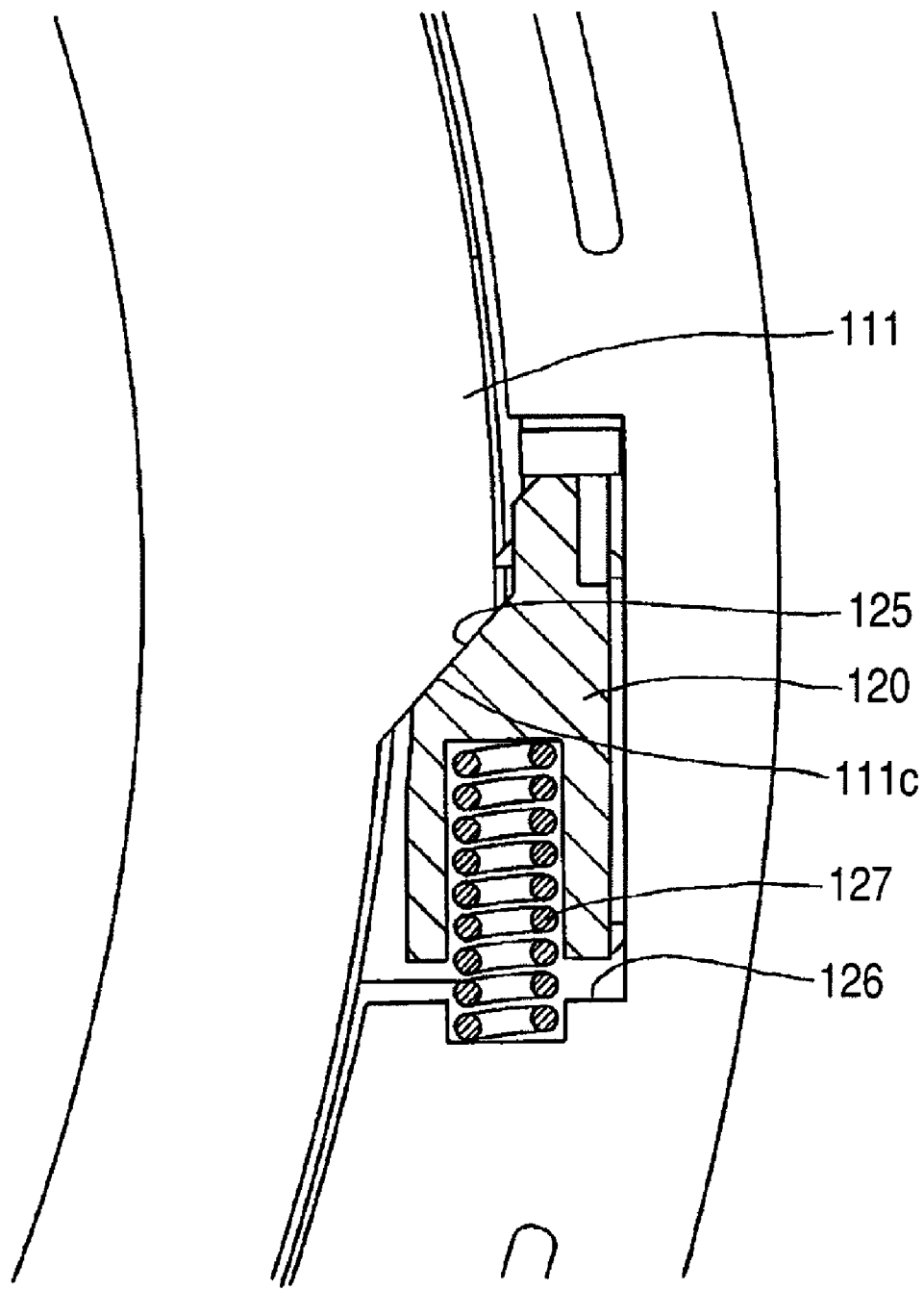
FIG. 23 is a sectional view showing a part of the lens barrel urged in the pivoting direction by the urging member.

When the lens hood 9 is mounted on the hood mount 110, such an engaging protrusion 119 is depressed by the guide section 111a of the first guide wall 111. When the lens hood 9 is pivoted, the engaging protrusion 119 slides to the engaging recess 115 from above the guide section 111a and is returned in the rear surface direction by the pressing force of the pressing member. Consequently, as shown in FIGS. 21 to 23, the engaging protrusion 119 is located at the same height as the first guide wall 111 and the second side wall 112 and engages in the engaging recess 115 formed between the first guide wall 111 and the second guide wall 112. Consequently, the lens hood 9 is pivoted to a predetermined position as shown in FIG. 1 and the like, regulated from pivoting, and held in the position.

When the disengaging button 124 is depressed by the camera operator, the engaging protrusion 119 moves to the front surface side against the pressing force of the pressing member and retracts from the height same as that of the first guide wall 111 and the second guide wall 112. Consequently, the lens hood 9 is allowed to pivot and can be removed from the hood mount 110.

Figure 24:
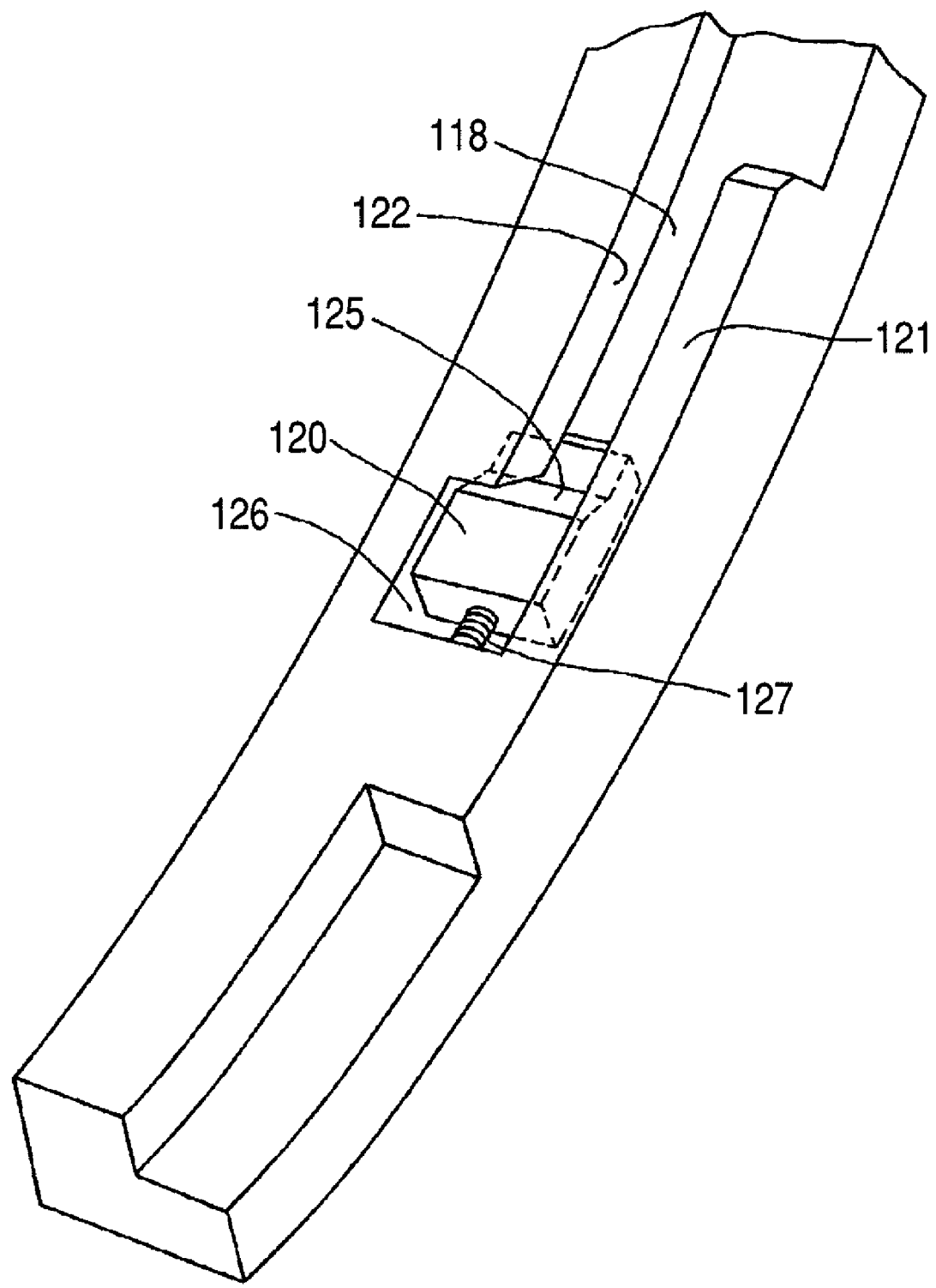
FIG. 24 is a perspective view showing the urging member.

In the engaging section 100, the urging member 120 is formed in the guide recess 118. As shown in FIG. 24, the urging member 120 is formed as a block member of a substantially rectangular shape. An inclined surface 125 is formed in a position opposed to the guide wall 111 provided in the hood mount 110. The inclined surface 125 is inclined with respect to a pivoting direction of the lens hood 9, whereby a normal direction is set on a plane identical with the pivoting direction of the lens hood 9.

Such an urging member 120 is housed in a hosing section 126 formed in the guide recess 118. A distal end portion further on a distal end side than the inclined surface 125 is inserted through a lower part of the end face 122 forming the guide recess 118, whereby the urging member 120 is prevented from dropping from the housing section 126. The urging member 120 is supported at an end of a spring member 127 supported in the inner peripheral surface of the lens hood 9, whereby the urging member 120 is allowed to swing along the pivoting direction of the lens hood 9 in the housing section 126.

In the urging member 120, when the lens hood 9 is mounted on the hood mount 110, as shown in FIGS. 21 and 23, an end face 111c of the guide section 111a of the first guide wall 111, which slides in the guide recess 118, comes into contact with the inclined surface 125. In the first guide wall 111, since the end face 111c of the guide section 111a, which comes into contact with the inclined surface 125, has inclination in the same direction as the inclined surface 125, the inclined surface 125 and the end face 111c come into surface contact with each other. In the urging member 120, the inclined surface 125 urges the end face 111c of the guide section 111a with an urging force of the spring member 127.

As described above, the inclined surface 125 and the end face 111c of the guide section 111a, which comes into surface contact with the inclined surface 125, incline with respect to the pivoting direction of the lens hood 9, whereby the normal direction is set on the plane identical with the pivoting direction of the lens hood 9. In other words, the lens hood 9 is urged in the pivoting direction by the urging force of the urging member 120. At this point, since the engaging protrusion 119 is engaged in the engaging recess 115, pivoting of the lens hood 9 is generally regulated. When the lens hood 9 receives the urging force of the urging member 120, a backlash with respect to the pivoting direction can be prevented.

Similarly, as shown in FIGS. 21 and 22, the urging member 120 is also formed in the guide recess 118 in which the third guide wall 113 slides. An inclined surface is also formed on an end face of the third guide wall 113. The third guide wall 113 is urged in the pivoting direction by the urging member 120. An urging force received by the third guide wall 113 is in the same direction as the urging force received by the first guide wall 111. Therefore, the urging force is caused to act on the lens hood 9 in the same direction by the respective urging members 120. Consequently, it is possible to more effectively prevent a backlash of the lens hood 9.

It is also possible to obtain an urging force in the pivoting direction and prevent a backlash of the lens hood 9 by inclining the inclined surface formed in the urging member 120 in the pivoting direction of the lens hood 9 and inclining a normal direction of the inclined surface to cross the pivoting direction.

When the lens hood 9 described above is mounted on the hood mount 110, first, a hood index 128 formed on an upper surface thereof is set on a lens index 129 formed on the outer peripheral surface of the lens barrel 3 and the engaging section 100 is applied to the front surface of the lens barrel 3. At this point, in the lens hood 9, the engaging protrusion 119 is pressed against the guide section 111a of the first guide wall 111 provided in the hood mount 110.

Figure 25:
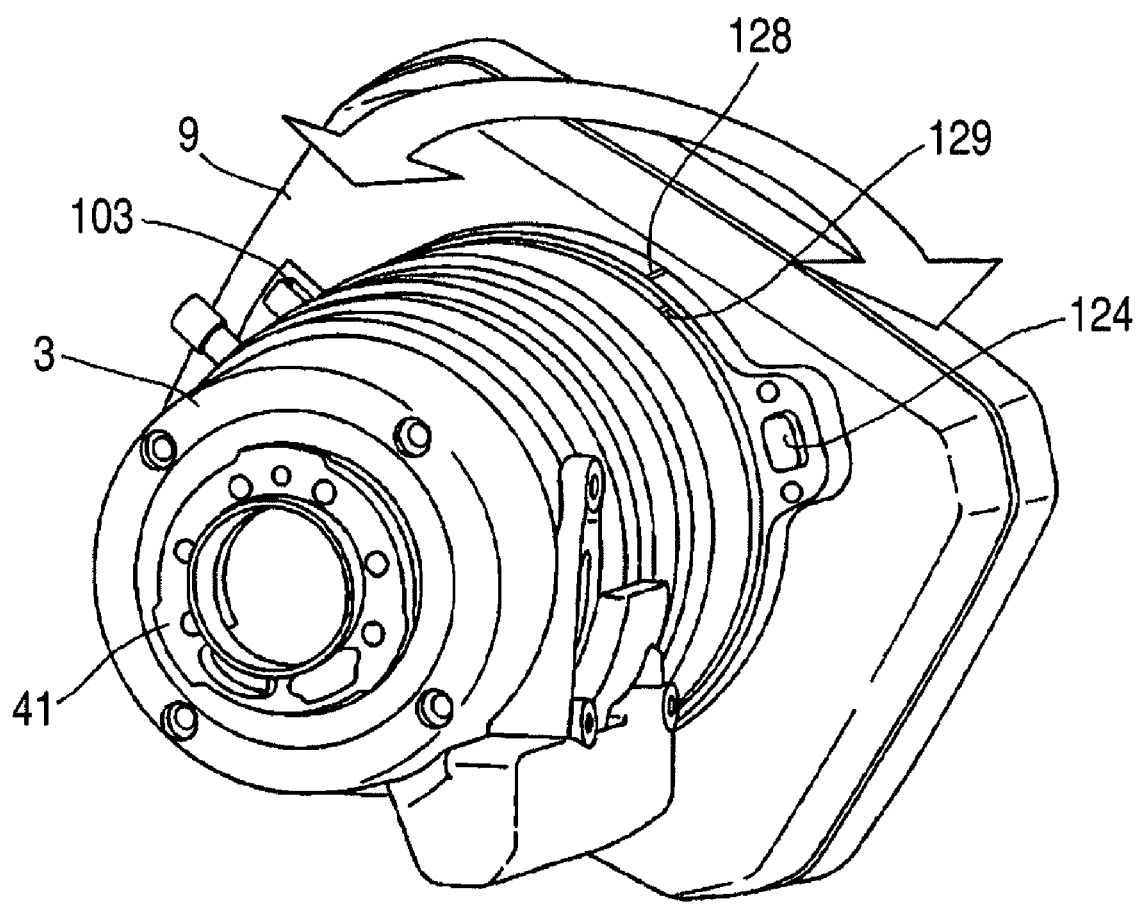
FIG. 25 is a perspective view showing the lens barrel to which the lens hood is attached and from which the lens hood detached.

Subsequently, as shown in FIG. 25, the lens hood 9 is pivoted with respect to the lens barrel 3. Consequently, in the lens hood 9, the respective guide walls 111, 113, and 114 provided in the hood mount 110 slide in the guide recess 118 and the respective engaging walls 121 engage in the guide grooves 116 provided in the hood mount 110 and slide, whereby a pivoting operation is guided.

When the lens hood 9 is pivoted to the predetermined position shown in FIG. 1 and the like, as shown in FIG. 21, the engaging walls 121 come into contact with the regulating section 111b and the engaging protrusion 119 pressed by the guide section 111a engages in the engaging recess 115, whereby further pivoting is regulated. At this point, since the engaging protrusion 119 is sprung up in the rear surface direction of the lens hood 9 by the pressing member, the engaging protrusion 119 engages in the engaging recess 115. It is possible to cause the camera operator to sense that the lens hood 9 is mounted on the hood mount 110.

When the lens hood 9 is mounted on the hood mount 110, the respective end faces of the first guide wall 111 and the third guide wall 113 are urged in the pivoting direction of the lens hood 9 by the urging members 120 provided in the guide recesses 118. Therefore, a backlash of the lens hood 9 with respect to the pivoting direction is effectively prevented.

When the lens hood 9 is removed from the hood mount 110, the disengaging button 124 exposed on the rear surface of the lens hood 9 is depressed. Consequently, the engaging protrusion 119 retracts from the engaging recess 115 and the lens hood 9 is allowed to pivot. In this state, the lens hood 9 is pivoted in a direction opposite to the direction for mounting the lens hood 9 to disengage the respective engaging walls 121 and the respective guide grooves 116 provided in the hood mount 110, i.e., the respective guide recesses 118 and the respective guide walls 111, 113, and 114 are disengaged. Then, it is possible to remove the lens hood 9 from the hood mount 110.

The mounting section 23 formed in the rear surface 2d of the apparatus main body 2 and the auxiliary recording medium unit 5 that is mounted on the mounting section 23 are explained. The auxiliary recording medium unit 5 is detachably inserted in the apparatus main body 2 in addition to the tape cartridge housed in the recording and reproducing unit 20 of the apparatus main body 2. The auxiliary recording medium unit 5 is used to record imaged data in parallel to a main recording medium in preparation for a recording mistake in the tape cartridge in the recording and reproducing unit 20 and used in preparation for a situation such as recording exceeding a recording capacity of the tape cartridge. After the auxiliary recording medium unit 5 is removed from the apparatus main body 2, if the auxiliary recording medium unit 5 is connected to an editing device, it is possible to edit recorded data independently from the imaging apparatus 1. Therefore, it is also possible to perform imaging by the imaging apparatus 1 and editing in parallel by using only the auxiliary recording medium unit 5 to edit the recorded data.

Figure 26:
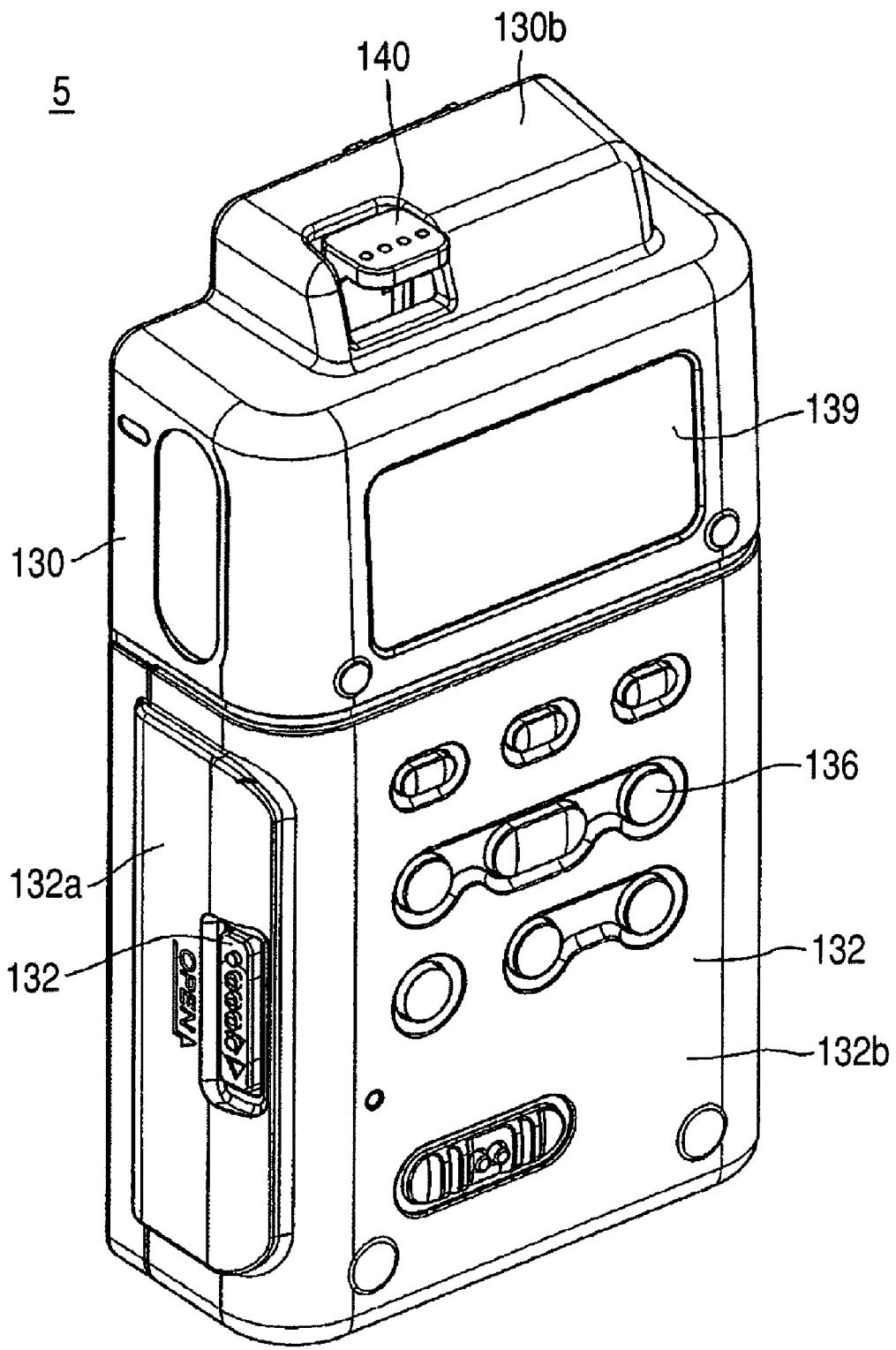
FIG. 26 is a perspective view showing an auxiliary recording medium unit.
Figure 27:
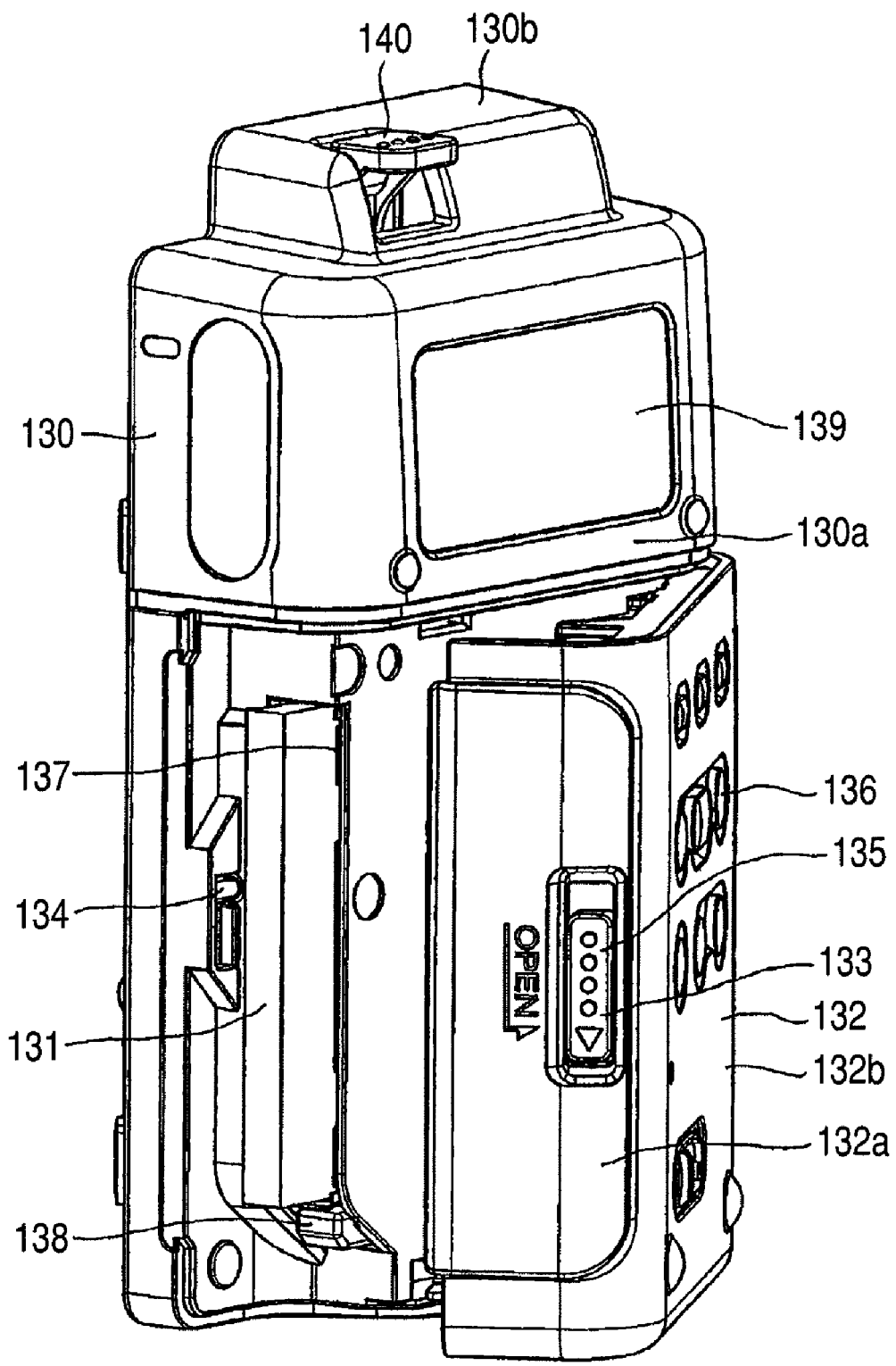
FIG. 27 is a perspective view showing the auxiliary recording medium unit in which a memory card is inserted and from which the memory card is detached.

In the auxiliary recording medium unit 5, as shown in FIGS. 26 and 27, for example, a memory card 131 is detachably housed in a unit main body 130 of a substantially rectangular shape as an auxiliary recording medium. Besides the memory card 131, for example, disk-like recording media such as a DVD, a BD, a hard disk, and a magneto-optical disk may be used as auxiliary recording media in the auxiliary recording medium unit 5.

In the unit main body 130, a lid member 132 is formed on a front surface 130a and supported with a right long side as a fulcrum to freely open and close. In the lid member 132, a lock section 133 that is locked to the unit main body 130 side is formed on a left side surface 132a. The lock section 133 includes a not-shown lock piece that is engaged with a locking piece 134 provided on the unit main body 130 side and an unlock lever 135 that slides the lock piece and unlock the lock piece from the locking piece 134. In the lid member 132, an editing button 136 for editing recorded data of the memory card 131 is formed on a front surface 132b.

In the unit main body 130, when the lid member 132 is opened, a card housing section 137, in which the memory card 131 is inserted, is exposed. In the card housing section 137, an eject button 138 for pushing out the memory card 131 from the card housing section 137 is formed at one end. In such a unit main body 130, in a state in which the auxiliary recording medium unit 5 is mounted on the mounting section 23 of the apparatus main body 2, it is possible to open and close the lid member 132 and insert and detach the memory card 131.

Besides, in the unit main body 130, a monitor 139 is formed in an upper part of the front surface 130a. The monitor 139 displays an editing state and the like concerning the memory card 131. Further, in the unit main body 130, a disengaging lever 140 that disengages the auxiliary recording medium unit 5 from the mounting section 23 to make it possible to remove the auxiliary recording medium unit 5 from the apparatus main body 2 is formed on an upper surface 130b.

Figure 28:
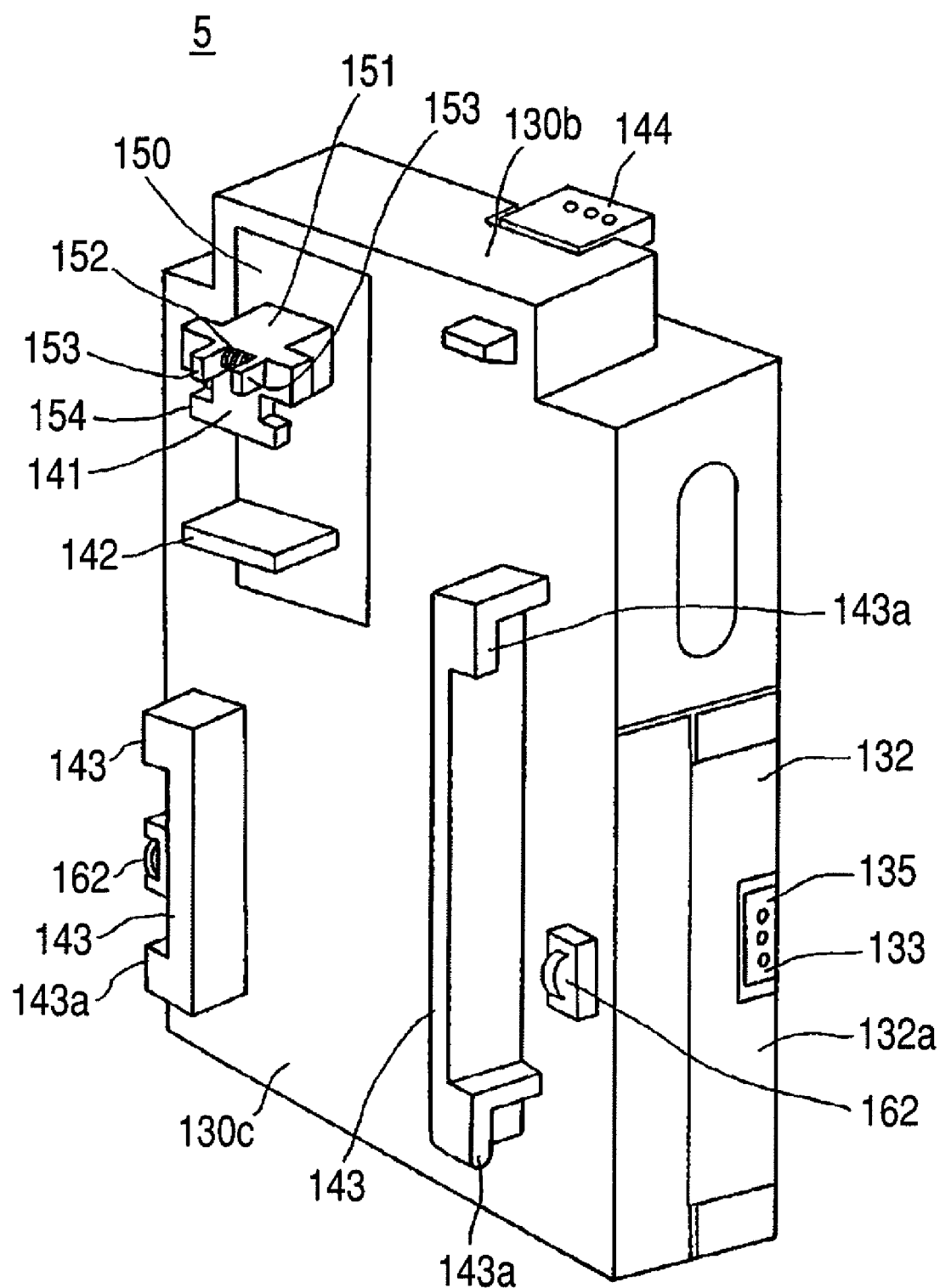
FIG. 28 is a perspective view showing the auxiliary recording medium unit from a rear side thereof.

In the unit main body 130, as shown in FIG. 28, a unit-side terminal section 141 that is connected to a main-body-side terminal section 163 formed in the mounting section 23, a miss-insertion preventing piece 142 that prevents the unit-side terminal section 141 from being miss-inserted in a terminal other than the main-body-side terminal section 163, engaging pieces 143 that realize engagement with the mounting section 23, and an engaging protruded piece 144 that engages the unit main body 130 with the mounting section 23 are formed in a rear surface 130c opposed to the mounting section 23 of the apparatus main body 2.

After the unit-side terminal section 141 is inserted in the main-body-side terminal section 163 and the engaging pieces 143 are inserted in engaging groove sections 164 provided in the mounting section 23, the unit main body 130 is slid downward, whereby the unit-side terminal section 141 and the main-body-side terminal section 163 are connected and the engaging pieces 143 engage in the engaging groove sections 164.

Figure 29:
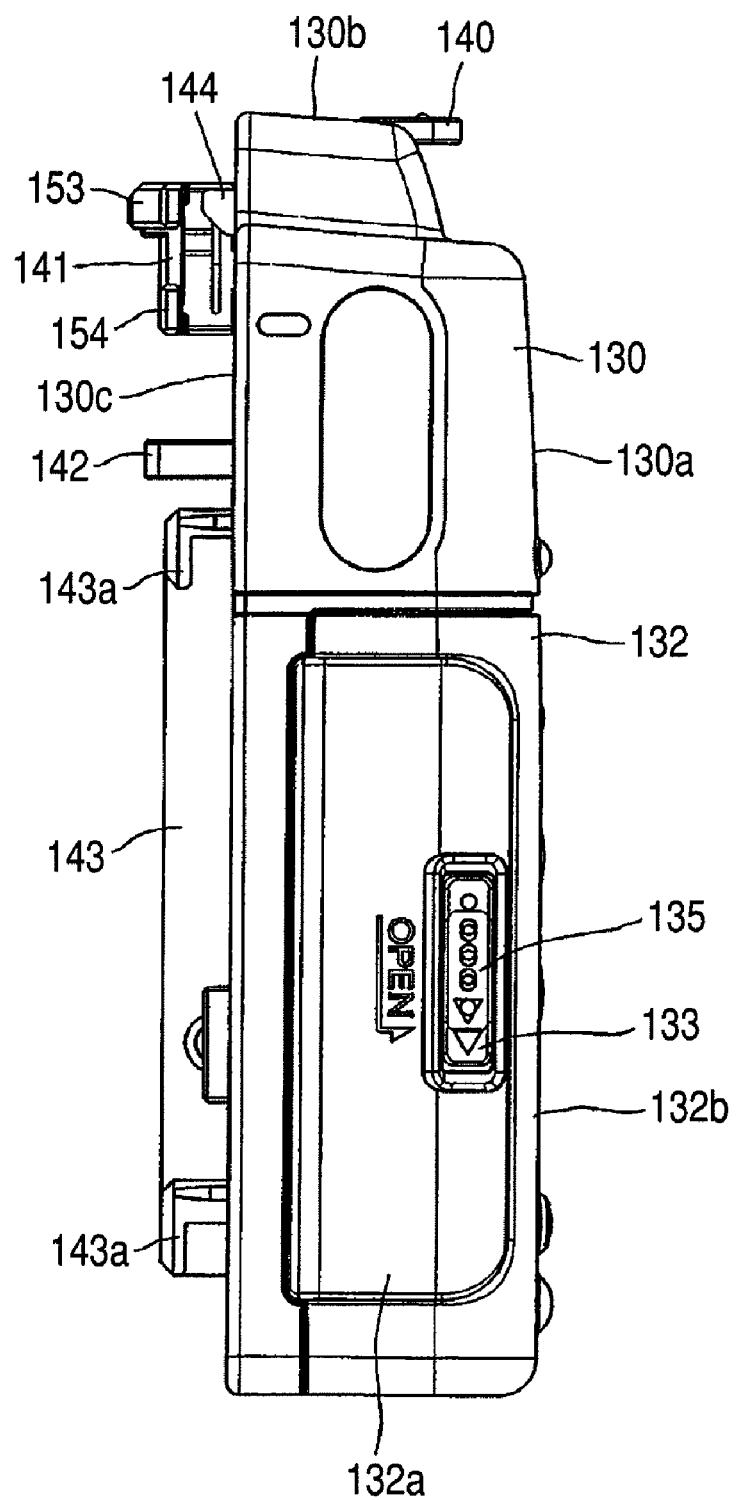
FIG. 29 is a side view of the auxiliary recording medium unit.
Figure 31:
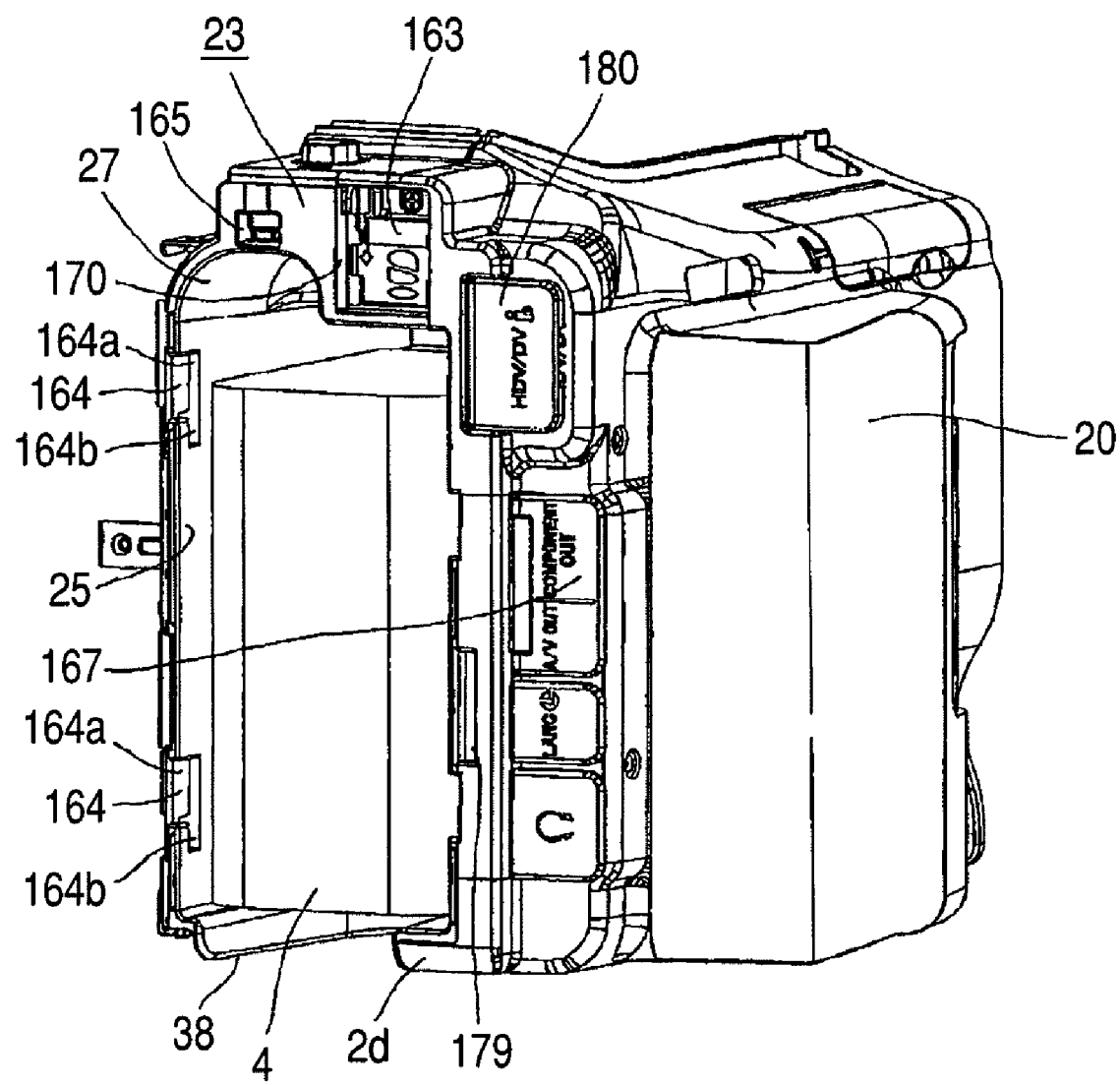
FIG. 31 is a perspective view showing a mounting section of the apparatus main body.

The unit-side terminal section 141 is, for example, a communication terminal based on the IEEE 1394 standard. When the unit-side terminal section 141 is connected to the main-body-side terminal section 163 of the apparatus main body 2, information signals of sound, videos, and the like and driving power are supplied from the apparatus main body 2. As shown in FIG. 29, the unit-side terminal section 141 is formed to project from the rear surface 130a to be insertable in the main-body-side terminal section 163. In association with the unit-side terminal section 141, as shown in FIG. 31, the main-body-side terminal section 163 formed in the mounting section 23 is formed in a position further in the depth than the rear surface 2d of the apparatus main body 2 such that a main body terminal 174 can be connected by inserting the unit-side terminal section 141. Consequently, a terminal other than the unit-side terminal section 141 is prevented from being connected to the main-body-side terminal section 163.

Figure 30A:
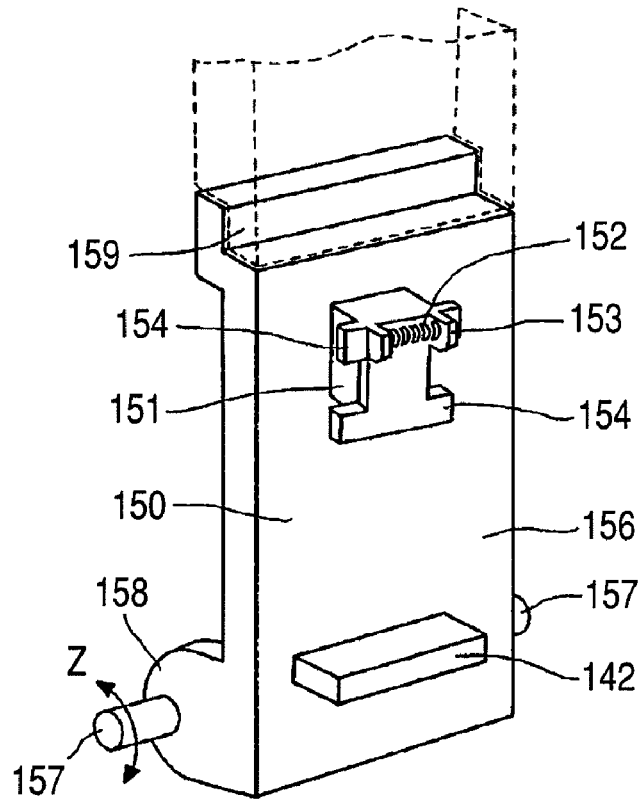
FIG. 30A is a perspective view of a supporting plate provided with a unit-side terminal section.
Figure 30B:
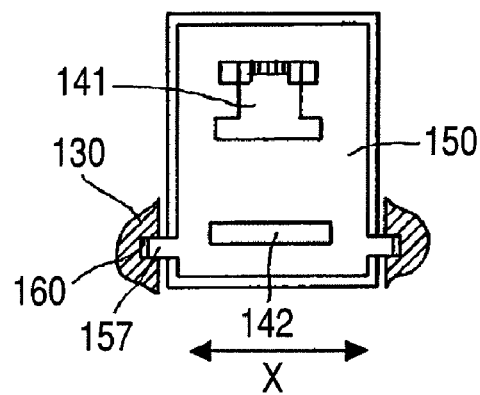
FIG. 30B is a diagram showing the supporting plate supported by a bearing of a unit main body.

As shown in FIGS. 30A and 30B, such a unit-side terminal section 141 is formed in a supporting plate 150 swingably supported in the unit main body 130 and includes a base section 151 provided protrudingly from a main surface of the supporting plate 150, a unit terminal 152 formed in an upper part of the base section 151, a pair of connection guides 153 vertically provided on both sides of the unit terminal 152, and a fitting protrusion 154 that is formed on an upper side surface of the base section 151 and fits in a fitting wall section 173 of the main-body-side terminal section 163.

Since the supporting plate 150 is supported to be generally flush with the rear surface 130c of the unit main body 130, the base section 151 projects from the rear surface 130c. Consequently, in the base section 151, the unit terminal 152 formed in an upper part thereof is inserted to a position where the unit terminal 152 can be connected to the main body terminal 174 of the main-body-side terminal section 163 formed in the depth of the mounting section 23.

Since the connection guides 153 vertically provided on both the sides of the unit terminal 152 are formed over an up to down direction of the unit main body 130, the connection guides 153 are formed along a slide direction of the unit-side terminal section 141 inserted in the main-body-side terminal section 163. The connection guides 153 are guided by guide recesses 176 provided on both sides of the main body terminal 174 of the main-body-side terminal section 163 described later to thereby guide the slide of the unit-side terminal section 141 and secure smooth insertion and detachment of the unit terminal 152 and the main body terminal 174.

The fitting protrusion 154 formed on an upper side surface of the base section 151 is formed in an irregular shape and can be fit in an irregular shape of the fitting wall section 173 of the main-body-side terminal section 163 provided in association with the fitting protrusion 154. Therefore, when the fitting protrusion 154 fits in the fitting wall section 173, the unit-side terminal section 141 can be inserted in the main-body-side terminal section 163.

The miss-insertion preventing piece 142 formed on the supporting plate 150 together with the unit-side terminal section 141 is formed in a substantially rectangular plate shape and vertically provided near the unit-side terminal section 141, for example, about several centimeters below the unit-side terminal section 141. When the unit-side terminal section 141 is inserted in the main-body-side terminal section 163, the miss-insertion preventing piece 142 is inserted into the opening 25 of the mounting section 23. Since the miss-insertion preventing piece 142 is vertically provided near the unit-side terminal section 141, the miss-insertion preventing piece 142 can prevent the unit-side terminal section 141 from being inserted in a terminal other than the main-body-side terminal section 163.

In the supporting plate 150 on which the unit-side terminal section 141 and the miss-insertion preventing piece 142 are provided, as shown in FIGS. 30A and 30B, a main surface section 156, a side surface section 158 in which a supporting shaft 157 supported by the unit main body 130 is formed, and a locking side 159 that is locked to the rear surface 130c of the unit main body 130 are formed.

The supporting shaft 157 is formed below the main surface section 156 and pivotally supported by a bearing section 160 formed in the unit man body 130. Therefore, the supporting shaft 157 can swing in an arrow Z direction in FIG. 30A. The locking side 159 formed in the upper part of the main surface section 156 is locked to the unit main body 130 and the main surface section 156 comes into contact with the internal structure of the unit main body 130, whereby a swing range in the Z direction of the supporting plate 150 is regulated. Since the supporting shaft 157 is supported with a slight space to the bearing section 160 in an axial direction, the supporting plate 150 can also swing in an arrow X direction in FIG. 30B.

In this way, the supporting plate 150 is allowed to swing in the arrow X direction and the arrow Z direction in FIG. 30A and is regulated from swinging in an up to down direction, which is a slide direction of the unit-side terminal section 141. Consequently, when the camera operator inserts the unit-side terminal section 141 into the main-body-side terminal section 163 and performs positioning of the unit terminal 152 and the man body terminal 174, it is possible to reduce a load on the unit-side terminal section 141 by allowing the unit-side terminal section 141 to swing. In the auxiliary recording medium unit 5, since the swing in the slide direction of the unit terminal 152 with respect to the main-body-side terminal section 163 is regulated, it is possible to secure sure connection between the unit terminal 152 and the main body terminal 174 and prevent the unit terminal 152 from coming off from the main body terminal 174 when the apparatus main body 2 swings. In particular, the imaging apparatus 1 is used not only in a stationary state. The imaging apparatus 1 may move together with the camera operator or may be sometimes used by the camera operator while running. In such a case, since the supporting plate 150 swings, it is possible to absorb vibration and impact and secure connection between the unit-side terminal section 141 and the main-body-side terminal section 163. Moreover, when the auxiliary recording medium unit 5 is removed from the mounting section 23, since the swing in the slide direction of the unit-side terminal section 141 is regulated, it is possible to surely remove the unit terminal 152 from the main body terminal 174. Since the swing in the arrow X direction and the arrow Z direction is allowed, it is possible to reduce a load on the unit-side terminal section 141 and the main-body-side terminal section 163.

The engaging pieces 143 formed on the rear surface 130c of the unit main body 130 are formed on both the sides in the width direction over the slide direction of the unit main body 130 with respect to the mounting section 23. In the engaging pieces 143, protrusions 143a that engage in the engaging groove sections 164 formed on the mounting section 23 side while being vertically spaced apart are formed. The protrusions 143a are formed to extend to a lower part of the unit main body 130, inserted from opening ends of the engaging groove sections 164 opened to an upper part of the unit main body 130, and clamped in the engaging groove sections 164 when the unit main body 130 is slid downward. When the engaging pieces 143 are clamped by the engaging groove sections 164, the unit main body 130 is mounted on the mounting section 23.

Since the protrusions 143a clamped in the engaging groove sections 164 are provided in two places while being vertically spaced apart and are continuous, the engaging pieces 143 are vertically provided in a long shape. Therefore, the strength of the engaging pieces 143 is secured compared with the strength obtained when only the protrusions 143a clamped in the engaging groove sections 164 are vertically provided. Even when the engaging pieces 143 collides with members around the same because the engaging pieces 143 are vertically provided on the rear surface 130c of the unit main body 130, the engaging pieces 143 do not easily break.

Earth terminals 162 are formed near the engaging pieces 143. When the unit main body 130 is mounted on the mounting section 23, the earth terminals 162 are brought into contact with terminals formed in the mounting section 23 and connected to an earth of the apparatus main body 2.

The engaging protruded piece 144 for engaging the unit main body 130 with the mounting section 23 regulates the slide of the unit main body 130 mounted on the mounting section 23 in an upward direction in which the engaging pieces 143 and the engaging groove sections 164 are disengaged. The engaging protruded piece 144 is projected to the mounting section 23 side from the rear surface 130c of the unit main body 130. When the unit main body 130 is mounted on the mounting section 23, the engaging protruded piece 144 engages in an engaging recess 165 provided on the mounting section 23 side. Consequently, the unit main body 130 is regulated from sliding in the up to down direction in a state in which the engaging pieces 143 are engaged in the engaging groove sections 164 and is prevented from coming off from the mounting section 23.

The engaging protruded piece 144 is associated with the disengaging lever 140 provided on the upper surface 130b of the unit main body 130. When the disengaging lever 140 is depressed, the engaging protruded piece 144 retracts into the unit main body 130. Therefore, in a state in which the disengaging lever 140 is depressed and the engaging protruded piece 144 and the engaging recess 165 are disengaged, the unit main body 130 is slid to an upper part of the mounting section 23. Consequently, it is possible to pull out the engaging pieces 143 from the engaging groove sections 164 and remove the unit main body 130 from the mounting section 23.

Figure 32:
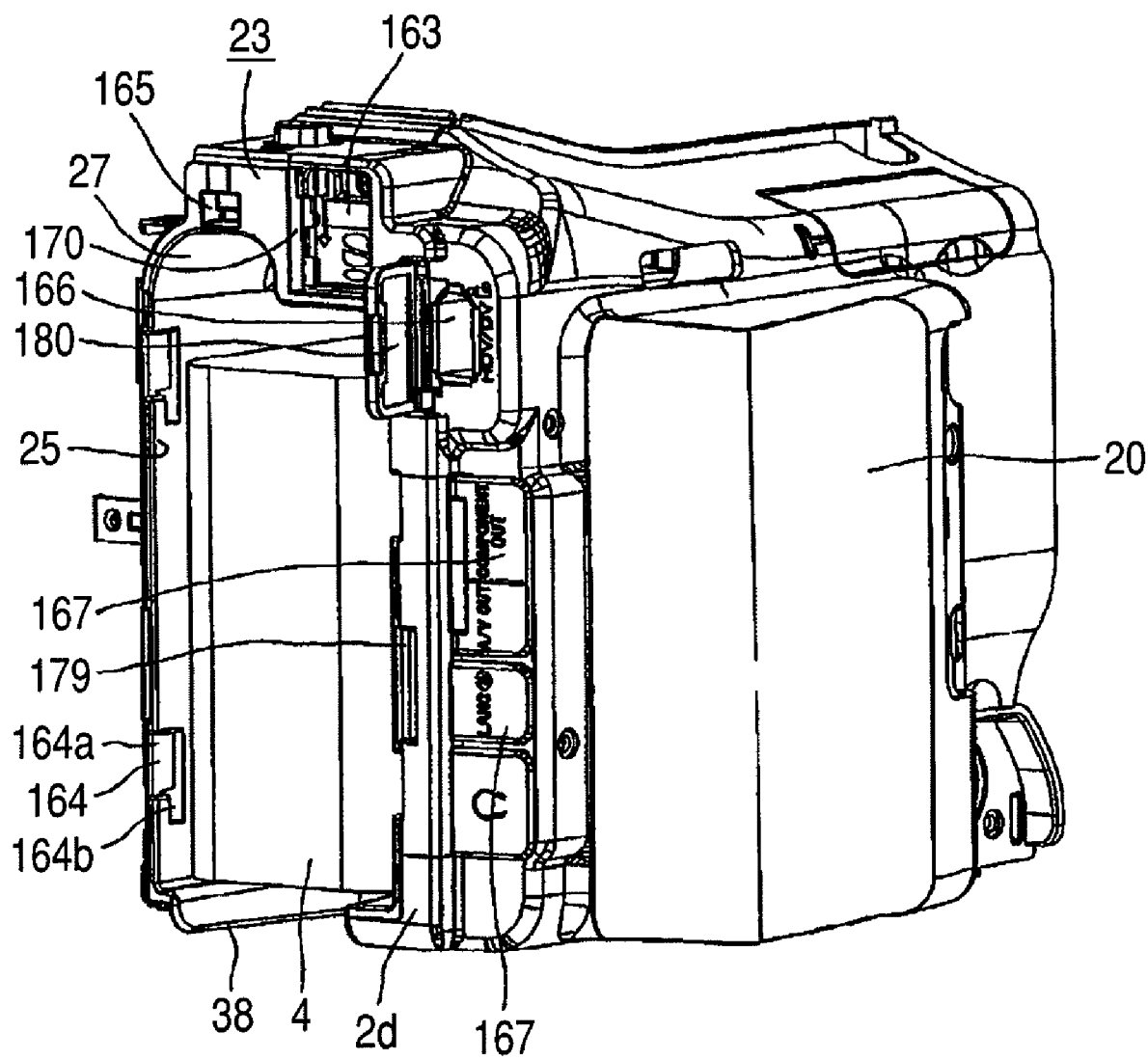
FIG. 32 is a perspective view showing the mounting section from which an external connection terminal is exposed.
Figure 33:
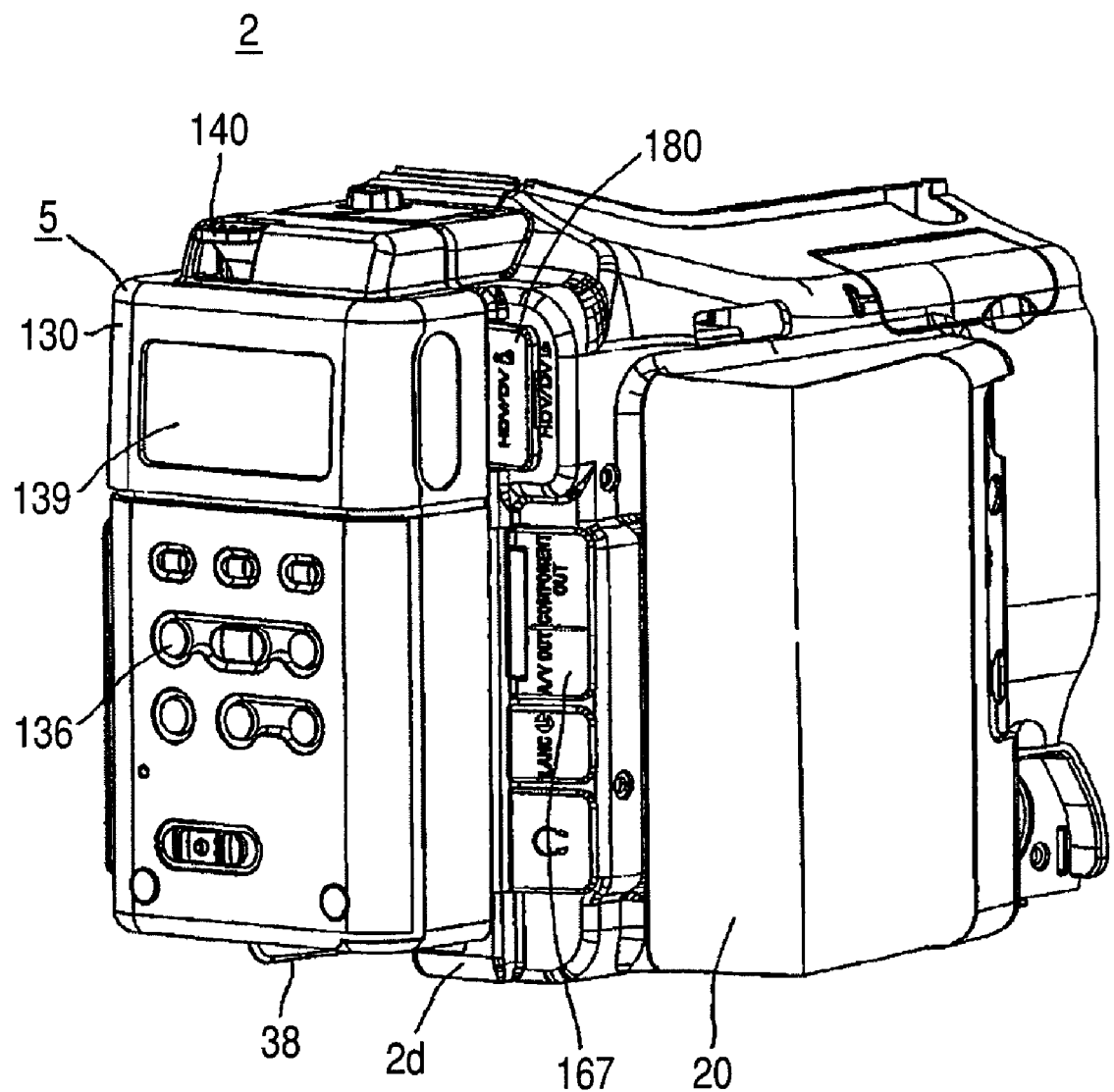
FIG. 33 is a perspective view showing the mounting section mounted with the auxiliary recording medium unit.

The mounting section 23 on which such an auxiliary recording medium unit 5 is mounted is explained. As shown in FIGS. 31 to 33, the mounting section 23 is provided in the opening 25 opened in the rear surface 2d of the apparatus main body 2 and around the opening 25. In the mounting section 23, the main-body-side terminal section 163 to which the unit-side terminal section 141 is connected, the engaging groove sections 164 in which the engaging pieces 143 of the unit main body 130 are engaged, the engaging recess 165 in which the engaging protruded piece 144 is engaged, an external connection terminal 166 branched from a signal line identical with that of the main-body-side terminal section 163, and a group of various output terminals 167 are formed.

Figure 34A:
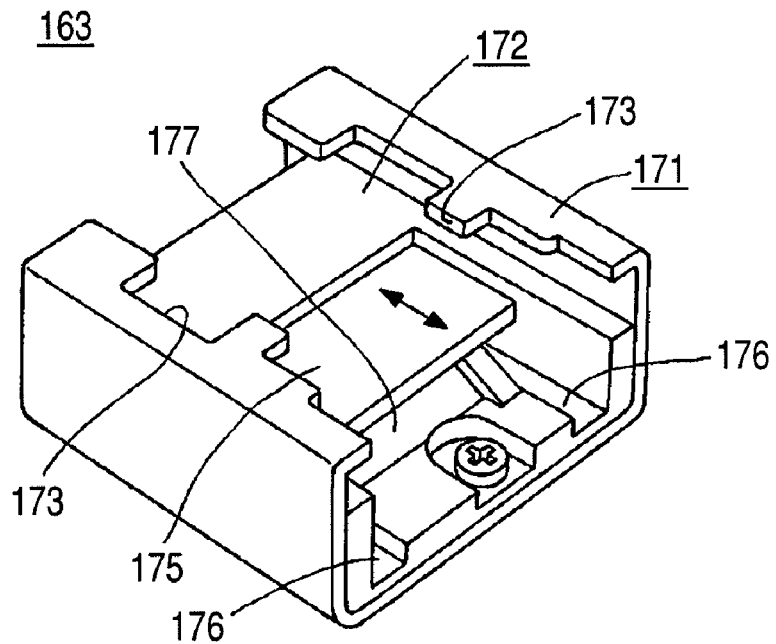
FIG. 34A is a perspective view showing a main-body-side terminal section with a main body terminal closed by a cover.
Figure 34B:
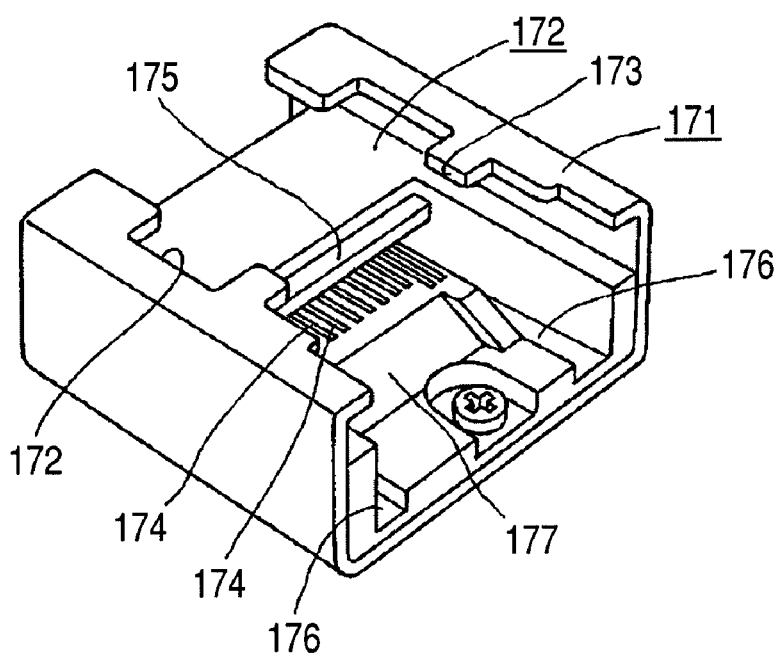
FIG. 34B is a perspective view showing the main-body-side terminal section with the main body terminal exposed.

The main-body-side terminal section 163 is formed in a position slightly in the depth in a terminal recess 170 opened in the rear surface 2d of the apparatus main body 2. As shown in FIGS. 34A and 34B, the main-body-side terminal section 163 includes a metal frame 171 and a terminal unit 172 provided in the frame 171. The frame 171 and the terminal unit 172 are integrally screwed in the terminal recess 170.

The frame 171 forms a rectangular cylindrical member. A fitting wall section 173 that is opened in one main surface and fits with the unit-side terminal section 141 is formed in the frame 171. The fitting wall section 173 has an irregular shape corresponding to the irregular shape of the fitting protrusion 154 formed in the unit-side terminal section 141. When the fitting protrusion 154 fits in the fitting wall section 173, the unit-side terminal section 141 is inserted into the frame 171.

In the terminal unit 172 integrally provided in an internal space of the frame 171, the main body terminal 174 that is connected to the unit terminal 152 of the unit-side terminal section 141, a cover 175 that closes the main body terminal 174, and the guide recesses 176 in which the connection guides 153 formed in the unit-side terminal section 141 slide are formed.

In the frame 171, an inclined surface 177 is formed over the up to down direction, which is the slide direction of the unit main body 130. The main body terminal 174 is formed at the top of the inclined surface 177. When the main body terminal 174 is not used, the main body terminal 174 is covered by the cover 175 supported by the terminal unit 172 to be slidable in the slide direction of the unit main body 130 and prevents adhesion of dust and short-circuit due to contact with metal components. The cover 175 is typically urged in an upward direction for closing the main body terminal 174 by a not-shown urging member. When the unit-side terminal section 141 is inserted into the frame 171 and slid downward, the cover 175 is depressed by the connection guide 153 and faces the main body terminal 174 outward to make it possible to connect the main body terminal 174 to the unit terminal 152.

The guide recesses 176 are provided on both the sides of the main body terminal 174 and the connection guides 153 formed the unit-side terminal section 141 are slid in the guide recesses 176. The guide recesses 176 are formed between the side wall of the terminal unit 172 and the main body terminal 174 over the slide direction of the unit-side terminal section 141. When the connection guides 153 are slid, the guide recesses 176 guide the slide of the unit-side terminal section 141 and make it possible to surely connect the unit terminal 152 and the main body terminal 174.

Such a main-body-side terminal section 163 is inserted into the frame 171 while the unit-side terminal section 141 fits the fitting protrusion 154 in the fitting wall section 173. Consequently, in the main-body-side terminal section 163, the connection guides 153 are located in the guide recesses 176 and the unit terminal 152 is located at a lower end of the inclined surface 177. As shown in FIG. 34B, when the unit main body 130 is slid downward on the mounting section 23, in the main-body-side terminal section 163, while the connection guides 153 are guided by the guide recesses 176, the unit terminal 152 slides on the inclined surface 177. After the connection guides 153 depress the cover 175 and expose the main body terminal 174, the unit terminal 152 and the main body terminal 174 are connected. At this point, in the unit main body 130, the engaging pieces 143 slide in the engaging groove sections 164 of the mounting section 23, the protrusions 143a are clamped in the engaging groove sections 164, and the engaging protruded piece 144 is engaged in the engaging recess 165.

When the main-body-side terminal 163 is disengaged from the unit-side terminal section 141, the unit main body 130 is slid upward on the mounting section 23. Therefore, the unit-side terminal section 141 slides upward while being guided by the guide recesses 176 in the frame 171 and the main body terminal 174 and the unit terminal 152 are disengaged. When the fitting protrusion 154 is ejected from the fitting wall section 173, the unit-side terminal section 141 is removed from the main-body-side terminal section 163. As shown in FIG. 34A, in the main-body-side terminal section 163, the cover 175 is slid upward and the main body terminal 174 is shielded.

When the main-body-side terminal section 163 is attached to and detached from the unit-side terminal section 141, as described above, the unit-side terminal section 141 is swingable in any direction except the connecting direction of the main body terminal 174 and the unit terminal 152. Therefore, an unnatural force is not applied to the main-body-side terminal section 163, which is prevented from breaking. Even when the apparatus main body 2 swings in a state in which the unit-side terminal section 141 is attached to the main-body-side terminal section 163, since the unit-side terminal section 141 swings, impact on the main body terminal 174 and the unit terminal 152 is absorbed. Therefore, it is possible to maintain connection reliability.

The engaging groove sections 164 that engage with the engaging pieces 143 formed in the unit main body 130 are formed on the inner side surface of the opening 25 opened in the rear surface 2d of the apparatus main body 2. The engaging groove sections 164 include inserting sections 164a that are formed on both sides of the inner side surface of the opening 25 and through which the protrusions 143a of the engaging pieces 143 are inserted and clamping sections 164b that clamp the protrusions 143a inserted through the inserting section 164a.

The inserting sections 164a are formed from the rear surface 2d to the inside of the opening 25. The clamping sections 164b are formed downward from lower surface sides of the inserting sections 164a. After the protrusions 143a of the engaging pieces 143 of the unit main body 130 are inserted through the inserting sections 164a, the engaging groove sections 164 slide to a lower part of the mounting section 23, whereby the protrusions 143a are pressed into the clamping sections 164b. Consequently, the engaging groove sections 164 clamp the protrusions 143a of the engaging pieces 143. The unit main body 130 is prevented from dropping from the mounting section 23.

In the engaging groove sections 164, when the unit main body 130 is removed from the mounting section 23, since the unit main body 130 is slid upward, the protrusions 143a of the engaging pieces 143 are slid from the clamping sections 164b to the inserting sections 164a. When the clamping of the protrusions 143a is released, the unit main body 130 is pulled out to the rear surface 2d side of the apparatus main body 2, whereby the engaging pieces 143 are also pulled out from the engaging groove sections 164.

In the respective engaging groove sections 164, earth openings 179 in which the earth terminals 162 formed in the unit main body 130 are inserted are formed. In the earth openings 179, terminals connected to an earth in the apparatus main body 2 are exposed. When the unit main body 130 is mounted on the mounting section 23, the earth terminals 162 are inserted and connected to the earth of the apparatus main body 2.

The engaging recess 165 in which the engaging protruded piece 144 provided in the unit main body 130 is inserted is formed above the opening 25. The engaging recess 165 has a size for allowing the engaging protruded piece 144 to be inserted. When the engaging protruded piece 144 is inserted, the engaging recess 165 regulates the unit main body 130 from sliding upward. When the engaging protruded piece 144 retracts into the unit main body 130 according to the depression of the disengaging lever 140, the engaging recess 165 is disengaged from the engaging protruded piece 144 and allows the unit main body 130 to slide.

As shown in FIG. 32, in a projected surface of the unit main body 130 at the time when the unit main body 130 is mounted, the external connection terminal 166 branched from a signal line identical with that of the main-body-side terminal section 163 is formed. The external connection terminal 166 is a connection terminal based on a connection standard for connection to peripheral apparatuses such as the IEEE 1394 standard and has a physical shape different from that of the main-body-side terminal section 163. The external connection terminal 166 is opened and closed by a terminal lid 180 supported by the hinge mechanism, which is formed in the long side of the opening 25, to be capable of opening and closing. When the external connection terminal 166 is used, as shown in FIG. 32, when the terminal lid 180 is pivoted to the opening 25 side by the camera operator, the external connection terminal 166 is exposed to the outside. When the external connection terminal 166 is not used, as shown in FIG. 31, the external connection terminal 16 is closed by the terminal lid 180 and adhesion of dust and short-circuit due to contact with metal components is prevented.

As shown in FIG. 33, since the long side of the terminal lid 180 supported by the hinge mechanism is provided in a projected surface of the unit main body 130 mounted on the mounting section 23, when the unit main body 130 is mounted on the mounting section 23, opening operation is regulated. Therefore, when the unit main body 130 is mounted on the mounting section 23 and the unit-side terminal section 141 is connected to the main-body-side terminal section 163, use of the external connection terminal 166 is prohibited. The terminal lid 180 is opened to make it possible to use the external connection terminal 166 only in a state in which the unit main body 130 is removed from the mounting section 23. As shown in FIG. 32, in a state in which the terminal lid 180 is opened, the unit main body 130 may be unable to be mounted on the mounting section 23 and the main-body-side terminal section 163 is prohibited from being used. In other words, the apparatus main body 2 is configured to prohibit the main-body-side terminal section 163 and the external connection terminal 166 from being simultaneously connected to other external apparatuses.

Figure 35:
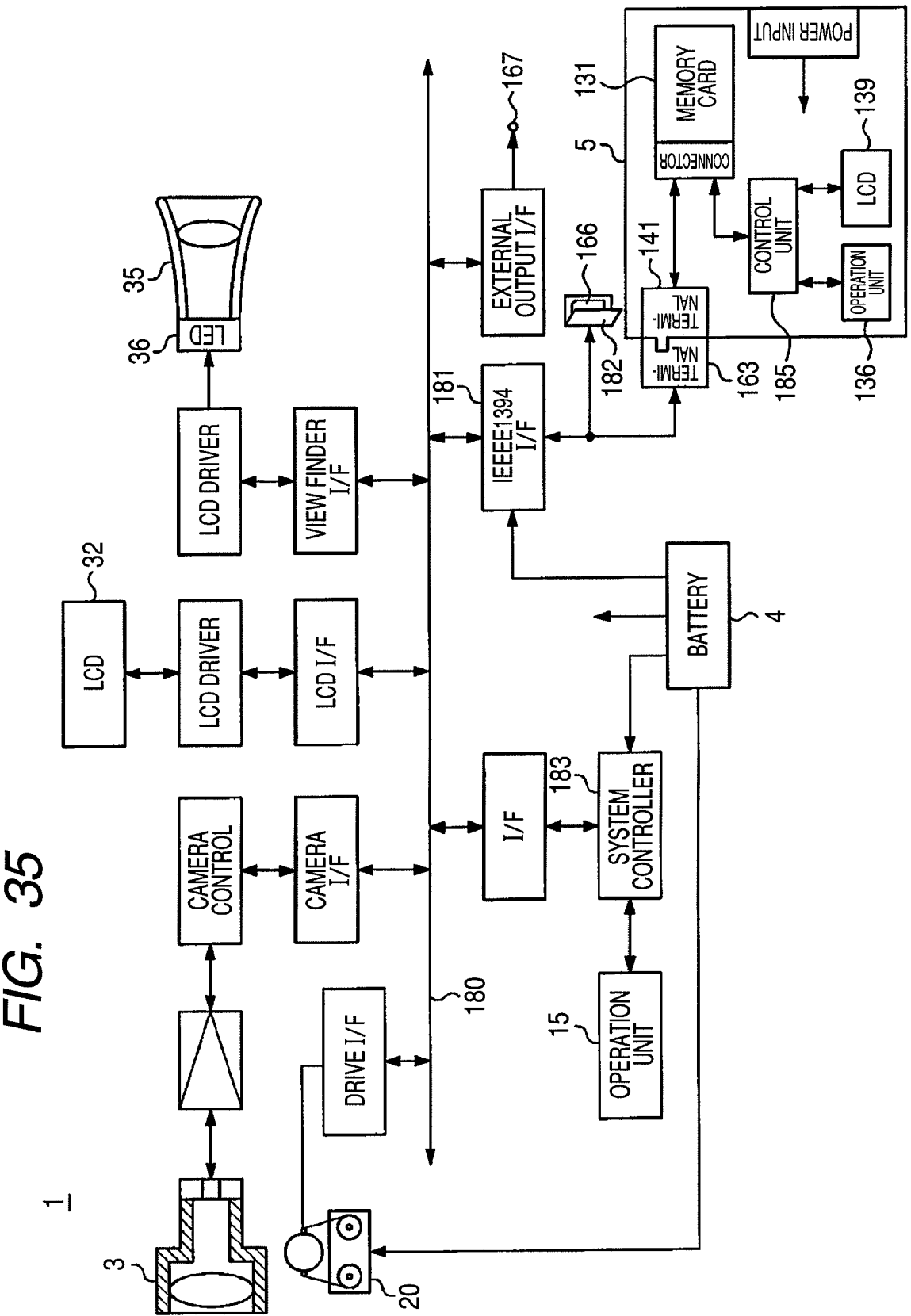
FIG. 35 is a functional block diagram of the imaging apparatus.

This is because, since the main-body-side terminal section 163 and the external connection terminal 166 are branched by an identical bus line, if different peripheral apparatuses are simultaneously connected thereto, it is likely that reliability of communication is spoiled. Functional blocks of the apparatus main body 2 to which the auxiliary recording medium unit 5 is connected are shown in FIG. 35. As shown in FIG. 35, in the apparatus main body 2, the main-body-side terminal section 163 and the external connection terminal 166 are branched by an IEEE 1394 interface 181 connected to a bus line 182. Electric power of the battery pack 4 housed in the battery housing section 22 is supplied to an external apparatus such as the auxiliary recording medium unit 5 via the IEEE 1394 interface 181 and via the main-body-side terminal section 163 and the external connection terminal 166.

The auxiliary recording medium unit 5 uses the electric power of the battery pack 4 as a driving power supply, records an information signal inputted from the unit-side terminal section 141 by a control unit 185 in the memory card 131 and performs recording in the memory card 131, editing operation for recorded data, display on the monitor 139, and the like according to operation of the editing button 136.

In the apparatus main body 2, a system controller 183 and the recording and reproducing unit 20, the lens barrel 3, the liquid crystal display panel 32, the display unit 36 of the finder unit 35, and the output terminal group 167 are connected via the bus line 182. Respective related sections are driven by the system controller 183 that receives an operation instruction from the operation unit 15.

In the mounting section 23, the output terminal group 167 such as an AV output terminal is formed below the external connection terminal 166. The output terminal group 167 is also opened and closed by a terminal lid and adhesion of dust and short-circuit are prevented. The terminal lid that closes the output terminal group 167 is supported on the outside of a projected surface of the unit main body 130. Therefore, the terminal lid can pivot and the output terminal group 167 can be used even in a state in which the unit main body 130 is mounted on the mounting section 23.

Figure 36A:
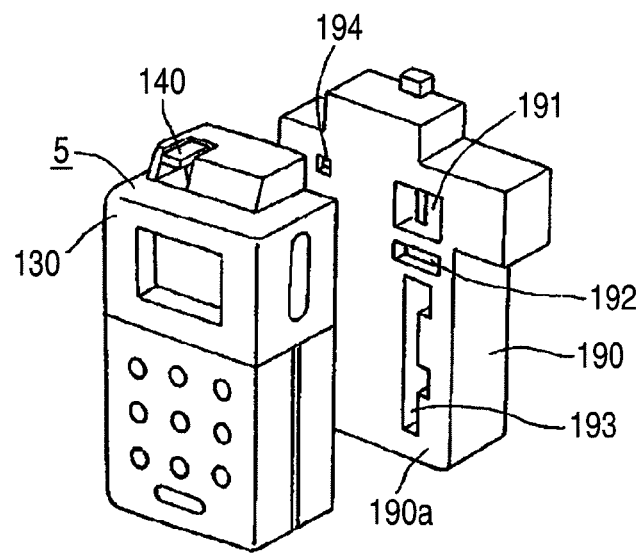
Figure 36B:
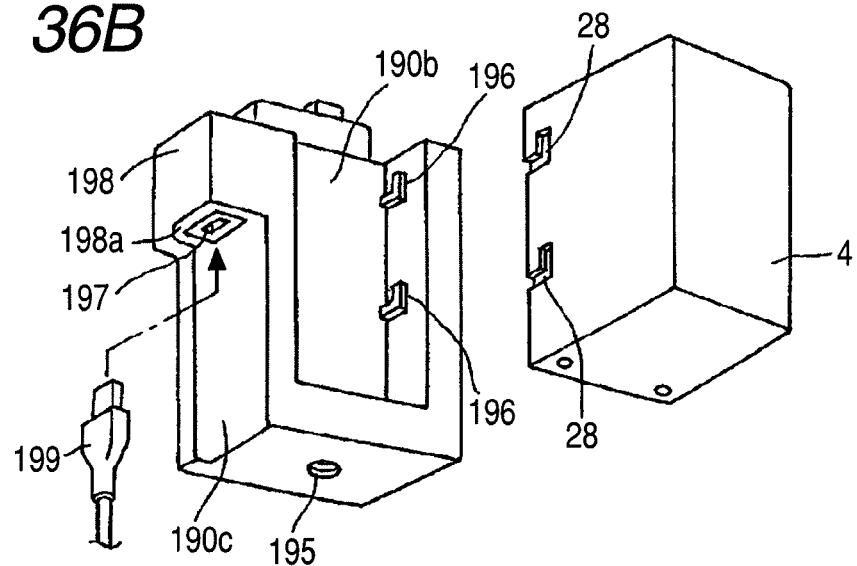
Figure 36C:
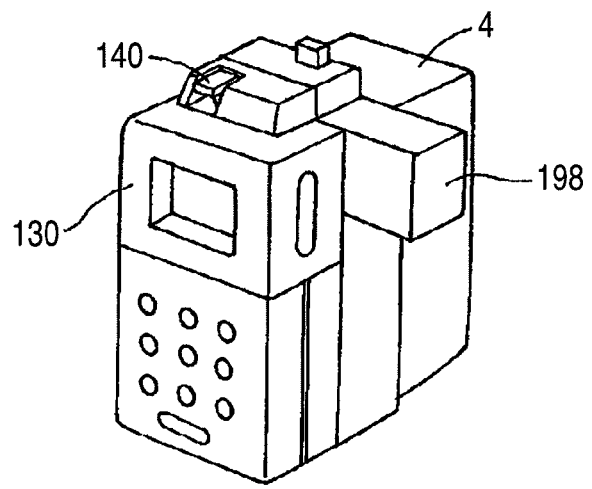

A process for performing editing of data recorded in the memory card 131 using the auxiliary recording medium unit 5 removed from the apparatus main body 2 is explained. When editing of data in the memory card 131 is performed, since a power supply is not built in the unit main body 130, as shown in FIGS. 36A to 36C, the auxiliary recording medium unit 5 makes connection to the battery pack 4 via an adapter 190 and obtains a driving power supply.

The adapter 190 is formed in a substantially rectangular shape. A unit mounting surface 190a on which the unit main body 130 of the auxiliary recording medium unit 5 is mounted is provided on one surface of the adapter 190 and a battery connecting recess 190b to which the battery pack 4 is connected is provided on the other surface. As shown in FIG. 36A, the unit mounting surface 190a has a configuration same as that of the mounting section 23 provided in the rear surface 2d of the apparatus main body 2. The unit mounting surface 190a includes an inserting recess 192 in which the miss-insertion preventing piece 142 is inserted, an engaging groove section 193 that is engaged with the engaging piece 143, and an engaging recess 194 in which the engaging protruded piece 144 engages.

Since the adapter-side terminal section 191 has a configuration same as that of the main-body-side terminal section 163, detailed explanation of the configuration is omitted. When the unit-side terminal section 141 is connected to the adapter-side terminal section 191, driving power is supplied to the unit main body 130 from the battery pack 4. The inserting recess 192 is formed below the adapter-side terminal section 191 in association with the miss-insertion preventing piece 142.

The engaging groove section 193 is a section for mounting the unit main body 130 on the unit mounting surface 190a. Since the engaging groove section 193 has a configuration same as that of the engaging groove section 164, detailed explanation of the engaging groove section 193 is omitted. After the engaging piece 143 is inserted in the engaging groove section 164, the protrusion 143a is clamped in the engaging groove section 193 by sliding the engaging piece 143 in a downward direction, and the unit main body 130 is mounted on the unit mounting surface 190a.

When the unit main body 130 is mounted on the unit mounting surface 190a, the engaging protruded piece 144 is inserted in the engaging recess 194. Since the engaging protrusion 144 is engaged in the engaging recess 194, the unit main body 130 is regulated from sliding in an up to down direction of the unit mounting surface 190a and the mounting of the unit main body 130 on the adopter 190 is maintained. When the disengaging lever 140 provided on the upper surface 130b is depressed, the engaging protrusion 144 retracts from the engaging recess 194 and the unit main body 130 can slide in an upward direction in which the unit main body 130 is disengaged from the unit mounting surface 190a.

As shown in FIG. 36B, the battery connecting recess 190b has a configuration same as that of the battery hosing section 22. A recess corresponding to an external shape of the battery pack 4 is formed in the battery connecting recess 190b. In the battery connecting recess 190b, an engaging protrusion 196 with which the engaging recess 28 formed in the outer peripheral surface of the battery pack 4 is formed on an inner side surface. When the battery pack 4 is attached, the battery pack 4 is inserted and slid to a lower surface side, whereby the engaging recess 28 engages with the engaging protrusion 196. A not-shown adapter-side terminal section is formed in a lower surface section of the battery connecting recess 190b. When the battery pack 4 is attached, the battery pack 4 is connected to the battery-side terminal section.

In the adapter 190, an external connection terminal 197 based on a predetermined communication standard such as USB or IEEE 1394 is formed on a side surface 190c. For example, an external recording device is connected to the external connection terminal 197. The external connection terminal 197 outputs editing data of the auxiliary recording medium unit 5 to the external recording device. When an editing device is connected thereto, the external connection terminal 197 performs editing of data recorded in the memory card 131 of the auxiliary recording medium unit 5. The external connection terminal 197 is exposed to the outside from a lower surface 198a of a connecting section 198 formed to project over the side surface 190c of the adapter 190. A connector 199, one end of a cable of which is connected to an external apparatus, is connected to the external connection terminal 197 from below. In the adapter 190, the external connection terminal 197 for realizing connection to the external apparatus is exposed on a lower surface 198a of the connecting section 198 and the connector 199 is connected to the external connection terminal 197 from below. Therefore, wiring can be easily collected without bending, twisting, and the like of cables.

In such an adapter 190, as shown in FIG. 36C, when the unit main body 130 is mounted on the unit mounting surface 190a and the battery pack 4 is connected to the batter connecting recess 190b, electric power of the battery pack 4 is supplied to the unit-side terminal section 141 side from the adapter-side terminal section 191. The auxiliary recording medium unit 5 can receives the electric power and perform simple editing of various data recorded in the memory card 131. With the auxiliary recording medium unit 5, since editing of data is possible in a state in which the auxiliary recording medium unit 5 is removed from the apparatus main body 2, it is possible to simultaneously perform rough editing of captured videos and sound in parallel while continuing imaging by the imaging apparatus 1. Since editing of the data recorded in the memory card 131 is performed, it is possible to more efficiently and quickly perform editing operation than editing performed by using a tape cartridge.

In the adapter 190, other than using the battery pack 4, a DC cable terminal 195 may be provided to receive power for home use via a DC adapter and supply the power to the auxiliary recording medium unit 5.

The shoulder-mounted-type imaging apparatus 200 that shares the lens barrel 3 with the imaging apparatus 1 is explained. As shown in FIGS. 37A and 37B to FIG. 39, the imaging apparatus 200 includes an apparatus main body 201 larger than that of the handy-type imaging apparatus 1 described above. A magnetic tape cartridge that can perform HDV recording is housed in the apparatus main body 201 as a main recording medium. As the main recording medium used in the imaging apparatus 200, magnetic tapes other than a DV cassette, disk-like recording media including optical disks such as a CD, a DVD, and a BD, magneto-optical disks, and magnetic disks such as a hard disk, or recording media such as a semiconductor memory can also be used.

In the apparatus main body 201, the auxiliary recording medium unit 5 can be mounted other than the main recording medium. Consequently, the apparatus main body 201 can prepare for situations such as a recording mistake in the main recording medium and recording exceeding a recording capacity and save various data in the main recording medium and the memory card 131 housed in the auxiliary recording medium unit 5 as a reserve.

The imaging apparatus 200 includes the apparatus main body 201 formed in a substantially rectangular shape and mounted on the right shoulder of the camera operator during imaging and a lens barrel 202 provided on a front surface 201a of the apparatus main body 201. The lens barrel 202 is detachably attachable to the imaging apparatus 200. Plural kinds of lens barrels 202 having different magnifications and the like are prepared as replacement lenses. An optimum lens barrel 202 can be mounted and used according to necessity. A grip section 203 is formed in the lens barrel 3. The lens barrel 202 including the grip section 203 is detached from the apparatus main body.

In the lens barrel 202, a lens hood 204 is detachably mounted on a front surface thereof. The lens barrel 202 has a configuration same as that of the lens barrel 3 except a position of the grip section 203. The lens hood 204 has a configuration same as that of the lens hood 9 described above. Therefore, detailed explanation of the lens barrel 202 and the lens hood 204 is omitted.

In the apparatus main body 201, an operation unit 205 for performing various kinds of operation is provided on a right side surface 201b. A mounting section 206 on which the auxiliary recording medium unit 5 is mounted is provided on a left side surface 201c. A battery pack 207 such as a lithium ion secondary battery is detachably attached to a rear surface 201d. The imaging apparatus 200 is an imaging apparatus for business use. A large battery having a large capacity is used in the battery pack 207 because the battery pack 207 needs to be durable in long-time use.

In the apparatus main body 201, a handle section 208 is formed on an upper surface 201e. The handle section 208 is formed over a front to rear direction substantially in the center of a width direction of the upper surface 201e of the apparatus main body 201. The camera operator can hold the apparatus main body 201 with sufficient balance by gripping the handle section 208 during imaging and transportation. An accessory shoe 208a to which various accessories are attached is formed on an upper surface of the handle section 208. A finder block 209 for visually recognizing an image captured via an imaging lens of the lens barrel 202 is provided in front of the handle section 208.

In such an apparatus main body 201, a magnetic tape cartridge serving as the main recording medium is housed and a recording and reproducing unit 210 that records an information signal in and reproduces the information signal from the magnetic tape cartridge is provided further on the rear surface 201d side than the mounting section 206. The recording and reproducing unit 210 includes a deck unit in which the magnetic tape cartridge is inserted and driven and a head unit that records an information signal in and reproduces the information signal from the magnetic tape cartridge. In the recording and reproducing unit 210, an inserting and detaching opening through which the magnetic tape cartridge is inserted and detached is exposed on an upper surface 201e of the apparatus main body 201. An opening and closing lid 212 for opening and closing the inserting and detaching opening is formed. When the tape cartridge is inserted in the deck unit, the opening and closing lid 212 is pivoted to expose the inserting and detaching opening and the tape cartridge is inserted lengthwise.

In the imaging apparatus 200, two kinds of large and small magnetic tape cartridges having different recording capacities are prepared as the main recording medium. The two kinds of magnetic tape cartridges can be inserted in the inserting and detaching opening of the recording and reproducing unit 210.

In the apparatus main body 201, a shoulder pad 211 put on the right shoulder of the camera operator is formed on a lower surface 201f. When the camera operator performs imaging, as shown in FIG. 37B, the camera operator places the apparatus main body 201 on the right shoulder and grips the grip section 203 provided in the lens barrel 202 with the right hand. The camera operator keeps a balance by supporting the weight of the entire imaging apparatus 200 with the right shoulder and performs adjustment of an imaging direction, an angle of view, and the like with the right hand for gripping the grip section 203.

In the imaging apparatus 200, the grip section 203 attached to the lens barrel 202 is formed on a front surface side of the lens barrel 202. Therefore, even when the center of gravity is present on the apparatus main body 201 side and the imaging apparatus 200 is placed on the shoulder of the camera operator, the camera operator can easily perform angle adjustment using the grip section 203.

Figure 40A:
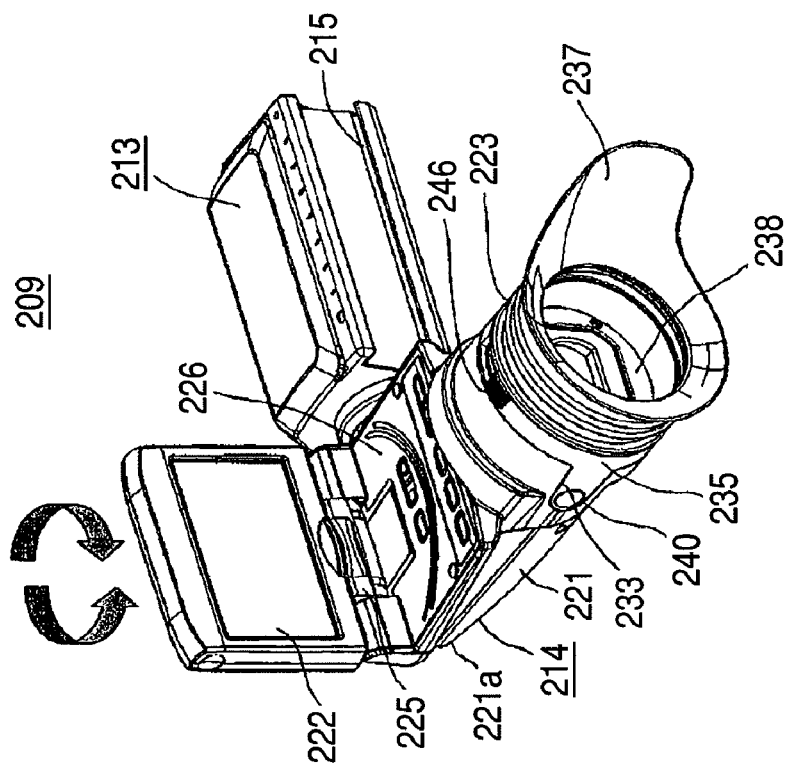
Figure 40B:
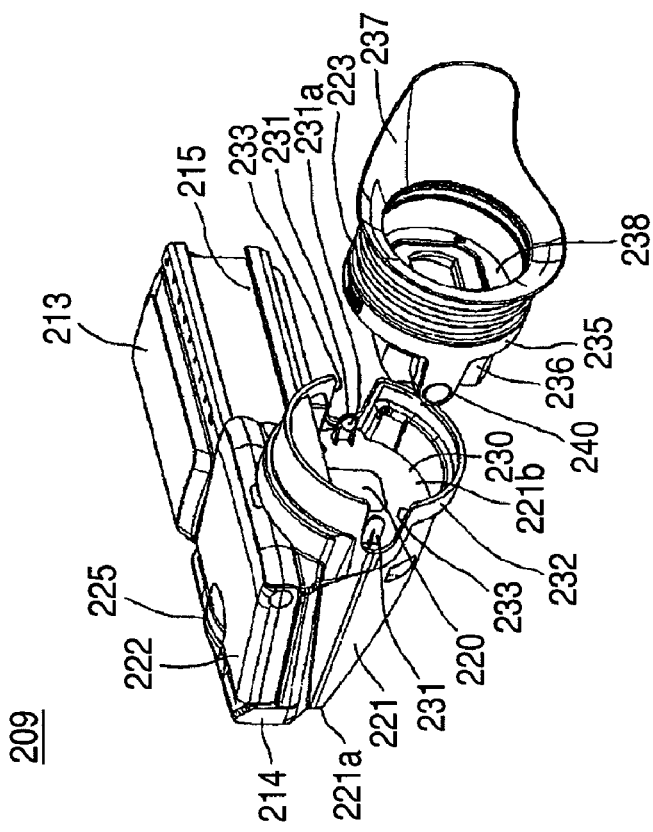

The finder block 209 provided in front of the handle section 208 is explained. As shown in FIGS. 40A and 40B, the finder block 209 includes a main body unit 213 attached to a front surface of the apparatus main body 201 and a display unit 214 rotatably supported by the main body unit 213 and is formed in a substantially L shape as a whole.

The main body unit 213 includes a housing of a substantially rectangular shape. A connecting section 215 that is connected to the apparatus main body 201 is provided on a rear surface side of the main body unit 213. A microphone holder 217 to which an external microphone 216 is attached is provided on the left side surface 201c of the apparatus main body 201. The external microphone 216 and the microphone holder 217 have configurations same as those of the external microphone 6 and the microphone holder 34. Therefore, detailed explanation of the external microphone 216 and the microphone holder 217 is omitted. In the main body unit 213, an operation unit 218 in which operation switches, operation buttons, and the like for performing various kinds of operation are arrayed is provided on the front surface 201a side of the apparatus main body 201.

Such a main body unit 213 is connected to the apparatus main body 201 via a connection cable 219. Video data captured from the lens barrel 202 and video data reproduced by the recording and reproducing unit 210 and the auxiliary recording medium unit 5 are supplied to the main body unit 213. The main body unit 213 displays the video data on the display unit 214.

In the main body unit 213, the display unit 214 is provided on the right side surface 201b side of the apparatus main body 201. As shown in FIGS. 40A and 40B, the display unit 214 includes a finder member 221 incorporating a small liquid crystal monitor 220 that displays a video captured in the lens barrel 202 and video data reproduced by the recording and reproducing unit 210 and the auxiliary recording medium unit 5, a liquid crystal display panel 222 provided on an upper surface of the finder member 221, and an eyepiece member 223 detachably provided in the finder member 221 and used for visually recognizing the liquid crystal monitor 220.

The finder member 221 includes a supporting section 221a supported by the main body unit 213 and attached with the liquid crystal display panel 222 and a connecting section 221b to which the eyepiece member 223 is connected. One side surface of the substantially rectangular housing of the supporting section 221a is supported by the main body unit 213. A hinge mechanism 225 to which the liquid crystal display panel 222 is attached and an operation panel unit 226 for editing a video displayed on the liquid crystal display panel 222 are formed on an upper surface of the supporting section 221a.

The connecting section 221b has a cylindrical shape having a diameter substantially same as that of the eyepiece member 223 as a whole and incorporates the liquid crystal monitor 220 directed in a direction opposed to the eyepiece member 223 and visually recognized via the eyepiece member 223. A pair of connecting pawls 231 are vertically provided to be opposed to each other across the liquid crystal monitor 220 on a base plate 230 on which the liquid crystal monitor 220 is exposed. In the connecting pawls 231, locking protrusions 231a protruded inwardly are formed. The eyepiece member 223 is connected to the finder member 221 by locking the locking protrusion 231a in connecting holes 241 of the eyepiece member 223. In the connecting section 221b, cutout sections 233 that are opposed to the connecting pawls 231 and through which the eyepiece member 223 is inserted are formed on an outer peripheral wall 232 vertically provided around the base plate 230.

In such a finder member 221, the supporting section 221a is supported by the main body unit 213 to be pivotable in an up to down direction. The camera operator pivots the finder member 221 according to necessity to thereby use the eyepiece member 223 in an optimum direction.

The eyepiece member 223 includes a cylindrical holder 235 that is connected to the connecting section 221b of the finder member 221, a lens box 236 attached to the inside of the holder 235, and an eye cup 237 on which the camera operator places the eyes. In the holder 235, the frame plate 238 is formed in the inside of a cylinder and the lens box 236 is screwed to the frame plate 238. A main surface of the frame plate 238 is opened and a lens group 239 housed in the lens box 236 is exposed from the opening.

A pair of connecting arms 240 are extended in an outer periphery of the holder 235 in association with the connecting pawls 231 provided in the connecting section 221b of the finder member 221. The connecting arms 240 fit in the cutout sections 233 provided in the outer peripheral wall 232 of the connecting section 221b. Engaging holes 240a are formed at distal end portions of the connecting arms 240. Locking pieces 242 to which the locking protrusions 231a of the connecting pawls 231 are locked are engaged on inner sides of the engaging holes 240a.

Figure 41:
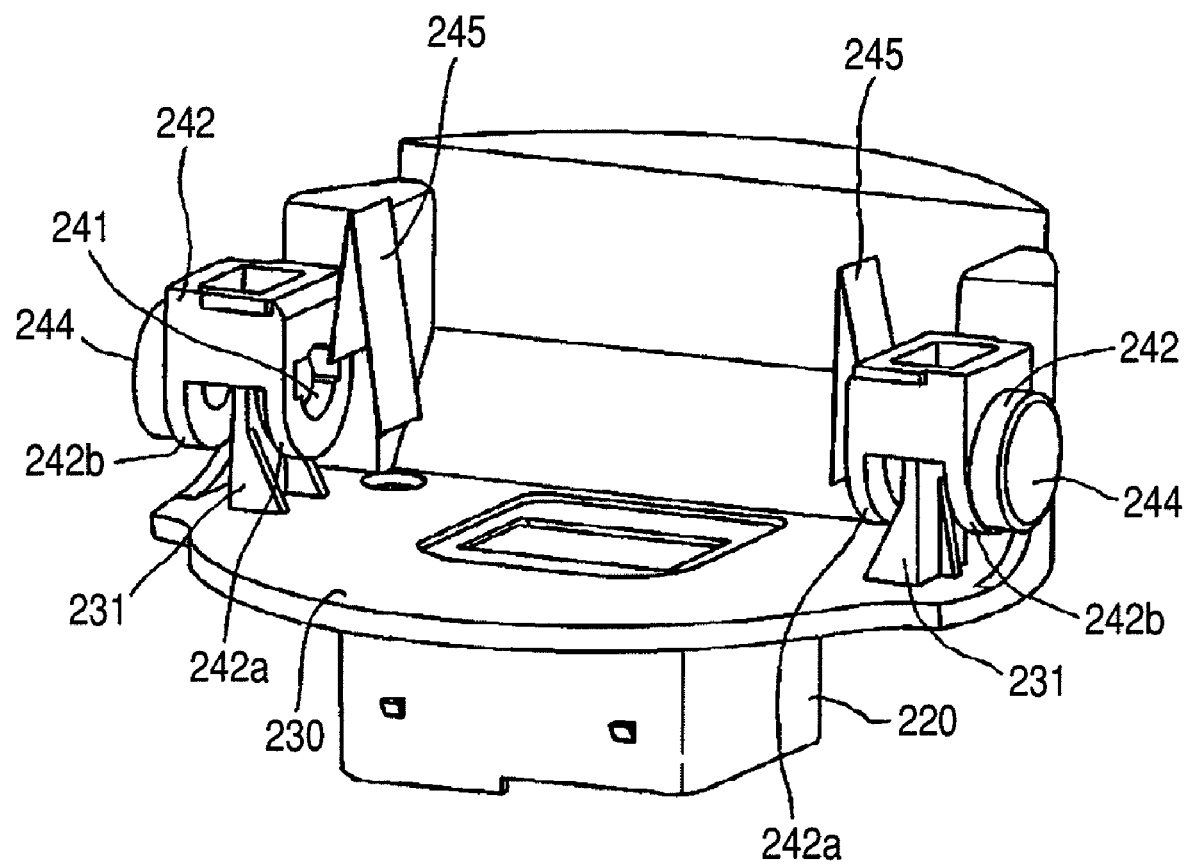
FIG. 41 is a perspective view showing a state in which the finder member and the eyepiece member are connected.
Figure 42A:
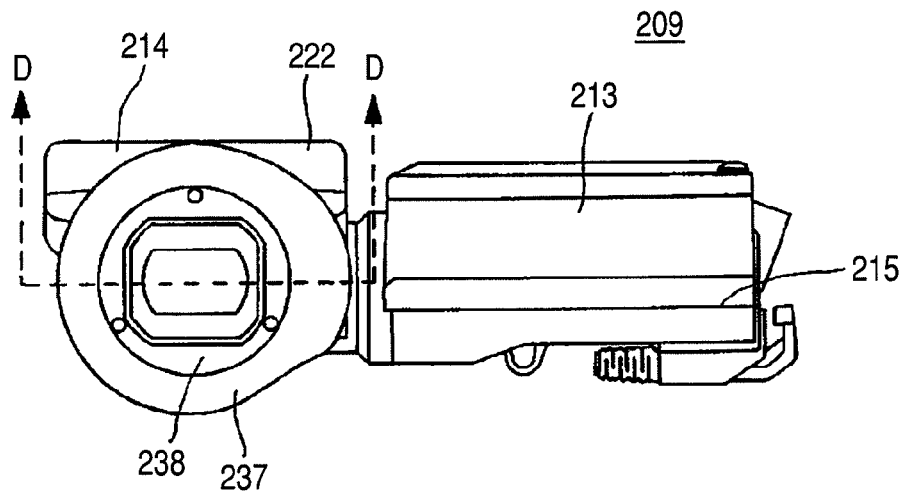
FIG. 42A is a front view showing the eyepiece member connected to the finder member.
Figure 42B:
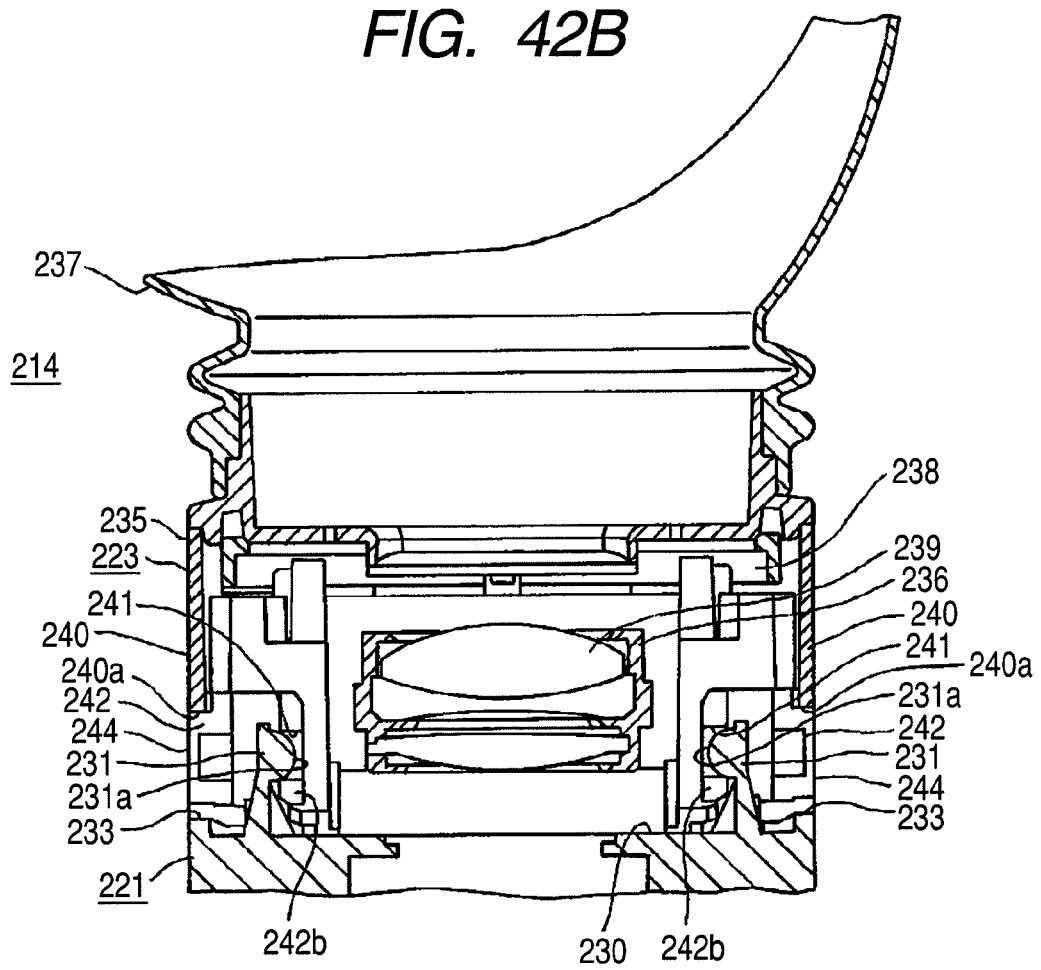
FIG. 42B is a sectional view taken along line D-D in FIG. 42A.

The locking pieces 242 are formed in a substantially rectangular box shape. A pair of sidewalls 242a spaced apart in an inside to outside direction are provided in the locking pieces 242. Connecting holes 241 to which the engaging protrusions 231a of the connecting pawls 231 are locked are formed in the inner sidewalls 242a. Protrusions 244 that engage in the engaging holes 240a of the connecting arms 240 are formed in outer side walls 242b. In the locking pieces 242, as shown in FIG. 41 and FIGS. 42A and 42B, the inner sidewalls 242a are typically urged outward by a leaf spring 245. Therefore, when the locking pieces 242 are connected to the connecting section 221b, the connecting holes 241 of the inner sidewalls 242a are pressed by the locking protrusions 231a of the connecting pawls 231 and the locking pieces 242 are prevented from coming off. The leaf spring 245 is supported by a not-shown supporting section formed in the holder 235 to thereby typically urge the locking pieces 242 to the outside and engages the engaging holes 240a of the connecting arms 240 and the protrusions 244 of the outer sidewalls 242b.

In the holder 235, a focus lever 246 for adjusting a focus of the lens group 239 housed in the lens box 236 is formed in a part of an outer periphery. The lens box 236 enlarges and shows display on the liquid crystal monitor 220 provided in the connecting section 221b. When the eyepiece member 223 is connected to the finder member 221, the lens box 236 is opposed to the liquid crystal monitor 220.

The eye cup 237 is made of an elastic member such as rubber formed in a cup shape and is joined on the outer periphery of the holder 235. The eye cup 237 covers an eye and a region around the eye of the camera operator to thereby prevent external light from being made incident in the holder 235.

The liquid crystal display panel 222 supported by the hinge mechanism 225 provided in the supporting section 221a of the finder member 221 displays a video captured by the lens barrel 202 and video data reproduced by the recording and reproducing unit 210 and the auxiliary recording medium unit 5. The camera operator uses the liquid crystal display panel 222 to image a video while visually recognizing the video presently captured or check a captured video.

The liquid crystal display panel 222 is pivotally supported by the hinge mechanism 225 provided on the upper surface of the supporting section 221a and is adjusted to an optimum angle by the camera operator. Therefore, the liquid crystal display panel 222 can be pivoted not only to the camera operator side but also to, for example, the front surface 201a side of the apparatus main body 201, i.e., the side of a person being imaged. Consequently, the person being imaged can check how he or she looks in a video.

Various kinds of reproduction such as frame stepping, fast forward, and pause are applied to a reproduced video displayed on the liquid crystal display panel 222 according to operation of the operation panel unit 226 provided in the supporting section 221a.

In such a finder block 209, since the finder member 221 and the eyepiece member 223 are separated, as shown in FIG. 40A, the liquid crystal monitor 220 provided in the connecting section 221b is exposed to the outside. Therefore, for example, since an angle of view is cut in a video that the camera operator enlarges with the lens group 239 using the eyepiece member 223, the camera operator can also visually recognize a video of the liquid crystal monitor 220 directly. The camera operator can replace the eyepiece member 223 with the eyepiece member 223 with the eye cup 237 having a different shape and made of a different material to improve a sense of use. Moreover, since the liquid crystal monitor 220 is directly exposed to the outside by removing the eyepiece member 223, dust adhering to the liquid crystal monitor 220 can be easily wiped off.

Attaching and detaching operation for the finder member 221 and the eyepiece member 223 is explained. The attachment of the eyepiece member 223 is performed by inserting, from a state in which the finder member 221 and the eyepiece member 223 are separated, the connecting arms 240 provided in the holder 235 of the eyepiece member 223 through the cutout sections 233 formed in the outer peripheral wall 232 of the connecting section 221b of the finder member 221 to fit the connecting arms 240 into the cutout sections 233. Consequently, the connecting pawls 231 vertically provided from the base plate 230 are inserted between the inner sidewalls 242a and the outer sidewalls 242b of the locking pieces 242 engaged in the inner sides of the connecting arms 240. The locking protrusions 231a formed at the distal ends of the connecting pawls 231 lock to the connecting holes 241 provided in the inner sidewalls 242a of the locking pieces 242. At this point, the locking protrusions 231a are pressed into the connecting holes 241 while the locking pieces 242 slightly bends to the inner side against an urging force of the leaf spring 245.

Consequently, the eyepiece member 223 is connected to the finder member 221. At this point, in the finder block 209, the holder 235 of the eyepiece member 223 and the outer peripheral wall 232 of the connecting section 221b of the finder member 221 are connected to be generally flush with each other. Further, in the finder block 209, the liquid crystal monitor 220 provided in the connecting section 221b and the lens group 239 of the lens box 236 of the eyepiece member 223 are opposed to each other. It is possible to enlarge and visually recognize a video of the liquid crystal monitor 220 via the lens group 239.

When the eyepiece member 223 is removed from the finder member 221, first, the camera operator pinches distal ends of the pair of connecting arms 240 with the thumb and the index finger or the like and presses the connecting arms 240 to the inner side. Consequently, the locking pieces 242 are urged to the inner side against the urging force of the leaf spring 245. The connecting holes 241 of the inner sidewalls 242a and the locking protrusions 231a of the connecting pawls 231 are unlocked. In this state, when the connecting arms 240 are pulled out from the cutout sections 233, the connecting arms 240 are pulled out from between the inner and outer sidewalls 242a and 242b of the locking pieces 242. The eyepiece member 223 can be separated from the finder member 221.

In this way, the camera operator simultaneously presses the pair of connecting arms 240 provided in the opposed positions of the holder 235 of the eyepiece member 223 to attach and detach the connecting arms 240. Therefore, the connection to the connecting pawls 231 is not released simply by pressing one of the connecting arms 240. It is possible to prevent the eyepiece member 223 from coming off from the finder member 221 by mistake.

Since the camera operator performs attaching and detaching operation for the finder block 209 while pinching the pair of connecting arms 240 of the eyepiece member 223, the camera operator holds the eye cup 237 with a hand. Therefore, it is possible to surely hold the eyepiece member 223 and surely perform attachment to and detachment from the finder member 221.

Figure 43:
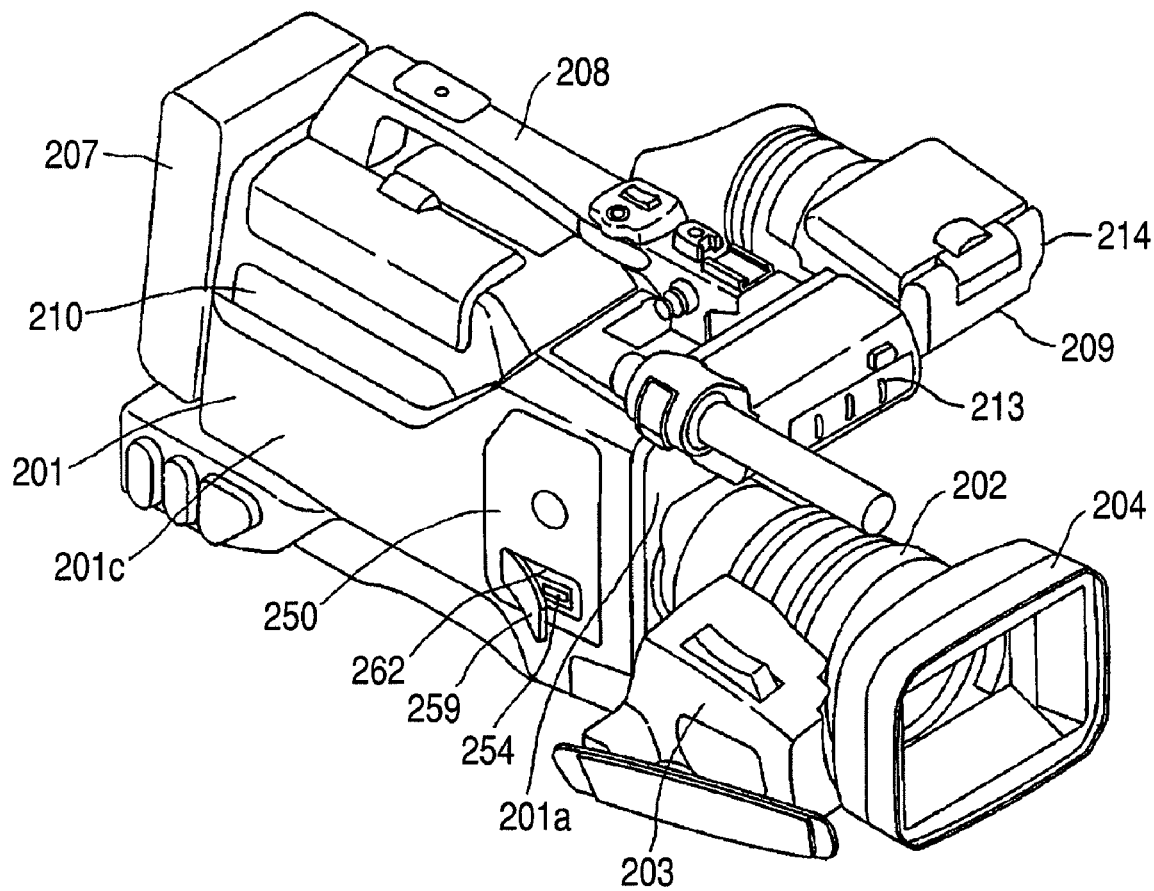
FIG. 43 is a perspective view showing a state in which a mounting section is closed in the shoulder-mounted-type imaging apparatus.

The mounting section 206 of the apparatus main body 201 on which the auxiliary recording medium unit 5 is mounted is explained. As shown in FIGS. 43 to 46, in the imaging apparatus 200, the mounting section 206 is provided in a position biased to the front surface 201a side on the left side surface 201c of the apparatus main body 201. As shown in FIG. 43, when the auxiliary recording medium unit 5 is not mounted, the mounting section 206 is closed by a lid member 250. As shown in FIG. 46, after the lid member 250 is removed, the auxiliary recording medium unit 5 is mounted on the mounting section 206. Since the auxiliary recording medium unit 5 used in the imaging apparatus 200 is the same as the auxiliary recording medium unit 5 mounted on the imaging apparatus 1, detailed explanation of the auxiliary recording medium unit 5 is omitted.

Figure 45:
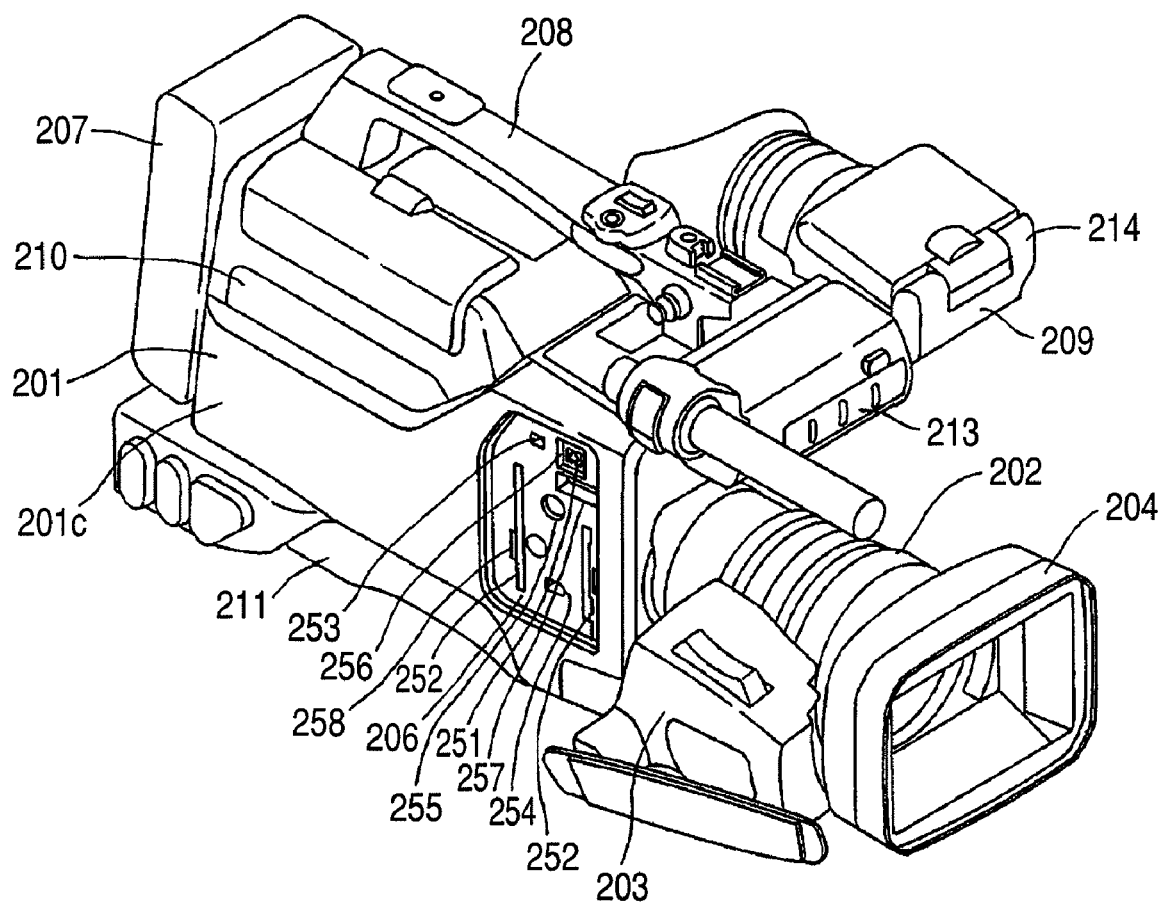
FIG. 45 is a perspective view showing a state in which the mounting section is opened in the shoulder-mounted-type imaging apparatus.
Figure 46:
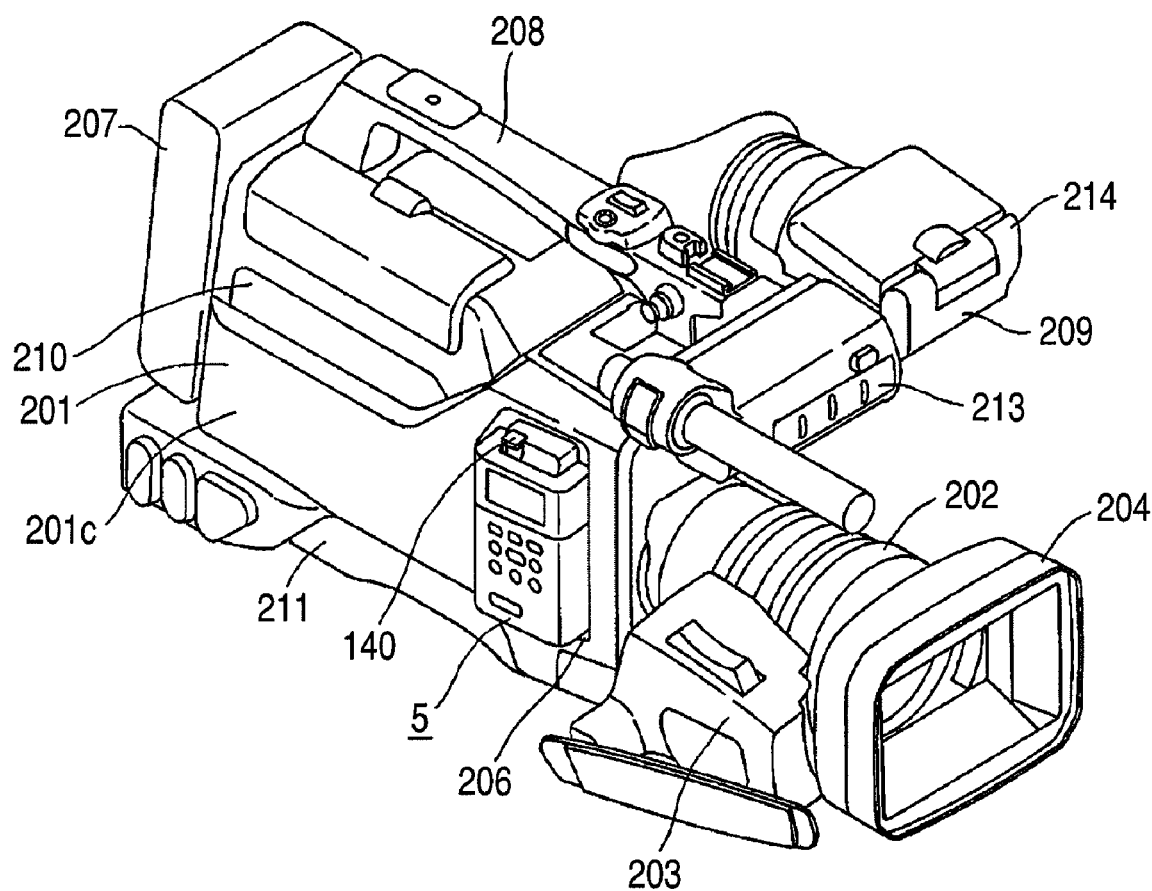
FIG. 46 is a perspective view showing a state in which an auxiliary recording medium unit is mounted on the mounting section in the shoulder-mounted-type imaging apparatus.

As shown in FIG. 45, the mounting section 206 is formed in a recessed surface section formed in a substantially rectangular shape in the left side surface 201c of the apparatus main body 201 and includes a main-body-side terminal section 251 to which the unit-side terminal section 141 of the auxiliary recording medium unit 5 is inserted, engaging groove sections 252 in which the engaging pieces 143 of the unit main body 130 are engaged, an engaging recess 253 in which the engaging protrusion 144 is engaged, an external connection terminal 254 branched from a signal line identical with that of the main-body-side terminal section 251, and a screw hole 255 to which the lid member 250 is screwed.

Since the main-body-side terminal section 251 has a configuration same as that of the main-body-side terminal section 163 of the imaging apparatus 1, detailed explanation of the main-body-side terminal section 251 is omitted. The main-body-side terminal section 251 is formed in a position slightly in the depth in the terminal recess 256 opened in the mounting section 206. When the unit-side terminal section 141 is mounted, the main-body-side terminal section 251 transmits various data of videos, sound, and the like captured from the lens barrel 202 and supplies electric power of the battery pack 207 to the auxiliary recording medium unit 5 as driving power.

An inserting recess 257 in which the miss-insertion preventing piece 142, which is protrudingly provided in the unit main body 130, is opened below the main-body-side terminal section 251.

Since the engaging groove sections 252 in which the engaging pieces 143 of the unit main body 130 are engaged have a configuration same as that of the engaging groove sections 164 of the imaging apparatus 1, detailed explanation of the engaging groove sections 252 is omitted. Two engaging groove sections 252 are formed over the slide direction of the auxiliary recording medium unit 5 to be spaced apart in the width direction in the mounting section 206 in association with the engaging pieces 143 of the unit main body 130.

In the respective engaging groove sections 252, earth openings 258 in which the earth terminals 162 formed in the unit main body 130 are inserted are formed. Terminals connected to an earth in the apparatus main body 201 are exposed in the earth opening 258. When the unit main body 130 is mounted on the mounting section 206, the earth terminals 162 are inserted and connected to the earth of the apparatus main body 201.

The engaging recess 253 in which the engaging protrusion 144 is engaged is formed next to the main-body-side terminal section 251 and has a size for allowing the engaging protruded piece 144 to be inserted. When the engaging protruded piece 144 is inserted, the engaging recess 253 regulates the unit main body 130 from sliding upward. When the engaging protruded piece 144 retracts into the unit main body 130 according to the depression of the disengaging lever 140, the engaging recess 253 is disengaged from the engaging protruded piece 144 and allows the unit main body 130 to slide.

The external connection terminal 254 branched from the signal line identical with that of the main-body-side terminal section 163 is exposed from a part of the mounting section 206 and is provided in a projected surface of the auxiliary recording medium unit 5 mounted on the amounting section 206. The external connection terminal 254 is a connection terminal based on a standard of connection with peripheral apparatuses such as the IEEE 1394 standard. As shown in FIG. 43, the external connection terminal 254 is exposed to the outside via a terminal lid 259 provided in the lid member 250 and can be used even in a state in which the mounting section 206 is closed by the lid member 250. When the external connection terminal 254 is not used, the external connection terminal 254 is closed by the terminal lid 259 to prevent adhesion of dust and short-circuit due to contact with metal components.

The external connection terminal 254 is formed in the projected surface of the unit main body 130 and is prohibited from being used in a state in which the unit main body 130 is mounted on the mounting section 206. In a state in which an external apparatus is connected to the external connection terminal 254, the unit main body 130 is prohibited from being mounted on the mounting section 206. In other words, like the main-body-side terminal section 163 and the external connection terminal 166 of the imaging apparatus 1 described above, the external connection terminal 254 is prohibited from being connected to other external apparatuses simultaneously with the main-body-side terminal section 251.

This is because, as in the apparatus main body 2, in the imaging apparatus 200, since the main-body-side terminal section 251 and the external connection terminal 254 are branched by an identical bus line, if different peripheral apparatuses are simultaneously connected thereto, it is likely that reliability of communication is spoiled.

Figure 44:
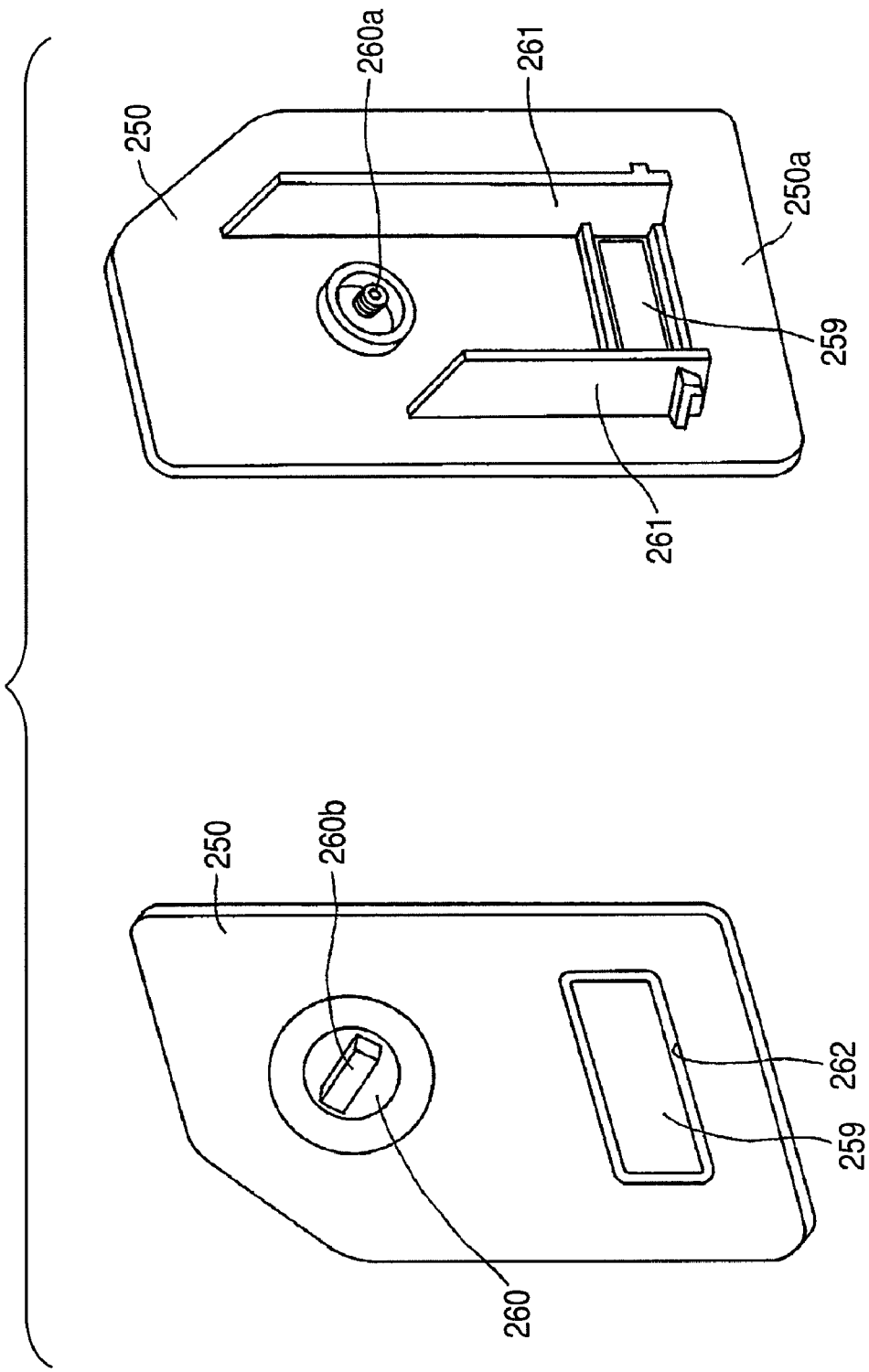
FIG. 44 is a perspective view showing a lid member that closes the mounting section.

As shown in FIG. 44, the lid member 250 that closes such a mounting section 206 is formed as a plate-like member having a shape substantially the same as the mounting section 206 and includes an engaging screw 260 that engages in the screw hole 255 and the terminal lid 259 provided in association with the external connection terminal 254.

In the lid member 250, a pair of ribs 261 that are engaged in the engaging groove sections 252 are provided on a rear surface opposed to the mounting section 206. The lid member 250 is engaged with the mounting section 206 when the ribs 261 are engaged in the engaging groove sections 252. Like the engaging pieces 143 of the unit main body 130, the ribs 261 are vertically provide in a long shape over the up to down direction to secure strength. Therefore, even if the ribs 261 collide with members around the same because the ribs 261 are vertically provided on the rear surface of the lid member 250, the ribs 261 do not easily break.

The engaging screw 260 is a screw for mounting the lid member 250 on the mounting section 206. A screw section 260a of the engaging screw 260 projects on a rear surface 250a of the lid member 250 opposed to the mounting section 206 in association with the screw hole 255 of the mounting section 206. A dial section 260b for rotating the screw section 260a is exposed on the surface 250b of the lid member 250.

One end of the terminal lid 259 provided in association with the external connection terminal 254 is made of an elastic member such as rubber and locked to the lid member 250 by a not-shown coupling member. The terminal lid 259 is fit in a terminal hole 262 opened in the lid member 250. The terminal lid 259 can expose the external connection terminal 254 to the outside by being removed from the terminal hole 262.

As shown in FIG. 46, the auxiliary recording medium unit 5 is detachable mounted on the mounting section 206. As mounting and detaching operation for the auxiliary recording medium unit 5, like the operation for mounting the auxiliary recording medium unit 5 on and detaching the auxiliary recording medium unit 5 from the mounting section 23 of the imaging apparatus 1, after the unit-side terminal section 141 is inserted in the main-body-side terminal section 251 and the engaging pieces are inserted in the engaging groove sections 252, the unit main body 130 is slid downward. Consequently, the unit terminal and the main body terminal of the main-body-side terminal section 251 are connected and the protrusions 143a of the engaging pieces 143 are clamped in the engaging groove sections 252. At this point, the engaging protruded piece 144 of the unit main body 130 engages in the engaging recess 253 to regulate the unit main body 130 from sliding upward.

When the unit main body 130 is removed from the mounting section 206, the camera operator depresses the disengaging lever to thereby retract the engaging protruded piece 144 into the unit main body 130 and disengages the engaging protruded piece 144 from the engaging recess 253. Consequently, the unit main body 130 is allowed to slide upward on the mounting section 206. After the engaging pieces 143 and the engaging groove sections 252 are disengaged and the unit terminal 152 and the main body terminal of the main-body-side terminal section 251 are disengaged, the unit main body 130 is removed from the mounting section 206.

Figure 47:
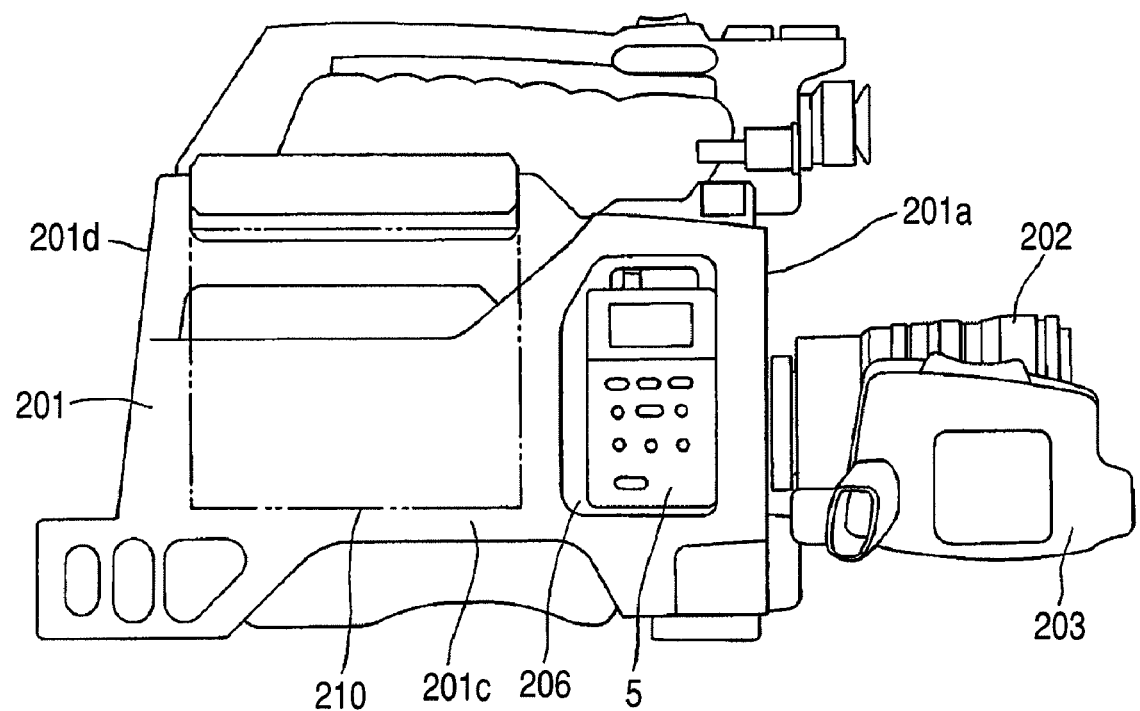
FIG. 47 is a side view showing a state in which the auxiliary recording medium unit is mounted on the mounting section in the shoulder-mounted-type imaging apparatus.
Figure 48:
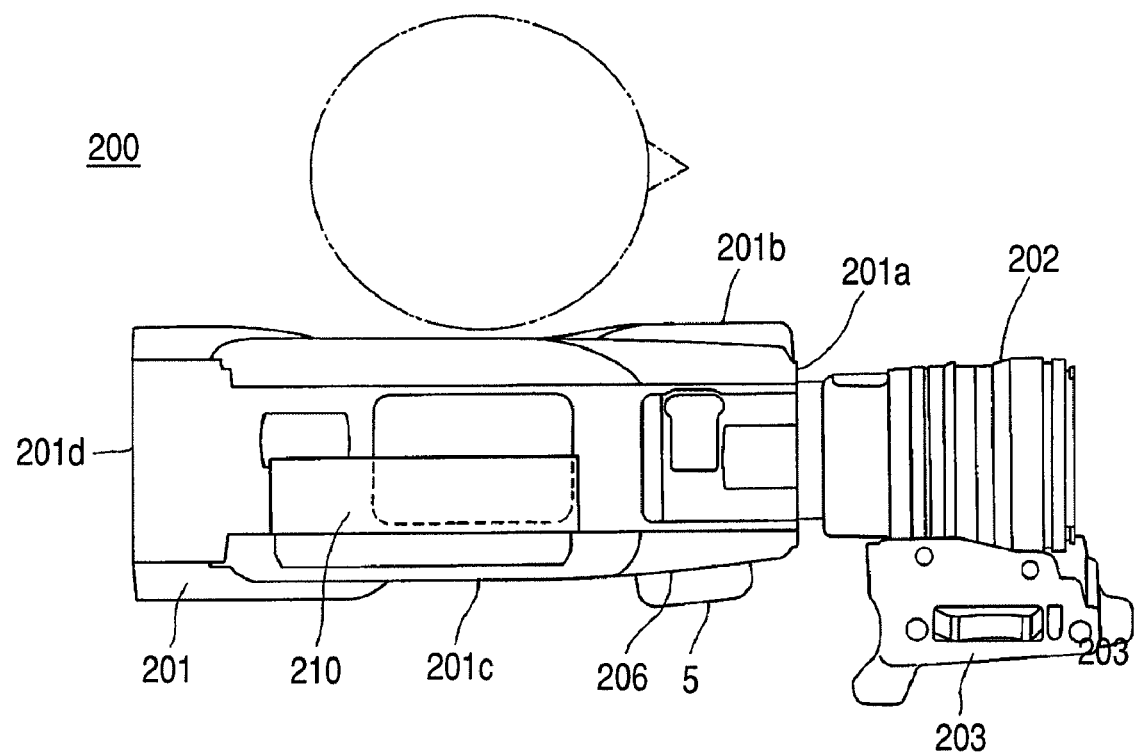
FIG. 48 is a top view showing a state in which the auxiliary recording medium unit is mounted on the mounting section in the shoulder-mounted-type imaging apparatus.

In such an imaging apparatus 200, as shown in FIGS. 47 and 48, the mounting section 206 is provided on the front side of the left side surface 201c of the apparatus main body 201. Therefore, the auxiliary recording medium unit 5 is located on the opposite side of the camera operator. As shown in FIG. 37B, the mounting section 206 is provided between the shoulder pad 211 and the grip section 203 and does not interfere with the arm of the camera operator.

Therefore, in the imaging apparatus 200, even during imaging, the auxiliary recording medium unit 5 can be mounted on and detached from the mounting section 206 by a camera assistant or the like. In the imaging apparatus 200, even during imaging, the memory card 131 can be inserted in and detached from the unit main body 130 mounted on the mounting section 206 by the camera assistant or the like. Consequently, in the imaging apparatus 200, when a capacity of the memory card 131 runs short or when data recorded in the memory card 131 is edited, it is possible to replace the memory card 131 or the unit main body 130 without suspending imaging.

As described above, in the auxiliary recording medium unit 5, the supporting plate 150, on which the unit-side terminal section 141 is provided, is swingably supported. Therefore, even when the unit main body 130 is mounted on and detached from the mounting section 206 or when the apparatus main body 201 swings during imaging, since the supporting plate 150 swings, vibration and impact are absorbed. Therefore, reliability of connection between the unit-side terminal section 141 and the main-body-side terminal section 251 is secured.

In the imaging apparatus 200, the auxiliary recording medium unit 5, in which the memory card 131 is used as an auxiliary recording medium, is mounted on the front surface 201a side of the apparatus main body 201. The recording and reproducing unit 210, in which a tape cartridge is used as a main recording medium, is provided on the rear surface 201d side of the apparatus main body 201. In the imaging apparatus 200, the microphone holder 217, to which the external microphone 216 is attached, is provided in the main body section 213 of the finder block 209 formed on the front surface 201a side of the apparatus main body 201.

In this way, in the imaging apparatus 200, the external microphone 216 is disposed on the left side surface 201c side of the apparatus main body 201. However, since the recording and reproducing unit 210 is spaced apart from the external microphone 216, operation sound of a motor in the deck unit of the recording and reproducing unit 210 is not collected by the external microphone 216. In the imaging apparatus 200, the auxiliary recording medium unit 5 is attached near the external microphone 216. However, since the memory card 131 is used as an auxiliary recording medium in the auxiliary recording medium unit 5, large operation sound is not generated during recording and reproduction and the external microphone 216 does not collect noise.

In the imaging apparatus 200, since the built-in microphone is incorporated on the front surface 201a side of the apparatus main body 201 and spaced apart from the recording and reproducing unit 210, the built-in microphone does not collect operation sound and the like of the motor in the deck unit of the recording and reproducing unit 210.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus comprising:
    an apparatus main body including a recording and reproducing unit that houses a main recording medium and records an information signal in and reproduces the information signal from the main recording medium; and
    an auxiliary recording medium unit that is detachably mounted on a mounting section of the apparatus main body and houses an auxiliary recording medium separate from the main recording medium,
    during imaging, the apparatus main body being placed on one shoulder of a camera operator and a grip section provided on a front surface side of the apparatus main body is gripped,
    wherein the mounting section is formed between the grip section and the recording and reproducing unit on a side surface on the opposite side of a side surface on the camera operator side of the apparatus main body during imaging, and
    the auxiliary recording medium unit is detachably attachable during imaging, and
    wherein the auxiliary recording medium is detachably inserted in a housing section of the auxiliary recording medium unit, and the housing section of the auxiliary recording medium unit includes a lid member for rotably opening and closing the housing section, and wherein at least an editing button is formed on the lid member for editing recorded data of the auxiliary recording medium.

2. An imaging apparatus according to claim 1, wherein the auxiliary recording medium unit allows the auxiliary recording medium to be inserted in and detached from the auxiliary recording medium unit in a state in which the auxiliary recording medium unit is mounted on the mounting section.

3. An imaging apparatus according to claim 1, wherein
    the mounting section includes a main-body-side terminal section that is connected to a unit-side terminal section of the auxiliary recording medium unit to thereby supply driving power to and transmit an information signal to the auxiliary recording medium unit and an engaging section that engages the auxiliary recording medium unit, and
    the unit-side terminal section is swingable from a unit main body with respect to directions excluding a direction for engaging the unit-side terminal section in and detaching the unit-side terminal section from the main-body-side terminal section.

4. An imaging apparatus according to claim 1, wherein
    a communication terminal branched from a transmission path identical with that of the main-body-side terminal section is further provided in the mounting section, and
    when the auxiliary recording medium unit is mounted on the mounting section, the communication terminal is closed by the auxiliary recording medium unit.

5. An imaging apparatus comprising:
    an apparatus main body including a recording and reproducing unit that houses a main recording medium and records an information signal in and reproduces the information signal from the main recording medium; and
    an auxiliary recording medium unit that is detachably mounted on a mounting section of the apparatus main body and houses an auxiliary recording medium separate from the main recording medium,
    during imaging, the apparatus main body being placed on one shoulder of a camera operator and a grip section provided on a front surface side of the apparatus main body is gripped, wherein
    the mounting section is formed between the grip section and the recording and reproducing unit on a side surface on the opposite side of a side surface on the camera operator side of the apparatus main body during imaging, and the auxiliary recording medium unit is detachably attachable during imaging, and
    wherein
    the main recording medium is a tape-like recording medium and the auxiliary recording medium is a memory card, and
    a built-in microphone is disposed in a position closer to the mounting section than the recording and reproducing unit in the apparatus main body and an external microphone is attachable to the apparatus main body.

6. An imaging apparatus according to claim 1, wherein, in the mounting section, a protrusion in which a miss-insertion preventing piece, which is protrudingly provided near a unit-side terminal section of the auxiliary recording medium unit, is formed near the main-body-side terminal section.

* * * * *